US008969484B2

(12) United States Patent
Stokes et al.

(10) Patent No.: US 8,969,484 B2
(45) Date of Patent: Mar. 3, 2015

(54) METHODS OF PRODUCING MONO- AND MULTI-FUNCTIONAL POLYMERS FROM TERPENE-BASED INITIATORS

(75) Inventors: Casey D. Stokes, Belle Chasse, LA (US); Young A. Chang, Santa Clara, CA (US); Patrick J. McDougall, Fairfax, CA (US)

(73) Assignee: Chevron Oronite Company LLC, San Ramon, CA (US)

( * ) Notice: Subject to any disclaimer, the term of this patent is extended or adjusted under 35 U.S.C. 154(b) by 824 days.

(21) Appl. No.: 13/179,393

(22) Filed: Jul. 8, 2011

(65) Prior Publication Data
US 2013/0012662 A1 Jan. 10, 2013

(51) Int. Cl.
*C08F 10/10* (2006.01)
*C08F 2/38* (2006.01)
*C08F 8/14* (2006.01)
*C08F 2/00* (2006.01)
*C08F 110/10* (2006.01)

(52) U.S. Cl.
CPC .............. *C08F 10/10* (2013.01); *C08F 110/10* (2013.01); *C08F 2/38* (2013.01)
USPC ......... 525/333.7; 525/359.4; 526/82; 526/83; 526/84; 526/85; 526/90; 526/185; 526/204; 526/214; 526/217

(58) Field of Classification Search
CPC ............ C08F 110/10; C08F 4/00; C08F 2/38; C08F 10/10; C08F 232/04
USPC .......... 525/333.7, 359.4; 526/82–85, 90, 185, 526/204, 241, 217, 214
See application file for complete search history.

(56) References Cited

U.S. PATENT DOCUMENTS

| 3,155,686 | A | 11/1964 | Prill et al. |
| 3,632,600 | A | 1/1972 | Morris et al. |
| 4,034,038 | A | 7/1977 | Vogel |
| 4,152,499 | A | 5/1979 | Boerzel et al. |
| 4,238,628 | A | 12/1980 | Cahill et al. |
| 4,255,538 | A | 3/1981 | Skillicorn |
| 4,276,394 | A | 6/1981 | Kennedy et al. |
| 4,342,849 | A | 8/1982 | Kennedy |
| 4,393,199 | A | 7/1983 | Manser |
| 4,429,099 | A | 1/1984 | Kennedy et al. |
| 4,468,291 | A | 8/1984 | Naarmann et al. |
| 4,486,572 | A | 12/1984 | Kennedy |
| 4,568,732 | A | 2/1986 | Kennedy et al. |
| 4,758,631 | A | 7/1988 | Kennedy et al. |
| 4,814,405 | A | 3/1989 | Kennedy |
| 4,910,321 | A | 3/1990 | Kennedy et al. |
| 4,929,683 | A | 5/1990 | Kennedy et al. |
| 4,943,616 | A | 7/1990 | Mishra et al. |
| 4,946,899 | A | 8/1990 | Kennedy et al. |
| 4,948,936 | A | 8/1990 | Landry |
| 5,032,653 | A | 7/1991 | Cheradame et al. |
| 5,066,730 | A | 11/1991 | Kennedy et al. |
| 5,112,507 | A | 5/1992 | Harrison |
| 5,122,572 | A | 6/1992 | Kennedy et al. |
| 5,169,914 | A | 12/1992 | Kaszas et al. |
| 5,175,225 | A | 12/1992 | Ruhe, Jr. |
| 5,212,248 | A | 5/1993 | Knoll et al. |
| 5,219,948 | A | 6/1993 | Storey et al. |
| 5,225,492 | A | 7/1993 | Kennedy et al. |
| 5,286,823 | A | 2/1994 | Rath |
| 5,300,701 | A | 4/1994 | Cherpeck |
| 5,334,321 | A | 8/1994 | Harrison et al. |
| 5,336,745 | A | 8/1994 | Cheradame et al. |
| 5,340,881 | A | 8/1994 | Kennedy et al. |
| 5,350,786 | A | 9/1994 | Costanzi et al. |
| 5,350,819 | A | 9/1994 | Shaffer |
| 5,366,745 | A | 11/1994 | Daden |
| 5,395,885 | A | 3/1995 | Kennedy et al. |
| 5,428,111 | A | 6/1995 | Faust et al. |
| 5,444,135 | A | 8/1995 | Cheradame et al. |
| 5,448,000 | A | 9/1995 | Gullapalli et al. |
| 5,451,647 | A | 9/1995 | Faust et al. |
| 5,464,549 | A | 11/1995 | Sieberth |
| 5,506,316 | A | 4/1996 | Shaffer |
| 5,580,935 | A | 12/1996 | Shaffer |
| 5,616,668 | A | 4/1997 | Harrison et al. |
| 5,629,394 | A | 5/1997 | Cheradame et al. |
| 5,637,647 | A | 6/1997 | Faust et al. |
| 5,663,457 | A | 9/1997 | Kolp |
| 5,663,470 | A | 9/1997 | Chen et al. |
| 5,690,861 | A | 11/1997 | Faust |
| 5,777,037 | A | 7/1998 | Yamanaka et al. |
| 5,777,044 | A | 7/1998 | Faust |

(Continued)

FOREIGN PATENT DOCUMENTS

| DE | 237072 | 7/1986 |
| DE | 240308 | 10/1986 |

(Continued)

OTHER PUBLICATIONS

Bae et al., "β-Proton Elimination by Free Bases in the Living Carbocationic Polymerization of Isobutylene," Macromolecules 30:7341-7344 (1997).
Bae et al., "The Role of Pyridine Derivatives in Living Carbocationic Polymerization: Lewis Base or Nucleophile?" Macromol. Symp. 132:11-23 (1998).
Bauer et al., "Cationic Polymerization of Isobutene Initiated by Stannic Chloride and Phenols: Polymer Endgroup Studies," J. Poly. Sci. Part A-1 9:1451-1458 (1971).
Bauer et al., "Complexes of Stannic Chloride and Alkyl Phenols and the Influence of These Complexes and of Free Phenol on the Cationic Polymerization of Isobutene," Can. J. Chem. 48:1251-1262 (1970).

(Continued)

*Primary Examiner* — Ling Choi
*Assistant Examiner* — Chun-Cheng Wang
(74) *Attorney, Agent, or Firm* — Jones Day

(57) ABSTRACT

Provided herein are methods for the preparation of mono- and multi-functional telechelic polyolefins via polymerization reaction with a terpene-based initiator.

89 Claims, No Drawings

(56) References Cited

U.S. PATENT DOCUMENTS

| | | | |
|---|---|---|---|
| 5,945,491 | A | 8/1999 | Matyjaszewski et al. |
| 5,948,936 | A | 9/1999 | Itoh et al. |
| 6,033,446 | A | 3/2000 | Cherpeck et al. |
| 6,121,379 | A | 9/2000 | Yamanaka et al. |
| 6,194,597 | B1 | 2/2001 | Faust et al. |
| 6,407,066 | B1 | 6/2002 | Dressen et al. |
| 6,451,920 | B1 | 9/2002 | Harrison et al. |
| 6,468,948 | B1 | 10/2002 | Rossi et al. |
| 6,515,083 | B2 | 2/2003 | Ozawa et al. |
| 6,642,318 | B1 | 11/2003 | Chiefari et al. |
| 6,753,391 | B1 | 6/2004 | Lewandowski et al. |
| 6,818,716 | B2 | 11/2004 | Wendland et al. |
| 6,906,011 | B2 | 6/2005 | Harrison et al. |
| 6,969,744 | B2 | 11/2005 | Stokes et al. |
| 7,071,275 | B2 | 7/2006 | Rath et al. |
| 7,124,110 | B1 | 10/2006 | Kemp, II et al. |
| 7,244,870 | B2 | 7/2007 | Lange et al. |
| 7,420,019 | B2 | 9/2008 | Stokes |
| 7,501,476 | B2 | 3/2009 | Stokes |
| 7,576,161 | B2 | 8/2009 | Stokes |
| 7,705,090 | B2 | 4/2010 | Stokes |
| 7,709,580 | B2 | 5/2010 | Stokes |
| 7,816,459 | B2 | 10/2010 | Stokes |
| 8,013,073 | B2 | 9/2011 | Stokes et al. |
| 8,063,154 | B2 | 11/2011 | Storey et al. |
| 8,133,954 | B2 | 3/2012 | Stokes |
| 8,383,736 | B2 | 2/2013 | Stokes et al. |
| 8,383,760 | B2 | 2/2013 | Stokes |
| 2002/0082367 | A1 | 6/2002 | McConville et al. |
| 2002/0132905 | A1 | 9/2002 | Babinee et al. |
| 2003/0105194 | A1 | 6/2003 | Stuart et al. |
| 2003/0162858 | A1 | 8/2003 | Faust et al. |
| 2003/0191257 | A1 | 10/2003 | Wettling et al. |
| 2004/0260033 | A1 | 12/2004 | Stokes et al. |
| 2005/0282972 | A1 | 12/2005 | Stokes et al. |
| 2006/0041081 | A1 | 2/2006 | Stokes et al. |
| 2006/0041083 | A1 | 2/2006 | Stokes et al. |
| 2006/0135721 | A1 | 6/2006 | Lange et al. |
| 2006/0264577 | A1 | 11/2006 | Faust et al. |
| 2007/0155908 | A1 | 7/2007 | Stokes et al. |
| 2007/0155910 | A1 | 7/2007 | Stokes |
| 2007/0155911 | A1 | 7/2007 | Stokes et al. |
| 2009/0247716 | A1 | 10/2009 | Stokes et al. |
| 2009/0258803 | A1 | 10/2009 | Harrison et al. |
| 2009/0318624 | A1 | 12/2009 | Storey et al. |
| 2010/0099835 | A1 | 4/2010 | Stokes |
| 2010/0184918 | A1 | 7/2010 | Storey et al. |
| 2010/0249001 | A1 | 9/2010 | Storey et al. |
| 2011/0028681 | A1 | 2/2011 | Storey et al. |
| 2011/0306738 | A1* | 12/2011 | Stokes et al. ............... 526/79 |
| 2011/0306745 | A1 | 12/2011 | Storey et al. |
| 2013/0012662 | A1 | 1/2013 | Stokes et al. |

FOREIGN PATENT DOCUMENTS

| | | |
|---|---|---|
| DE | 253827 | 2/1988 |
| DE | 262028 | 11/1988 |
| DE | 262233 | 11/1988 |
| DE | 266104 | 3/1989 |
| DE | 282697 | 9/1990 |
| DE | 296283 | 11/1991 |
| DE | 296284 | 11/1991 |
| DE | 296285 | 11/1991 |
| DE | 296286 | 11/1991 |
| EP | 206756 | 12/1986 |
| EP | 255181 | 2/1988 |
| EP | 342792 | 11/1989 |
| EP | 397081 | 5/1990 |
| EP | 400844 | 5/1990 |
| EP | 341012 | 12/1992 |
| EP | 959096 | 11/1999 |
| EP | 1209170 | 5/2002 |
| EP | 1225186 | 7/2002 |
| EP | 1489109 | 12/2004 |
| GB | 1159368 | 4/1987 |
| GB | 2184738 | 7/1987 |
| JP | 03287605 | 12/1991 |
| JP | 4-020501 | 1/1992 |
| JP | 5-186513 | 7/1993 |
| JP | 2001172567 A | 6/2001 |
| SU | 293804 | 1/1971 |
| WO | WO 90/05711 | 5/1990 |
| WO | WO 94/13706 | 6/1994 |
| WO | WO 97/19962 | 6/1997 |
| WO | WO 99/09074 | 2/1999 |
| WO | WO 00/75202 | 12/2000 |
| WO | WO 03/106390 | 12/2003 |
| WO | WO 2004/048215 | 6/2004 |
| WO | WO 2006/110647 | 10/2006 |
| WO | WO 2013/009592 | 1/2013 |

OTHER PUBLICATIONS

Bezumnova et al., "Reaction of 2-Mercaptobenzothiazole with Ethylenic Hydrocarbons," Khim. Geterosikl. Soedin. 80:194-196 (1971) (English abstract).

Campa et al., "Addition Des Thiols Sur Les Double Liaisons Des Polybutadienes Hydroxyteleche1iques Radicalaire et Anionique. Etude Des Mecanismes D'Addition par $^1H$ et $^{13}C$ NMR," Makromol. Chem. 182:1415-1428 (1981).

Bin et al., "Study of the Interactions of Organic Sulfides with Active Species in the Cationic Polymerization of 1,3-Pentadiene," Polymer Bulletin 51:343-349 (2004).

Boileau et al., "Reaction of Functionalised Thiols with Oligoisobutenes via Free-Radical Addition. Some New Routes to Thermoplastic Crosslinkable Polymers," European Polymer Journal 39:1395-1404 (2003).

Chang et al., "Initiation of Quasiliving Isobutylene Polymerization via Terpenoid Derivatives," Poster, 2011 International Symposium on Ionic Polymerization, Jul. 10-15, 2011 in Akron, Ohio.

Cirpan et al., "Synthesis and Electroactivity of Pyrrole End-Functionalized Poly(2-Methyl-2-Oxazoline)," European Polymer Journal 37:2225-2229 (2001).

De et al., "Capping Reactions in Cationic Polymerization: Kinetic and Synthetic Utility," Polymer Reprints 46:847-848 (2005).

De et al., "Carbocationic Polymerization of Isobutylene Using Methylaluminum Bromide Coinitiators: Synthesis of Bromoallyl Functional Polyisobutylene," Macromolecules 39:7527-7533 (2006).

De et al., "Relative Reactivity of C4 Olefins Toward the Polyisobutylene Cation," Macromolecules 39:6861-6870 (2006).

Depuy et al., "Electronic Effects in Elimination Reactions, V. The $E_2$ Reaction of β-Phenylethyl Fluorides and Chlorides," J. Am. Chem. Soc. 82:2535-3537 (1960).

Diaz et al., "A Polymer Electrode with Variable Conductivity: Polypyrrole," J.C.S. Chem. Comm. 397-398 (1980).

Diaz et al., "Electrochemical Polymerization of Pyrrole," J.C.S. Chem. Comm. 635-636 (1979).

Evsyukov et al., "Chemical Dehydrohalogenation of Halogen-Containing Polymer," Russian Chemical Reviews 60:373-390 (1991).

Faust et al., "Living Carbocationic Polymerization. XXI. Kinetic and Mechanistic Studies of Isobutylene Polymerization Initiated by Trimethylpentyl Esters of Different Acids," J. Macromol. Sci.—Chem. A27:649-667 (1990).

Faust et al., "Living Carbocationic Polymerization. IV. Living Polymerization of Isobutylene," J. Polym. Sci. Part A Polym. Chem. 25:1847-1869 (1987).

Feldthusen et al., "The Effect of Reaction Conditions on the Chain End Structure and Functionality During Dehydrochlorination of tert-Chlorine-Telechelic Polyisobutylene by Potassium tert-Butoxide," Macromol. Rapid Comm. 19:661-663 (1998).

Fodor et al., "Synthetic Applications of Non-Polymerizable Monomers in Living Carbocationic Polymerizations," Polymer Preprints 35:492-493 (1994).

Fodor et al., "Polyisobutylene-Based Thermoplastic Elastomers. II. Synthesis and Characterization of Poly(p-Methylstyrene-block-Isobutylene-block-p-Methylstyrene) Triblock Copolymers," J.M. S.—Pure Appl. Chem. A32:575-591 (1995).

(56) References Cited

OTHER PUBLICATIONS

Gardini, "The Oxidation of Monocyclic Pyrroles," Adv. Heterocyl. Chem. 15:67-99 (1973).
De La Campa et al., "Addition des thiols sur les souble liaisons des polybutadienes hydroxytelecheliques radicalaire et anionique. Etude des mecanismes d'addition par $^1$H et $^{13}$C NMR," Makromol. Chem. 182:1415-1428 (1981) (English Abstract).
Gorski et al., "Functionalized Polyisobutene by SH-en Addition," Die Angewandte Makromolekulare Chemie 253:51-64 (1997).
Hadjikyriacou et al., "Synthetic Applications of Nonpolymerizable Monomers in Living Cationic Polymerization: Functional Polyisobutylenes by End-quenching," J.M.S.—Pure Appl. Chem. A32:1137-1153 (1995).
Hadjikyriacou et al., "Amphiphilic Block Copolymers by Sequential Living Cationic Polymerization: Synthesis and Characterization of Poly(isobutylene-b-methyl vinyl ether)," Macromolecules 29:5261-5267 (1996).
Hadjikyriacou et al., "Cationic Macromolecular Design and Synthesis Using Furan Derivatives," Macromolecules, 32:6393-6399 (1999).
Hadjikyriacou et al., "Living Coupling Reaction in Living Cationic Polymerization. 3. Coupling Reaction of Living Polyisobutylene Using Bis(furanyl) Derivatives," Macromolecules 33:730-733 (2000).
Hadjikyriacou et al., "Living Coupling Reaction in Living Cationic Polymerization. 4. Synthesis of Telechelic Polyisobutylenes Using Bis-Furanyl Derivatives as Coupling Agents," JMS Pure Appl. Chem. A37:1333-52 (2000).
Hamley, "Block Copolymers," Encyclopedia of Polymer Science and Technology, 457-482 (2003).
Higashihara et al., "Synthesis of Poly(isobutylene-block-methyl methacrylate) by a novel coupling approach," Macromolecules 39:5275-5279 (2006).
Ipatieff et al., "Reaction of Aliphatic Olefins with Thiophenol," J. Am. Chem. Soc. 60:2731-2734 (1938).
Ivan et al., "Living Carbocationic Polymerization. XXX. One-Pot Synthesis of Allyl-Terminated Linear and Tri-Arm Star Polyisobutylenes, and Epoxy- and Hydroxy-Telechelics Therefrom," J. Polym. Sci. Part A: Polym. Chem. 28:89-104 (1990).
Ivan et al., "New Telechelic Polymers and Sequential Copolymers by Polyfunctional Initiator-Transfer Agents (Inifers)," J. Poly. Chem. Ed. 18:3177-3191 (1980).
Kamigaito et al., "Alkoxy-Substituted Titanium(IV) Chlorides as Lewis Acid Activators for Living Cationic Polymerization of Isobutyl Vinyl Ether: Control of Lewis Acidity in the Design of Imitating System," Macromolecules 28:5671-5675 (1995).
Kaszas et al., "Electron Pair Donors in Carbocationic Polymerization. 2. Mechanism of Living Carbocationic Polymerizations and the Role of in Situ and External Electron Pair Donors," Macromolecules 23:3909-3915 (1990).
Kaszas et al., "Electron pair donors in carbocationic polymerization," Polymer Bulletin 20:413-419 (1988).
Keaton, Living Ziegler-Natta Polymerization (2002) http://www.chem.wayne.edu/acs_organic_division/essay_2002/keaton.pdf, retrieved on Oct. 22, 2003.
Keki et al., "Dimethyldioxirane as a New and Effective Oxidation Agent for the Epoxidation of α,ω-Di(isobutenyl)polyisobutylene: A Convenient Synthesis of α,ω-Di(2-Methyl-3-Hydroxypropyl)-Polyisobutylene," J. Poly. Sci. Part A: Poly. Chem. 40:3974-3986 (2002).
Kemp, Synthesis and Characterization of Novel Polyisobutylene-Based Materials: Gradient Block Copolymers, Exo-Olefms via In Situ Quenching, and Carboxylic Acid-Functional Telechelics; Thesis Dissertation, University of Southern Mississippi, 73-118 (2007).
Kennedy et al., "New Telechelic Polymers and Sequential Copolymers by Polyfunctional Initiator-Transfer Agents, (Inifers) 10. Three-Arm Star Telechelic Polyisobutylenes Carrying Chlorine, Olefin or Primary Alcohol Endgroups," Polymer Bulletin 4:67-74 (1981).

Kennedy et al., "Living Carbocationic Polymerization. XXXIX. Isobutylene Polymerization in the Presence of Pyridine and Various Other Electron Donors," J. Macromol. Sci. Chem. A28:197-207 (1991).
Kennedy et al., "New Telechelic polymers and sequential Copolymers by Polyfunctional Initiator Transfer Agents (Inifers) 27 Bisphenol and Trisphenol Polyisobutylenes," Polymer Bulletin 8:563-570 (1982).
Kennedy et al., "New Telechelic Polymers and Sequential Copolymers by Polyfunctional Initiator Transfer Agents (Inifers) V. Synthesis of α-tert-butyl-ω-isopropenylopolyisobutylene and α,ω-Di(isopropenyl)Polyisobutylene," Polymer Bulletin 1:575-580 (1979).
Kennedy et al., "New Telechelic Polymers and Sequential Copolymers by Polyfunctional Initiator-Transfer Agents, I.," Polym. Prepr., Am. Chem. Soc., Div. Polym. Chem. 20:316 (1979).
Kennedy et al., "New Telechelic Polymers and Sequential Copolymers by Polyfunctional Initiator-Transfer Agents, II.," J. Polym. Sci., Polym. Chem. Ed. 18:1523 (1980).
Kennedy et al., "New Telechelic Polymers and Sequential Copolymers by Polyfunctional Initiator-Transfer Agents (Inifers)," Polymer Bulletin 9:27-32 (1983).
Kim et al., "Synthesis and Characterization of Novel Silicon-Functional Polyisobutylenes and Their Applications: Polyisobutylene Brushes on Silicate Substrates via Living Cationic Polymerization," Journal of Macromolecular Science Part A—Pure and Applied Chemistry A40:991-1008 (2003).
Klemm et al., "Untersuchungen zur Thioladdition an Polybutadiene," Angew Makromol. Chem. 207:187-193 (1993) (English Abstract).
Klemm et al., "Unusual Addition by the Thiol-ene Photopolymerization," Polymer Bulletin 28:653-656 (1992).
Koroskenyi et al., "Initiation via Haloboration in Living Cationic Polymerization. 6. A Novel Method for the Synthesis of Primary Amine Functional Polyisobutylenes," Pure Appl. Chem. A36:1879-1893 (1999).
Kwon et al., "Synthesis and Characterization of Poly(isobutylene-b-pivalolactone) Diblock and Poly(pivalolactone-b-isobutylene-b-pivalolactone) Triblock Copolymers," Macromolecules 35:3348-3357 (2002).
Lenz, "Organic Chemistry of Synthetic High Polymers," Section 7.2 Poly(alkylene Sulfides), Interscience Publishers, New York, p. 196, (1967).
Li et al., "Living Carbocationic Sequential Block Copolymerization of Isobutylene with α-Methylstyrene," Macromolecules 28:1383-1389 (1995).
Li et al., "Polyisobutylene Supports—A Non-Polar Hydrocarbon Analog of PEG Supports," Tetrahedron 61:12081-12092 (2005).
Lu et al., "Living Cationic Isomerization Polymerization of Beta-Pinene. 1. Initiation with HCl-2-Chloroethyl Vinyl Ether Adduct/TiCl$_3$(OiPr) in Conjunction with nBu$_4$NCl," Macromolecules 30:22-26 (1997).
Machl et al., "Novel Synthetic Routes to Aminofunctionalized Polyisobutylenes," Polymer Preprints 44:858-859 (2003).
Maenz et al., "Comb-Like Polymers From Macromonomers Based on Low-Molecular Weight Poly(isobutene)s," Angewandte Makromolekulare Chemie 258:69-73 (1998).
Maenz et al., "Investigation of the Structure of Low Molecular Weight Polybutadienes and Epoxides Made Therefrom," Acta Polymerica 47:208-213 (1996).
Maenz et al., "Macromonomers Based on Low-Molecular-Weight Polyisobutenes", Angewandte Makromolekulare Chemie 242:183-197 (1996).
Martinez-Castro et al., "Polyisobutylene Stars and Polyisobutylene-block-poly(tert-butyl methacrylate) Block Copolymers by Site Transformation of Thiophene End-Capped Polyisobutylene Chain Ends," Macromolecules 36:6985-6994 (2003).
Martinez-Castro et al., "Primary Halide-Terminated Polyisobutylene: End-Quenching of Quasiliving Carbocationic Polymerization with N-(ω-Haloalkyl)pyrrole," Macromolecules 42:4963-4971 (Published on Web Jun. 25, 2009).
Mayr et al., "Examination of Models for Carbocationic Polymerization: Influence of Chain Length on Carbocation Reactivities," Macromolecules 29:6110-6113 (1996).

(56) References Cited

OTHER PUBLICATIONS

Mishra et al., "Living Carbocationic Polymerization VIII. Telechelic Polyisobutylenes by the MeO(CH$_3$)$_2$C-p-C$_6$H$_4$—C(CH$_3$)$_2$OMe/BCl$_3$ Initiating System," Polymer Bulletin 17:7-13 (1987).

Mishra et al., "New Telechelic Polymers and Sequential Copolymers by Polyfunctional Initiator Transfer Agents (Inifers) LI. Synthesis and Characterization of Anisole Terminated Polyisobutylenes," Polymer Bulletin 16:47-53 (1986).

Morgan et al., "Sulfonium Ion Adducts from Quasiliving Polyisobutylene and Mono- or Disulfides," Macromolecules 42:2344-2352 (2009).

Morgan et al., "Kinetics and Mechanism of End-Quenching of Quasiliving Polyisobutylene with Sterically Hindered Bases," Macromolecules 44:2438-2443 (2011).

Morgan et al., "Thiol/Ene Photocurable Polymers," J. Polym. Sci. Polym. 15:627 (1977).

Morgan et al., "Sulfonium Ion Adducts from Quasiliving Polyisobutylene and Alkyl Mono- or Disulfides," Polymer Preprints 50:64-65 (2009).

Morgan et al., "Primary Hydroxy-Terminated Polyisobutylene via End-Quenching with a Protected $N$-(ω-Hydroxyalkyl)pyrrole," Macromolecules 43:1329-1340 (Published on Web Jan. 6, 2010).

Nemes et al., "A New Asymmetric-Telechelic Polyisobutylene Prepared by the cis-2-Pinanol/BCl$_3$, Initiating System," Polymer Bulletin 21:293-300 (1989).

Nemes et al., "Oxyethylation and Carbonation of Telechelic Polyisobutylene Anions," Polymer Bulletin 24:187-194 (1990).

Nemes et al., "Macromers by Carbocationic Polymerization," Polymer Bulletin 25:633-640 (1991).

Nielsen et al., "Synthesis of Isobutenyl-Telechelic Polyisobutylene by Functionalization with Isobutenyltrimethylsilane," Polymer 38:2529-2534 (1997).

Nuyken et al., "Novel Sulfur Containing Polymers," Makromol. Chem. Macromol. Symp. 26:313 (1989).

Nuyken et al., "Telechelics via Addition of Dithiols Onto Alkadienes, 1 Radical Mechanism", Makromol. Chem. Rapid Commun. 11:365 (1990).

Nuyken et al., "New Telechelic Polymers and Sequential Copolymers by Polyfunctional Initiator-Transfer Agents (Inifers) 9. A Demonstration of Chain Extension of α,ω-Di(amino)polyisobutylenes," Polymer Bulletin 4:61-65 (1981).

Odian, Principles of Polymerization, 4th ed., Wiley, Chapter 8 (2004).

Percec et al., "New Telechelic Polymers and Sequential Copolymers by Polyfunctional Initiator-Transfer Agents (Inifers) 29. Synthesis of α,ω-di(amino)polyisobutylenes," Polymer Bulletin 9:27-32 (1983 ).

Pernecker et al., "Living Carbocationic Polymerization, XLVI. Living Isobutylene Polymerization Induced by the Common Ion Effect," Polymer Bulletin 26:305-312 (1991).

Puskas et al., "Investigation of the Effect of Epoxide Structure on the Initiation Efficiency in Isobutylene Polymerizations Initiated by Epoxide/TiCl$_4$ Systems," Euro. Polymer Journal 39:2147-2153 (2003).

Puskas et al., "The Nature of the Double Bond in Low Molecular Weight Polyisobutylenes and Polybutene Copolymers," J. Polymer Sci: Symposium No. 56:191-202 (1976).

Rooney, "Synthesis of Phenol-Terminated Polyisobuylene: Competitive Chain Transfer Reactions," J. Appl. Poly. Sci. 25:1365-1372 (1980).

Roth et al., "A Novel Method of the Determination of Propagation Rate Constants: Carbocationic Oligomerization of Isobutylene," Macromolecules 29:6104-6109 (1996).

Sawamoto et al., "End Functionalized Polymers by Living Cationic Polymerization," Macromolecules 20:1-6 (1987).

Schriescheim et al., "Industrial Friedel-Crafts Chemistry: Past and Future," Chemtech 310 (1978).

Serniuk et al., "Study of the Reaction of Buna Rubbers of Aliphatic Mercaptans," J. Am. Chem. Soc. 70:1804 (1948).

Si et al., "Living Carbocationic Polymerization. Narrow Molecular Weight Distribution Polyisobutylenes Prepared by Esters and Ketones as Electron Donors," Polymer Bulletin 33:651-656 (1994).

Simison et al., "End-Quenching of Quasiliving Carbocationic Isobutylene Polymerization with Hindered Bases: Quantitative Formation of Exo-Olefin-Terminated Polyisobutylene," Macromolecules 39:2481-2487 (2006).

Sita et al., "Amidinate-Based Catalysts for Stereoselective Living Ziegler-Natta Polymerizations," Abstracts of Papers of the American Chemical Society 224:U502-U502 (2002).

Stacey et al., Organic Reactions 13:150-208 and 233-233 (1963).

Storey et al., "Mechanistic Role of Lewis Bases and Other Additives in Quasiliving Carbocationic Polymerization of Isobutylene," Macromolecules 34:5416-5432 (2001).

Storey et al., "N-Methylpyrrole-Terminated Polyisobutylene Through End-Quenching of Quasiliving Carbocationic Polymerization," Macromolecules 38:4618-4624 (2005).

Tripathy et al., "Syntheses and Characterization of Polyisobutylene Macromonomers with Methacrylate, Acrylate, Glycidyl Ether, or Vinyl Ether End-Functionality," Macromolecules 42:3958-3964 (2009).

Ummadisetty et al., "Rapid Communication: Quantitative Syntheses of Novel Polyisobutylenes Fitted with Terminal Primary -Br, -OH, -NH$_2$, and Methacrylate Termini," J. Poly. Sci. A Poly. Chem. 46:4236-4242 (2008).

Ummadisetty et al., "Synthesis of Exo-Olefin-Terminated Polyisobutylene by Sulfide/Based Quenching of Quasiliving Polyisobutylene," Polymer Preprints 52:411-412 (2011).

Wallace et al., "Intelligent Polymer Systems," Encyclopedia of Polymer Science and Technology, pp. 231-250 (2004).

Wilczek et al., "Electrophilic Substitution of Organosilicon Compounds," Polymer Bulletin 17:37-43 (1987).

Wollyung et al., "Synthesis and Mass Spectrometry Characterization of Centrally and Terminally Amine-Functionalized Polyisobutylenes," J. Poly. Sci. A Poly. Chem. 43:946-958 (2005).

Zhang et al., "Synthesis of Polyisobutylene With Arylamino Terminal Group by Combination of Cationic Polymerization with Alkylation," Poly. Sci. A. Poly. Chem. 46:936-946 (2008).

Zinger et al., "Timed Release of Chemicals from Polypyrrole Films," J. Am. Chem. Soc. 106:6861-6863 (1984).

Notice of Allowance mailed May 11, 2005, U.S. Appl. No. 10/600,898.

Notice of Allowance mailed May 4, 2009, U.S. Appl. No. 11/186,157.

Final Action mailed Feb. 20, 2009, U.S. Appl. No. 11/186,157.

Office Action mailed Oct. 20, 2008, U.S. Appl. No. 11/186,157.

Office Action mailed Apr. 1, 2008, U.S. Appl. No. 11/186,157.

Notice of Allowance mailed Aug. 6, 2009, U.S. Appl. No. 11/207,264.

Notice of Allowance mailed Dec. 10, 2009, U.S. Appl. No. 11/207,264.

Office Action mailed Nov. 12, 2008, U.S. Appl. No. 11/207,264.

Notice of Allowance mailed Aug. 7, 2009, U.S. Appl. No. 11/207,366.

Notice of Allowance mailed Dec. 15, 2009, U.S. Appl. No. 11/207,366.

Supplemental Notice of Allowance mailed Apr. 2, 2010, U.S. Appl. No. 11/207,366.

Office Action mailed Nov. 12, 2008, U.S. Appl. No. 11/207,366.

Notice of Allowance mailed Jun. 11, 2008, U.S. Appl. No. 11/207,377.

Office Action mailed Jan. 2, 2008, U.S. Appl. No. 11/207,377.

Office Action mailed Mar. 23, 2007, U.S. Appl. No. 11/207,377.

Notice of Allowance mailed Aug. 30, 2010, U.S. Appl. No. 11/356,490.

Notice of Allowance mailed Apr. 28, 2010, U.S. Appl. No. 11/356,490.

Office Action mailed Jan. 8, 2009, U.S. Appl. No. 11/356,490.

Office Action mailed Aug. 31, 2009, U.S. Appl. No. 11/356,490.

Notice of Allowance mailed Dec. 3, 2008, U.S. Appl. No. 11/356,491.

Office Action mailed May 13, 2008, U.S. Appl. No. 11/356,491.

(56) References Cited

OTHER PUBLICATIONS

Notice of Allowance mailed Apr. 15, 2011, U.S. Appl. No. 11/357,562.
Final Office Action mailed Apr. 2, 2010, U.S. Appl. No. 11/357,562.
Office Action mailed Aug. 7, 2009, U.S. Appl. No. 11/357,562.
Office Action mailed Dec. 5, 2008, U.S. Appl. No. 11/357,562.
Notice of Allowance mailed Dec. 14, 2012, U.S. Appl. No. 12/055,281.
Notice of Allowance mailed Nov. 8, 2012, U.S. Appl. No. 12/055,281.
Supplemental Final Office Action and Interview Summary mailed Apr. 29, 2011, U.S. Appl. No. 12/055,281.
Final Office Action mailed Jan. 21, 2011, U.S. Appl. No. 12/055,281.
Office Action mailed Jun. 11, 2010, U.S. Appl. No. 12/055,281.
Notice of Allowance mailed Mar. 22, 2011, U.S. Appl. No. 12/145,460.
Notice of Allowance mailed Jul. 8, 2011, U.S. Appl. No. 12/145,460.
Notice of Allowance mailed Nov. 4, 2011, U.S. Appl. No. 12/256,441.
Notice of Allowance mailed Sep. 10, 2012, U.S. Appl. No. 12/355,664.
Office Action mailed Jan. 19, 2012, U.S. Appl. No. 12/355,664.
Office Action mailed Jun. 25, 2012, U.S. Appl. No. 12/415,829.
Notice of Allowance mailed Nov. 9, 2012, U.S. Appl. No. 12/534,081.
Office Action mailed Sep. 26, 2012, U.S. Appl. No. 12/767,672.
Final Action mailed Feb. 14, 2013, U.S. Appl. No. 12/767,672.
Office Action mailed May 8, 2012, U.S. Appl. No. 12/767,676.
Notice of Allowance mailed Oct. 23, 2012, U.S. Appl. No. 12/767,676.
Office Action mailed May 25, 2012, U.S. Appl. No. 12/813,411.
Notice of Allowance mailed Dec. 12, 2012, U.S. Appl. No. 12/813,411.
Notice of Allowance mailed Mar. 20, 2013, U.S. Appl. No. 12/813,411.
Office Action mailed Oct. 3, 2012, U.S. Appl. No. 12/815,312.
Notice of Allowance mailed Oct. 23, 2012, U.S. Appl. No. 13/396,517.

* cited by examiner

METHODS OF PRODUCING MONO- AND MULTI-FUNCTIONAL POLYMERS FROM TERPENE-BASED INITIATORS

1. FIELD

Provided herein are methods of producing mono- and multi-functional polymers from terpene-based initiators.

2. BACKGROUND

Telechelic polymers are polymers that contain one or more functional groups at the end of the polymer. These functional groups are reactive to other molecules, thereby allowing derivatization of the polymer at its chain ends. Telechelic polymers serve as useful intermediates for the preparation of a diverse range of desirable polymeric products, including high performance polymers such as, but not limited to, fuel or lube oil additives, network polymers, star-branched polymers, and block co-polymers.

Polymers that are multifunctional, i.e., have more than one functional group, can serve as starting materials and intermediates for complex cross-linked networks of polymers, from which high performance dispersants can be derived.

In general, the known methods of synthesizing telechelic polymers rely on post-polymerization functionalization techniques. For example, a monomer is first polymerized to form an initial polymer product. To form the telechelic polymer, this initial polymer product must be subjected to a subsequent post-polymerization reaction to install the reactive functional group. Such methods are inefficient and costly.

The known methods of synthesizing multifunctional polymers are also inefficient and costly, and often require the use of initiators that are prohibitively expensive to purchase and/or laborious and expensive to synthesize.

Thus, there is a need for efficient, direct and less costly synthetic processes for synthesizing telechelic polymers, such as those that are multifunctional.

3. SUMMARY

Provided herein are methods of producing telechelic polymers comprising contacting a compound of formula I:

$$\text{D-(L-T)}_n \qquad \text{I}$$

with a Lewis acid in the presence of one or more monomers, wherein:
D is hydrocarbyl;
each L, independently, is:

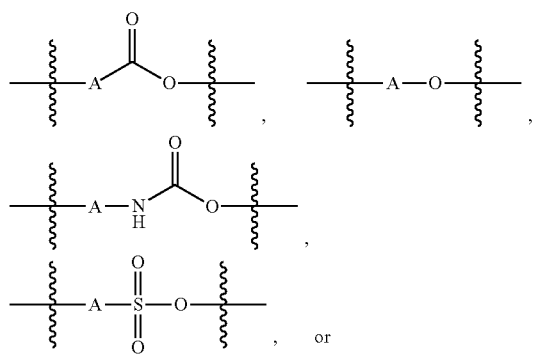

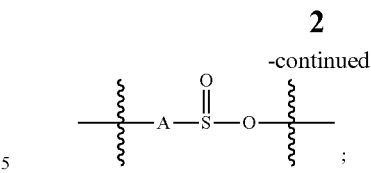

wherein each A, independently, is hydrocarbylene or a bond; and
the oxygen is bonded to T;
each T, independently, is a terpene;
wherein at least one of the tertiary carbons of the terpene contain a leaving group; and
each n, independently, is an integer from 1-6.

Provided herein are also methods for producing telechelic polymers comprising contacting a compound of formula VIII:

$$\text{HO-T-(P-E)}_s \qquad \text{VIII}$$

with a compound of formula IX:

$$\text{D-(L}^1\text{)}_n \qquad \text{IX}$$

wherein:
D is hydrocarbyl;
each T, independently, is a terpene;
each P, independently, is a polyolefin group;
each E, independently, is an end-cap group;
each $L^1$, independently, is:

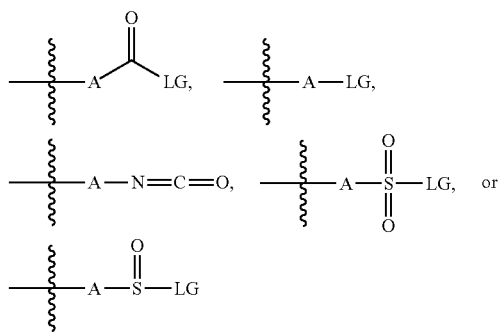

wherein each A, independently, is hydrocarbylene or a bond; and
LG is a leaving group;
n is an integer from 1-6; and
s is an integer from 1-2.

Provided herein are also compounds of formula VII:

$$(\text{E—T—L})_m\text{—D—(L—T—(P—E)}_s)_n \qquad \text{VII}$$

wherein:
D is hydrocarbyl;
each L, independently, is:

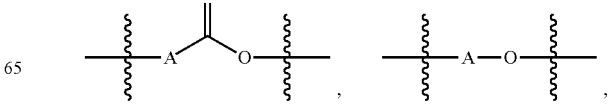

-continued

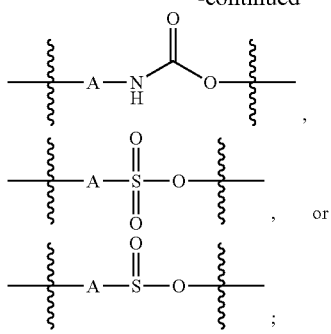

wherein each A, independently, is hydrocarbylene or a bond; and
the oxygen is bonded to T;
each T, independently, is a terpene;
each P, independently, is a polyolefin group;
each E, independently, is an end-cap group;
n and m are integers, wherein
 (1) the sum of n and m is 1 to 6; and
 (2) n is at least 1; and
each s, independently, is an integer from 1-2.

Provided herein are also compounds of formula X:

   X wherein:
D is hydrocarbyl;
each L, independently, is:

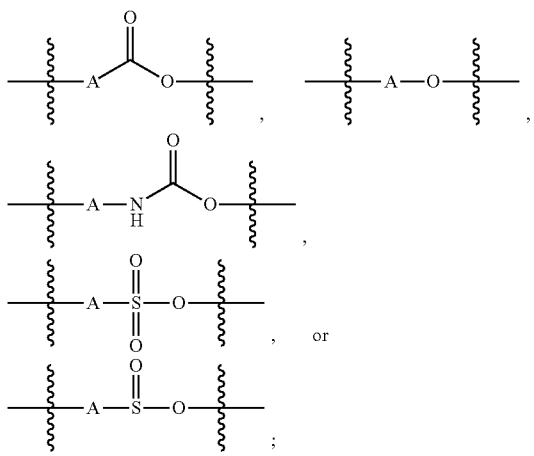

wherein each A, independently, is hydrocarbylene or a bond; and
the oxygen is bonded to T;
each $L^1$, independently, is:

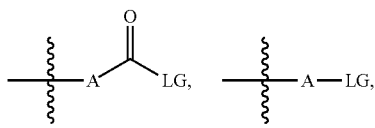

-continued

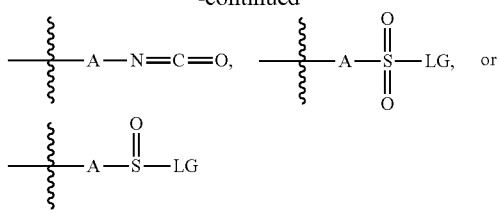

wherein each A, independently, is hydrocarbylene or a bond; and
LG is a leaving group
each T, independently, is a terpene;
each P, independently, is a polyolefin group;
each E, independently, is an end-cap group;
n and m are integers, wherein:
 (1) the sum of m and n is 2-6; and
 (2) m is at least 1; and
 (3) n is at least 1; and
each s, independently, is an integer from 1-2.

4. DETAILED DESCRIPTION

(a) Definitions

Unless defined otherwise, all technical and scientific terms used herein have the same meaning as commonly understood by one of ordinary skill in the art. In the event that there are a plurality of definitions for a term used herein, the definitions provided in this section prevail unless stated otherwise.

As used herein, "about" refers to up to plus or minus 10% of the indicated number. For example, "about 25° C." refers to 22.5° C. to 27.5° C. In some embodiments, about refers to up to plus or minus 9, 8, 7, 6, 5, 4, 3, 2, or 1% of the indicated number. When only integer values are possible, "about" refers to up to plus or minus 10% rounded to the nearest integer number. For example, "about 9 carbons" refers to 8-11 carbons.

As used herein, "alkaryl" refers to a uni-valent aryl group substituted with at least one alkyl, alkenyl, or alkynyl group.

As used herein, "alkenyl" refers to a uni-valent hydrocarbon group of 2 to about 20 carbons, wherein the chain or group contains one or more double bonds. In some embodiments, the alkenyl group contains 2 to about 15 carbons. In some embodiments, the alkenyl group contains 2 to about 10 carbons. In some embodiments, the alkenyl group contains 2 to about 8 carbons. In some embodiments, the alkenyl group contains 2 to about 6 carbons. In some embodiments, the alkenyl group contains 2 to 3 carbons. In some embodiments, the alkenyl group is an allyl group. In some embodiments, the alkenyl group contains one or more double bonds that are conjugated to another unsaturated group. In some embodiments, the alkenyl group is substituted.

As used herein, "alkyl" refers to a uni-valent hydrocarbon group of about 1 to about 20 carbons. In some embodiments, the alkyl group contains about 1 to about 15 carbons. In some embodiments, the alkyl group contains about 1 to about 10 carbons. In some embodiments, the alkyl group contains about 1 to about 8 carbons. In some embodiments, the alkyl group contains about 1 to about 6 carbons. In some embodiments, the alkyl group contains about 1 to about 3 carbons. In some embodiments, the alkyl group contains 1 to 2 carbons. In some embodiments, the alkyl group is primary. In some embodiments, the alkyl group is secondary. In some embodiments, the alkyl group is tertiary. In some embodiments, the alkyl group is methyl, ethyl, n-propyl, isopropyl, isobutyl, n-butyl, sec-butyl, tert-butyl, isopentyl, neopentyl, tert-pentyl, or isohexyl. In some embodiments, the alkyl group is methyl, ethyl, n-propyl, or isopropyl. In some embodiments, the alkyl group is methyl. In some embodiments, the alkyl group is tert-butyl. In some embodiments, the alkyl group is a straight hydrocarbon chain. In some embodiments, the alkyl group is a branched hydrocarbon chain. In some embodiments, the alkyl group is cyclic. In some embodiments, the alkyl group is substituted. In some embodiments, the cyclic alkyl group, i.e., cycloalkyl, has about 3 to about 10 carbons. In some embodiments, the alkyl group is substituted. In some embodiments, the cyclic alkyl group, i.e., cycloalkyl, has about 3 to about 6 carbons. In some embodiments, the cyclic alkyl group is cycloalkyl or cyclopentyl.

As used herein, "alkyl aluminum halide" refers to a compound of formula $R_nAlX_3$-n, wherein n is 1, 1.5, or 2; R is an alkyl group; and X is a halogen, and mixtures thereof.

As used herein, "alkynyl" refers to a uni-valent hydrocarbon group of 2 to about 20 carbons, wherein the chain contains one or more triple bonds. In some embodiments, the alkynyl group contains 2 to about 15 carbons. In some embodiments, the alkynyl group contains 2 to about 10 carbons. In some embodiments, the alkynyl group contains 2 to about 8 carbons. In some embodiments, the alkynyl group contains 2 to about 6 carbons. In some embodiments, the alkynyl group contains 2 to 3 carbons. In some embodiments, the alkynyl group is a propargyl group. In some embodiments, the alkynyl group contains one or more triple bonds that are conjugated to another unsaturated group. In some embodiments, the alkynyl group is substituted.

As used herein, "aralkyl" refers to a uni-valent alkyl, alkenyl, or alkynyl group substituted with at least one aryl group.

As used herein, "aryl" refers to a uni-valent monocyclic or multicyclic aromatic group containing from 6 to about 30 carbons. In some embodiments, the aryl group is monocyclic. In some embodiments, the aryl group contains 6 to about 15 carbons. In some embodiments, the aryl group contains 6 to about 10 carbons. In some embodiments, the aryl group is fluorenyl, phenyl, or naphthyl. In some embodiments, the aryl group is phenyl. In some embodiments, the aryl is substituted. In some embodiments, the aryl does not contain heteroatoms.

As used herein, "common ion salt" refers to an ionic salt that is optionally added to a reaction performed under quasiliving carbocationic polymerization conditions to prevent dissociation of the propagating carbenium ion and counter-ion pairs.

As used herein, "common ion salt precursor" refers to an ionic salt that is optionally added to a reaction performed under quasiliving carbocationic polymerization conditions, wherein the ionic salt generates counter-anions that are identical to those of the propagating chain ends, via in situ reaction with a Lewis acid.

As used herein, "contacting" refers to bringing two or more compounds into physical contact with each other. In some embodiments, two or more compounds react with each other when contacted. Contacting, in some embodiments, is performed by adding the compounds to a diluent.

As used herein, "electron donor" refers to a molecule that is capable of donating a pair of electrons to another molecule, e.g., acting as a Lewis base.

As used herein, "end-cap group" refers to a substituent that is bonded to a terminal end of a polymer. In some embodiments, the end-cap group may serve as a site of reactivity under suitable reaction conditions, thereby allowing derivatization of the polymer at its terminal end.

As used herein, "hydrocarbyl" refers to a monovalent hydrocarbon group. As used herein, "hydrocarbylene" refers to a divalent hydrocarbon group. The hydrocarbyl and hydrocarbylene may be optionally substituted. In some embodiments, the hydrocarbyl or hydrocarbylene is not substituted.

As used herein, "initiator" refers to a compound that provides a carbocation or its reactive equivalent.

As used herein, "intermediate" refers to a compound which may, in some embodiments, be formed during a chemical reaction, e.g., polymerization reaction, or over the course of a chemical synthesis route. In some embodiments, the intermediate is ionic. In some embodiments, the intermediate is cationic.

As used herein, "leaving group" refers to a substituent that is capable of dissociating from the atom to which the leaving group is attached. In some embodiments, the leaving group is capable of dissociating under the reaction conditions, e.g., polymerization conditions used in the methods described herein. In some embodiments, the leaving group is attached to a secondary or tertiary carbon, and the dissociation of the leaving group allows the formation of a secondary or tertiary carbocation, or their reactive equivalent. In some embodiments, the leaving group dissociates when contacted with a Lewis acid. In some embodiments, the leaving group is bonded to a carbonyl carbon and dissociates following addition of a nucleophile to said carbonyl. In some embodiments, the leaving group is a halide. In some embodiments, the leaving group is a pseudohalide. In some embodiments, the leaving group is carboxylate, e.g., acetate.

As used herein, "Lewis acid" refers to a chemical entity that is capable of accepting a pair of electrons.

As used herein, "monomer" refers to a compound that is capable of forming one of the two or more divalent molecules that are contained in a polymer. In some embodiments, the monomer is an olefin. In some embodiments, the monomer is capable of reacting with a carbocation to form another carbocation. In some embodiments, the monomer is isobutene.

As used herein, "polyisobutylene group" refers to a polyolefin group comprising at least 2 isobutylene monomer units. In some embodiments, the polyisobutylene group is

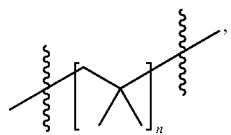

wherein n is an integer from about 10 to about 20000. In some embodiments, n is about 10 to about 15,000. In some embodiments, n is about 10 to about 10,000. In some embodiments, n is about 10 to about 5,000. In some embodiments, n is about 10 to about 2,000. In further embodiments, n is about 10 to about 1,000. In further embodiments, n is about 10 to about 500. In further embodiments, n is about 10 to about 250. In further embodiments, n is about 10 to about 100. In further embodiments, n is about 10 to about 50.

As used herein, "polyolefin" refers to a polymer that comprises at least two olefin monomer units. In some embodiments, the polyolefin has a molecular weight from about 300 to in excess of a million g/mol. In some embodiments, the polyolefin has a molecular weight of from about 200 to 10,000 g/mol. In some embodiments, the polyolefin has a molecular weight of from about 1,000 to 5,000 g/mol. In some embodiments, the polyolefin has a molecular weight of from about 2,000 to 3,000 g/mol. In some embodiments, the polyolefin has a molecular weight of from about 100,000 to 1,000,000 g/mol. In some embodiments, the polyolefin has a molecular weight greater than 200 g/mol. In some embodiments, the polyolefin has a molecular weight greater than 400 g/mol. In some embodiments, the polyolefin has a molecular weight greater than 600 g/mol. In some embodiments, the polyolefin has a molecular weight greater than 800 g/mol. In some embodiments, the polyolefin has a molecular weight greater than 1,000 g/mol. In some embodiments, the polyolefin has a molecular weight greater than 5,000 g/mol. In some embodiments, the polyolefin has a molecular weight greater than 10,000 g/mol. In some embodiments, the polyolefin has a molecular weight greater than 100,000 g/mol. In some embodiments, the polyolefin has a molecular weight greater than 500,000 g/mol. In some embodiments, the polyolefin has a molecular weight greater than 1,000,000 g/mol.

As used herein, polyolefin group refers to a divalent polyolefin.

As used herein, "pseudohalide" refers to a substituent that resembles the reactivity or properties of a halide substituent, for example, cyano, azido, cyanate, thiocyanate, or isothiocyanate. The pseudohalide, in addition to being a substituent, may exist as an anion, e.g., resulting from a pseudohalide substituent dissociating from the atom to which it is bonded.

As used herein, "quenching agent" refers to a compound that reacts with a polymer or ionized polymer and causes the formation of a functional group to form a telechelic polymer. In some embodiments, the quenching agent reacts with a cationic polymer to form a telechelic polyolefin. In some embodiments, the quenching agent end-caps the growing polymer. In some embodiments, the quenching agent reacts with the growing polymer to form an olefin-terminated polymer.

As used herein, "reacting" refers to contacting two or more compounds with each other, wherein at least one of said two or more compounds is chemically transformed into a different compound.

As used herein, "substituted" refers to the presence of one or more substituents. In some embodiments, one substituent is present. As used herein, substituent refers to a monovalent atom or monovalent group of bonded atoms that is capable of forming a stable bond with the molecule to which the substituent is attached.

As used herein, a "terpene" is a hydrocarbon compound that contains two or more 5-carbon units, thus containing carbon atoms in multiples of five (starting at ten), e.g., 10, 15, 20, or 25 carbon atoms. A terpene may, for example, be a monoterpene (10-carbon terpene), sesquiterpene (15-carbon terpene), diterpene (20-carbon terpene), or triterpene (30-carbon terpene). The 5-carbon units are often referred to as isoprene units and are monovalent or multivalent molecules having the following possible structures:

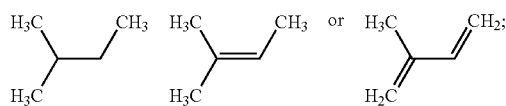

wherein one or more of the hydrogen atoms are replaced with a bond. Certain carbon atoms of an isoprene unit may be categorized as a "head carbon" or "tail carbon" as shown below.

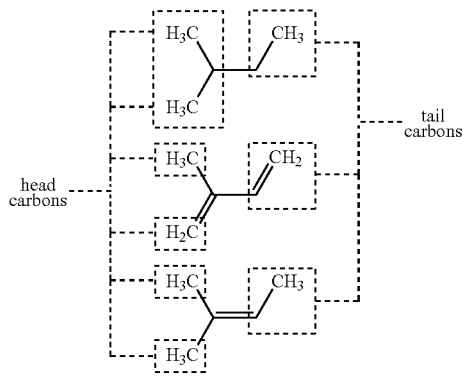

For a given terpene, each individual isoprene unit may be linked to an adjacent isoprene unit at any carbon. For example, adjacent isoprene units may be linked tail to head, tail to tail, or head to head. Furthermore, at least two isoprene units of a terpene may be linked in such a manner so as to form a cyclic membered ring, including for example, 5- or 6-membered rings. Examples include, but are not limited to, citronellol and β-pinene. The carbons of the terpenes may optionally be bonded to monovalent substituents or oxo groups. Such substituents include, but are not limited to, halo, —OC(O)R$^A$, —OR$^A$, —NC, —NCO, —OCN, —SH, —SR$^A$, —S(O)R$^A$, —S(O)$_2$R$^A$, —SCN, —NO$_2$, or —OS(O)$_2$R$^A$, wherein R$^A$ is hydrocarbyl, e.g., alkyl, alkenyl, or alkynyl. In some embodiments, the terpene is not substituted. The terpene may also contain one or more stereocenters. Further examples of terpenes include, but are not limited to:

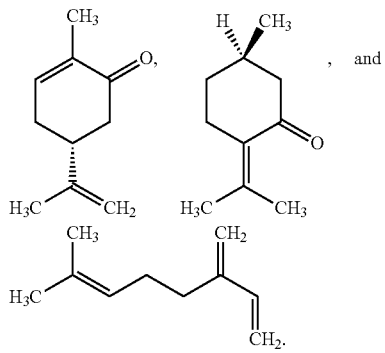

When used in to describe a chemical moiety, "terpene" refers to a mono or divalent terpene.

As used herein, "terpenoid" refers to a terpene that is substituted with one or more hydroxyl groups. In some embodiments, the terpenoid is substituted with one hydroxyl group. In some embodiments, the terpenoid contains a hydroxyl group bonded to a primary carbon. In some embodiments, the terpenoid contains one hydroxyl group, wherein the one hydroxyl group is bonded to a primary carbon.

As used herein, "tertiary carbon" refers to carbon having three carbons bonded to it. A secondary carbon refers to a carbon having two carbons bonded to it. A primary carbon refers to a carbon having one carbon bonded to it.

It is to be understood that the compounds or structures provided herein may contain one or more chiral centers. Such chiral centers may be either the (R) or (S) configuration, or may be a mixture thereof. Thus, the compounds provided herein may be enantiomerically pure, or be stereoisomeric or diastereomeric mixtures. For a compound containing one or more double bonds, the compound may exist as the corresponding cis, trans, E, or Z isomer, or a mixture thereof.

For the structures depicted herein, it is to be understood that when a substituent bond is not directly connected on a particular carbon, the substituent may be bonded at any carbon atom in the carbon skeleton. For example, for the following structure:

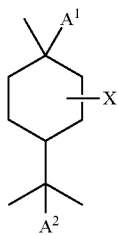

it is to be understood that, unless stated otherwise herein, X may be bonded to any of the carbons on the depicted skeleton, including for example:

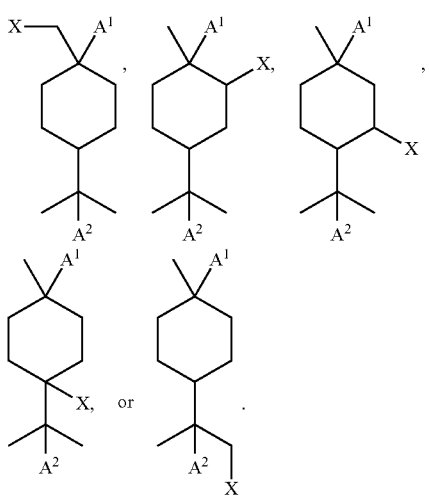

(b) Methods of Producing Mono- and Multi-Functional Telechelic Polymers from Compounds of Formula I Provided herein are methods for preparing a telechelic polyolefin comprising contacting a compound of formula I:

$$D\text{-}(\text{-}L\text{-}T)_n \qquad I$$

with a Lewis acid in the presence of one or more monomers, wherein:

D is hydrocarbyl;

each L, independently, is:

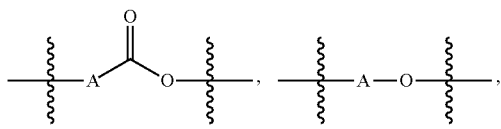

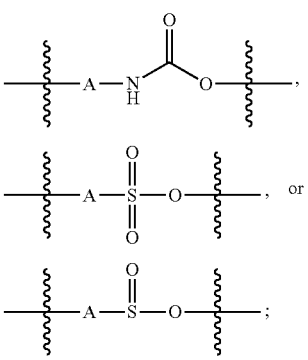

wherein each A, independently, is hydrocarbylene or a bond; and the oxygen is bonded to T;

each T, independently, is a terpene;

wherein at least one of the tertiary carbons of the terpene contain a leaving group; and each n, independently, is an integer from 1-6.

Also provided herein are the telechelic polymers produced by the method above.

Without being bound to any theory, in some embodiments, the compound of formula I ionizes or reacts with the Lewis acid to form an intermediate, which in some embodiments, subsequently reacts with one or more monomers. In some embodiments, the compound of formula I ionizes or reacts with the Lewis acid to become a carbocation or its reactive equivalent. In some embodiments, the Lewis acid causes dissociation of the leaving group on a tertiary carbon of the compound of formula I.

In some embodiments, the method further comprises adding one or more quenching agents. The quenching agents, in certain embodiments, effect the installation of an end-group on the polymer.

In some embodiments, the method further comprises adding one or more terminators.

In some embodiments, the method is performed in the presence of one or more electron donors.

In some embodiments, the method is performed in the presence of one or more common ion salts or common ion salt precursors.

In some embodiments, the method is performed in the presence of a diluent.

When n is greater than 1 and the compound of formula I contains more than one site for initiation, some or all of the sites may initiate polymerization.

In some embodiments, the compounds of formula I are contacted with a Lewis acid and one or more monomers to form compounds of formula VII:

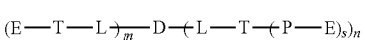

wherein:

D is hydrocarbyl;

each L, independently, is:

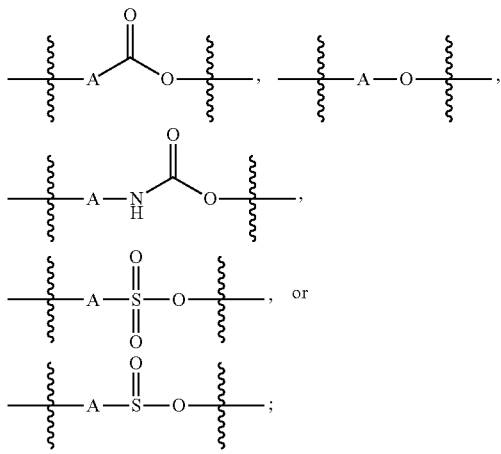

wherein each A, independently, is hydrocarbylene or a bond; and
the oxygen is bonded to T;
each T, independently, is a terpene;
each P, independently, is a polyolefin group;
each E, independently, is an end-cap group;
n and m are integers, wherein
  (1) the sum of n and m is 1 to 6; and
  (2) n is at least 1; and
each s, independently, is an integer from 1-2.

In some embodiments, the polydispersity index of the telechelic polymer produced is less than 2.5, less than 2.4, less than 2.3, less than 2.2, less than 2.0, less than 1.9, less than 1.8, less than 1.7, less than 1.6, less than 1.5, less than 1.4, less than 1.3, less than 1.2, or less than 1.1.

In some embodiments, the molecular weight of the telechelic polymer produced is about 1000, about 2000, about 3000, about 4000, about 5000, about 6000, about 7000, about 8000, about 9000, about 10000, about 20000, about 30000, about 40000, about 50000, about 60000, about 70000, about 80000, about 90000, or about 100000 g/mol.

(i) Initiators: Compounds of Formula I

The initiators used in the methods described herein are compounds of formula I:

        I wherein:
D is hydrocarbyl;
each L, independently, is:

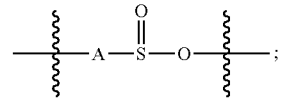

wherein each A, independently, is hydrocarbylene or a bond; and
the oxygen is bonded to T;
each T, independently, is a terpene;
wherein at least one of the tertiary carbons of the terpene contain a leaving group; and
each n, independently, is an integer from 1-6.

In some embodiments, D is hydrocarbyl of 1-25 carbons. In some embodiments, D is hydrocarbyl of 1-20 carbons. In some embodiments, D is hydrocarbyl of 1-15 carbons. In some embodiments, D is hydrocarbyl of 1-10 carbons. In some embodiments, D is hydrocarbyl of 1-6 carbons.

In some embodiments, D is alkyl, alkaryl, or aralkyl. In some embodiments, D is alkyl of 1-15 carbons. In some embodiments, D is alkyl of 1-10 carbons. In some embodiments, D is alkyl of 1-6 carbons. In some embodiments, D is alkaryl of 7-20 carbons. In some embodiments, D is alkaryl of 7-15 carbons. In some embodiments, D is aralkyl of 7-20 carbons. In some embodiments, D is aralkyl of 7-15 carbons In some embodiments, n is 1 and D is:

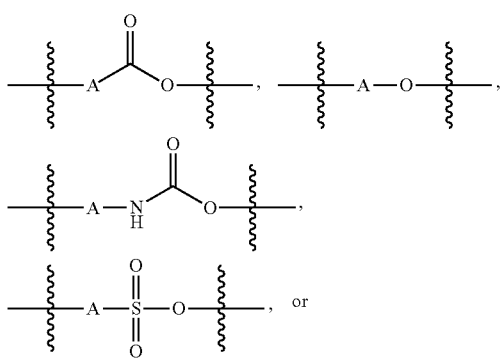

In some embodiments, n is 2 and D is:

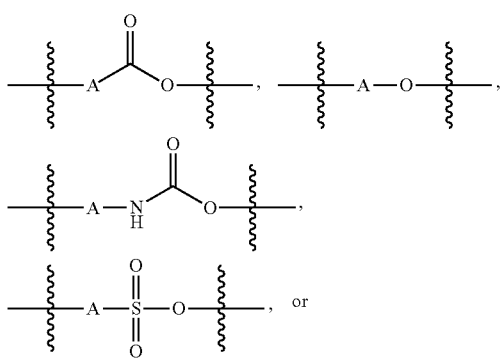

In some embodiments, n is 3 and D is:

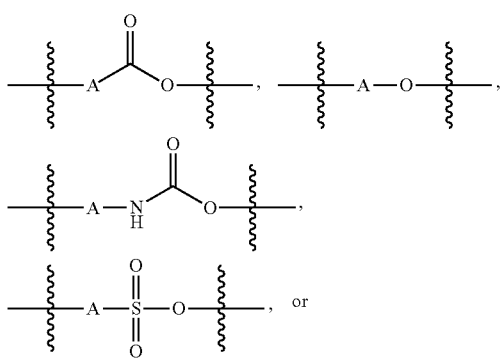

wherein $R^x$ is H or hydrocarbyl.
In some embodiments D is $Z(Y)_r$; wherein:
Y, independently, is aryl;
Z is hydrocarbyl;
L is bonded to a Y of the of $Z(Y)_r$; and
r is an integer from 1 to 3.

In some embodiments, Z is hydrocarbyl of 1 to 10 carbons. In some embodiments, Z is hydrocarbyl of 1 to 6 carbons. In some embodiments, Z is alkyl. In some embodiments, Z is cycloalkyl.

In some embodiments, r is 1 to 2. In some embodiments, r is 1.

In some embodiments, D is $Y_p$, wherein Y is aryl and p is an integer from 1-4.

In some embodiments, p is 1 to 2. In some embodiments, p is 1.

In some embodiments, for the $Y_p$ or $Z(Y)_r$, Y is aryl, wherein the aryl is monocyclic, bicyclic, or tricyclic. In certain embodiments, the aryl is monocyclic. In some embodiments, the aryl does not contain a heteroatom. In some embodiments, the aryl contains 6 to 12 carbons. In some embodiments, the aryl is phenyl.

In some embodiments, L is

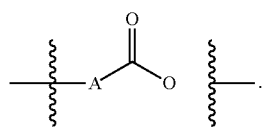

In some embodiments, L is

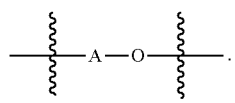

In some embodiments, A is hydrocarbyl of 1 to 10, 1 to 6, or 1 to 3 carbons.

In some embodiments, A is a bond.

In certain embodiments, L is

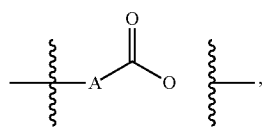

wherein A is alkyl.

In certain embodiments, L is

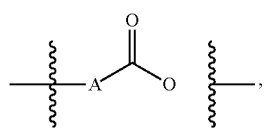

wherein A is alkyl of 1-10 carbons.

In certain embodiments, L is

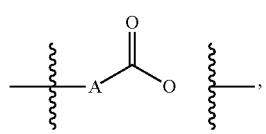

wherein A is alkyl of 1-6 carbons.

In certain embodiments, L is

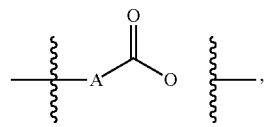

wherein A is alkyl of 1-3 carbons.

In some embodiments, L is

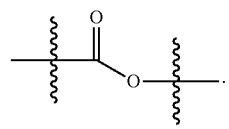 [SMILES: *OC(*)=O]

In certain embodiments, L is

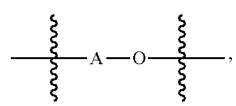

wherein A is alkyl.

In certain embodiments, L is

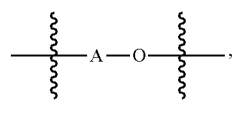

wherein A is alkyl of 1-10 carbons.

In certain embodiments, L is

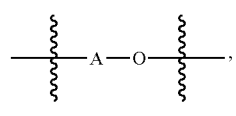

wherein A is alkyl of 1-6 carbons.

In certain embodiments, L is

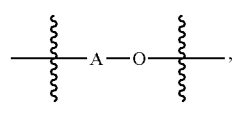

wherein A is alkyl of 1-3 carbons.

In some embodiments, L is

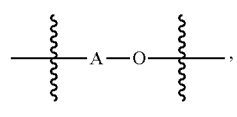

wherein A is alkyl, wherein the alkyl is not branched or cyclic.

A leaving group is a substituent that is capable of dissociating from the atom to which the leaving group is attached. The leaving groups of the initiators described herein, in certain embodiments, are capable of dissociating under the reaction conditions used in the methods described herein. In some embodiments, the dissociation of the leaving group from a tertiary carbon allows the formation of a tertiary carbocation, or its reactive equivalent. In some embodiments, the leaving group dissociates when contacted with a Lewis acid. In some embodiments, the leaving group is —Cl, —Br, —I, —$OR^A$, —$OC(O)R^A$, TsOH, or OMs, wherein $R^A$ is hydrocarbyl, e.g., alkyl. In some embodiments, the leaving group is —Cl, —Br, or —I. In some embodiments, the leaving group is —Cl. In polymerization reactions, when two or more leaving groups are present on the initiator, monomers may react at any of the two or more corresponding tertiary carbons and, thus, propagation may occur at two or more sites during the course of a single polymerization reaction.

In some embodiments, one tertiary carbon of the terpene contains a leaving group.

In some embodiments, the terpene is a monoterpene, sesquiterpene, or triterpene. In some embodiments, the terpene is a monoterpene.

In some embodiments, the terpene is not substituted, except for the at least one of the tertiary carbons that contains a leaving group.

In some embodiments, T is substituted with 1 to 3 substituents in addition to the at least one of the tertiary carbons that contains a leaving group.

In some embodiments, T is:

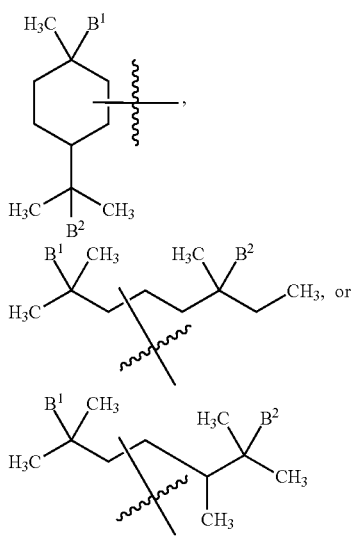

wherein $B^1$ and $B^2$ are each, independently, a leaving group or —H; and
wherein at least one of $B^1$ and $B^2$ is a leaving group.

In some embodiments, when T is:

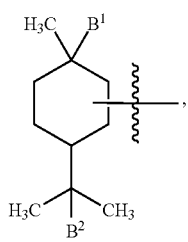

T is substituted with one or more substituents. In some embodiments, T is substituted with 1-3 substituents.

In some embodiments, the terpene is not cyclic.
In some embodiments, one of $B^1$ or $B^2$ is —H.
In some embodiments, L is bonded to a primary carbon of T.

In some embodiments, T is:

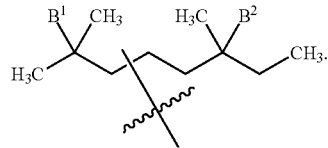

In some embodiments, T is:

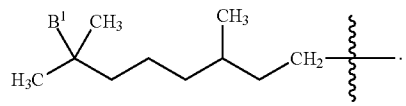

In some embodiments, n is an integer from 1-4. In some embodiments, n is an integer from 1-3. In some embodiments, n is an integer from 1-2. In some embodiments, n is 1.

In some embodiments, the compound of formula I is a compound of formula I(a):

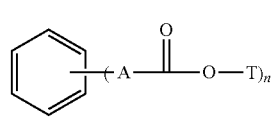

I(a)

wherein each A, independently, is hydrocarbylene or a bond; each T, independently, is a terpene, wherein one or more of the tertiary carbons of the terpene contains a leaving group; and
n is an integer from 1-6.

In certain embodiments, the compound of formula I(a) is:

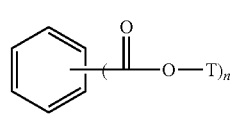

wherein n is an integer from 1-6. In certain embodiments, n is an integer from 1 to 4.

In some embodiments, the compound of formula I(a) is:

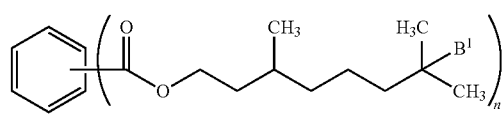

wherein $B^1$ is a leaving group and n is an integer from 1-6. In certain embodiments, n is an integer from 1 to 4. In certain embodiments, the leaving group of the terpene is —Cl, —Br, —I, —$OR^A$, —$OCOR^A$, -TsOH, or —OMs, wherein $R^A$ is hydrocarbyl, e.g., alkyl. In certain embodiments, the leaving group is —Cl, —Br, or —I. In some embodiments, the leaving group is —Cl.

(ii) Synthesis of Initiators

The compounds of formula I may, in some embodiments, be prepared using synthetic techniques that are known to those of ordinary skill in the art. In some embodiments, commercially or readily obtainable starting materials are converted to the compounds of formula I using known synthetic techniques, including, e.g., those described in Richard C. Larock, Comprehensive Organic Transformations: A Guide to Functional Group Preparations (2nd ed. 1999) and/or Michael B. Smith & Jerry March, March's Advanced Organic Chemistry, Reactions, Mechanisms, and Structure (5th ed. 2001), the entireties of which are incorporated herein by reference.

In some embodiments, compounds of formula I are produced from compounds of formula II:

   II wherein L, D, and n are as defined for the compound of formula I herein, and $T^1$ is a terpene containing at least one carbon-carbon double bond.

In some embodiments, the compounds of formula II are contacted with H—X to form the compounds of formula I, wherein in X is a halide. In some embodiments, H—X is HCl.

For example, as illustrated below, compounds of formula II(a) may be contacted with H—Cl to form a compound of formula I(b):

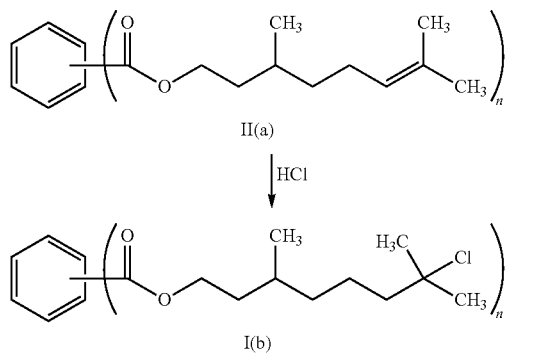

wherein n is an integer from 1 to 5.

Compounds of formula II, in some embodiments, can be produced from terpenoids.

For example, compounds of formula II(b) may be produced from terpenoids:

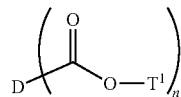   II(b)

wherein D, $T^1$, and n are as defined for the compound of formula II herein.

In certain embodiments, compounds of formula II(b) may be produced from terpenoids and compounds of formula III:

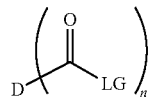   III wherein D and n is as defined for compounds of formula I herein, and LG is a leaving group In some embodiments, the leaving group dissociates when contacted with a Lewis acid. In some embodiments, the leaving group is —Cl, —Br, —I, —OH, —$OR^N$, —$OC(O)R^N$, —$OC(O)OR^N$, —$OC(O)NR^N$, —$OS(O)_2NR^N$, —OMs, —OTs, or —$OP(O)(OR^N)_2$, wherein $R^N$ is hydrocarbyl. In some embodiments, $R^N$ is alkyl or aryl. In some embodiments, $R^N$ is alkyl of 1 to 6 carbons. In some embodiments, the alkyl is methyl. In some embodiments, the leaving group is —Cl or —Br.

In certain embodiments, the compound of formula II(b) is produced by contacting a compound of formula III with a terpenoid in the presence of base. In some embodiments, the base is an amine, pyridine, or pyridine derivative. In some embodiments, the base is triethylamine.

In some embodiments, the terpenoid is a compound of formula IV, V, or VI:

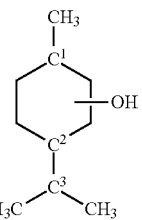   IV

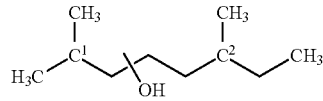   V

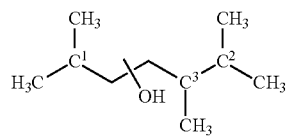   VI wherein $C^1$, $C^2$, and $C^3$ are carbons and at least one of $C^1$, $C^2$, and $C^3$ is bonded to one of the carbon atoms to which it is attached by a double bond.

In some embodiments, the terpenoid is:

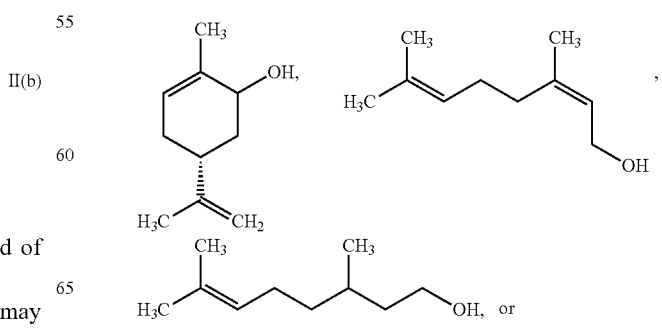

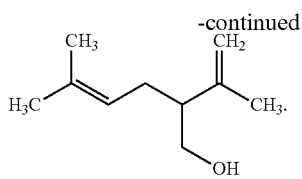

In some embodiments, the terpenoid is:

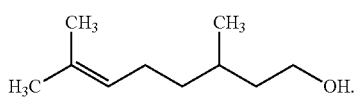

For example, as illustrated below, compounds of formula III(a) may be contacted with terpenoid V(a) in the presence of base to form a compound of formula II(a):

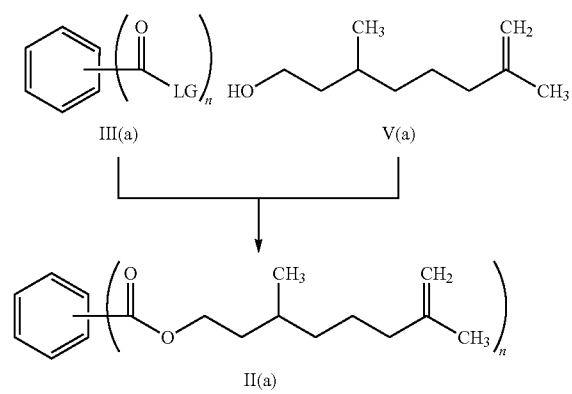

wherein LG is a leaving group and n is 1-5. In some embodiments, LG is a halide. In some embodiments, LG is —Cl. In some embodiments, n is 1-4. In some embodiments, n is 1-3.

Compounds of formula I(c), in some embodiments, are produced by contacting a compound of formula A with a terpenoid to produce a compound of formula B, and then contacting the compound of formula B with H—X to produce a compound of formula I(c), as illustrated below:

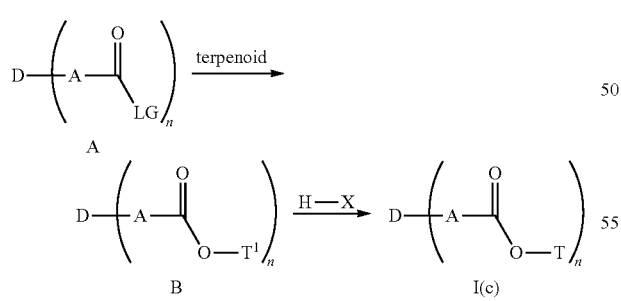

wherein D, A, T, and n are as defined herein for the compounds of formula I; $T^1$ is as defined for the compounds of formula II, and LG is as defined for the compounds of formula III.

Compounds of the formula C may also be synthesized using methods known in the art from terpenoids and compounds of the formula D, such as those disclosed in Richard C. Larock, Comprehensive Organic Transformations: A Guide to Functional Group Preparations (2nd ed. 1999) and/ or Michael B. Smith & Jerry March, March's Advanced Organic Chemistry, Reactions, Mechanisms, and Structure (5th ed. 2001), the entireties of which are incorporated herein by reference.

  C

  D wherein Ar is as defined herein for the compounds of formula I, $T^1$ is as defined herein for the compounds of formula II, A is hydrocarbyl, and LG is a leaving group.

Furthermore, initiators wherein L is:

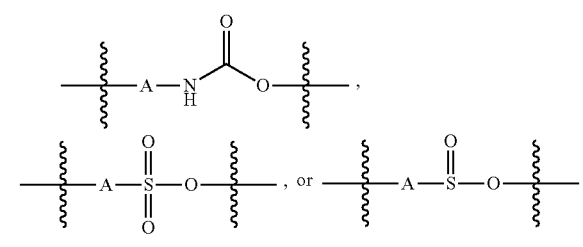

may also be synthesized using methods known in the art.

As an example, urethane linkages may be synthesized by reacting a terpenoid with an isocyanate, i.e., compound having a —N=C=O group, to provide the urethane. In one example, methylene diphenyl diisocynate (MDI) or polymeric MDI can be reacted with a terpenoid to provide a urethane.

As another example, a sulfonyl halide may be reacted with a terpenoid to form an initiator having an L group of:

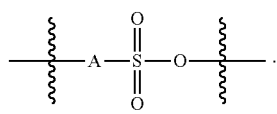

Hydrocarbyl D groups may be arrived at from commercially available materials. For example, initiators having a D group having the following formula:

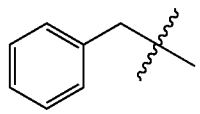 [SMILES: *Cc1ccccc1]

may be synthesized from the corresponding benzyl halide.

Initiators having a D group having the following formula:

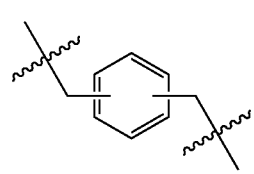

may be synthesized from the corresponding dibenzyl halide, e.g., 1,3-bis(chloromethyl)benzene.

Initiators having a D group having the formula: may be synthesized from terephthalic acid.

Initiators having a D group having the formula:

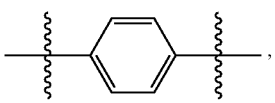

may be synthesized from adipic acid.

Initiators having a D group having the formula:

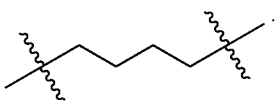

wherein $R^x$ is H or hydrocarbyl may be synthesized from citric acid.

(iii) Lewis Acids

In some embodiments, the Lewis acid is a non-protic acid. In some embodiments, the Lewis acid is a metal halide or non-metal halide. In some embodiments, the Lewis acid is a metal halide. In some embodiments, the Lewis acid is a titanium (IV) halide, a zinc (II) halide, a tin (IV) halide, or an aluminum (III) halide. In some embodiments, the Lewis acid is a titanium(IV) halide. In some embodiments, the Lewis acid is a tin (IV) halide. In some embodiments, the Lewis acid an aluminum (III) halide. In some embodiments, the Lewis acid is titanium tetrabromide or titanium tetrachloride. In some embodiments, the Lewis acid is titanium tetrachloride. In some embodiments, the Lewis acid is zinc chloride. In some embodiments, the Lewis acid is $AlBr_3$. In some embodiments, the Lewis acid is ethyl aluminum dichloride. In some embodiments, the Lewis acid is methyl aluminum dichloride. In some embodiments the Lewis acid is a non-metal halide. In some embodiments, the Lewis acid is an antimony (VI) halide, a gallium (III) halide, or a boron (III) halide. In some embodiments, the Lewis acid is boron trichloride. In some embodiments, the Lewis acid is a trialkyl aluminum compound. In some embodiments, the Lewis acid is trimethyl aluminum.

In some embodiments, one Lewis acid is used. In some embodiments, a mixture of two or more Lewis acids is used. In some embodiments, a mixture of two Lewis acids is used. In some embodiments, a mixture of an aluminum (III) halide and trialkyl aluminum compound is used. In some embodiments, a stoichiometric ratio of about 1:1 aluminum (III) halide to trialkyl aluminum compound is used. In some embodiments, a stoichiometric ratio of 2:1 aluminum (III) halide to trialkyl aluminum compound is used. In some embodiments, a stoichiometric ratio of 1:2 aluminum (III) halide to trialkyl aluminum is used. In some embodiments, the stoichiometric ratio of aluminum (III) halide to trialkyl aluminum is greater than 1. In some embodiments, the stoichiometric ratio of aluminum (III) halide to trialkyl aluminum is less than 1. In some embodiments, a mixture of aluminum trichloride and trimethyl aluminum is used.

In some embodiments, the Lewis acid is a titanium halide, aluminum halide, boron halide, or an alkyl aluminum halide, as defined herein.

In some embodiments, the Lewis acid is an alkyl aluminum halide. In some embodiments, the alkyl is methyl or ethyl. In some embodiments, the halide is —Cl or —Br.

In some embodiments, the Lewis acid may be added in one aliquot or added in two or more aliquots over the course of the polymerization.

In some embodiments, the Lewis acid concentration is from about 0.10 to about 10 times the concentration of the terpene initiator. In some embodiments, the Lewis acid concentration is from about 1.0 to about 8.0 times the concentration of the terpene initiator. In some embodiments, the Lewis acid concentration is from 2.0 to about 5.0 times the concentration of the terpene initiator.

In some embodiments, the molar concentration of Lewis acid is from about 0.1 to about 20 times the molar concentration of chain ends. In some embodiments, the molar concentration of Lewis acid is from about 0.5 to about 15 times the molar concentration of chain ends. In some embodiments, the molar concentration of Lewis acid is from about 1.0 to about 10 times the molar concentration of chain ends. In some embodiments, the molar concentration of Lewis acid is from about 1.0 to about 8 times the molar concentration of chain ends. In some embodiments, the molar concentration of Lewis acid is from about 2 to about 5 times the molar concentration of chain ends.

In some embodiments, an additional aliquot of one or more Lewis acids is added after the addition of the quenching agent.

(iv) Monomers

In some embodiments, the monomer is a hydrocarbon monomer, i.e., a compound containing only hydrogen and carbon atoms, including but not limited to, olefins and diolefins, and those having from about 2 to about 20 carbon atoms. In some embodiments, such compounds have from about 4 to about 8 carbon atoms.

In some embodiments, the methods described herein can be employed for the polymerization of such monomers to produce polymers of different, but uniform molecular weights. In some embodiments, such molecular weight is from about 300 to in excess of a million g/mol. In some embodiments, such polymers are low molecular weight liquid or viscous polymers having a molecular weight of from about 200 to 10,000 g/mol, or solid waxy to plastic, or elastomeric materials having molecular weights of from about 100,000 to 1,000,000 g/mol, or more.

In some embodiments, the monomer is isobutene, styrene, alpha pinene, beta pinene, isoprene, butadiene, or substituted compounds of the preceding types. In some embodiments, the monomer is isobutylene, 2-methyl-1-butene, 3-methyl-1-butene, 4-methyl-1-pentene, or styrene. In some embodiments, the monomer is isobutene. In some embodiments, the monomer is styrene.

In some embodiments, more than one monomer may be utilized in the polymerization reactions described herein. When two or more monomers are used, co-polymers may be synthesized. In some embodiments, when more than one monomer is used, the monomers are added together to the initiator. In other embodiments, a first monomer is added to the initiator and allowed to propagate for a certain time, e.g., until high conversion is achieved, and then a second polymer is added. Block co-polymers may be obtained using such methods. In some embodiments, two monomers are used, wherein one monomer is isobutene and the other monomer is styrene.

In some embodiments, the monomer is consumed prior to adding the quenching agent, or undergoes high conversion prior to adding the quenching agent. In particular embodiments, about 80%, about 85%, about 90%, about 95%, about 97%, about 99%, or about 100% of the monomer is consumed prior to adding the quenching agent.

In some embodiments, one or more aliquots of additional monomer are added to the polymerization after the initial monomer charge, wherein each individual aliquot of additional monomer is consumed or partially consumed prior to adding a subsequent aliquot of additional monomer or adding the quenching agent. As used herein, partially consumed refers to, in some embodiments, about 2, about 5, about 10, about 15, about 20, about 25, about 30, about 35, about 40, about 45, about 50, about 55, about 60, about 65, about 70, about 75, about 80, about 85, about 90, about 95, or about 97 percent consumed by mole or mass.

In some embodiments, 2 to 20 aliquots of additional monomer are added. In some embodiments, 5-10 aliquots of additional monomer are added. In some embodiments, all monomers are charged to the polymerization together.

(v) Quenching Agents

Suitable quenching agents for use in the methods described herein, in some embodiments, react with and/or cap a growing polymer, thereby installing a functional group to form a telechelic polymer.

In some embodiments, the quenching agent is selected from those disclosed in Stokes et al., U.S. Patent Publication No. 2004/0260033A1 (U.S. application Ser. No. 10/600,898) and Stokes et al., U.S. Patent Publication No. 2005/0282972A1 (U.S. application Ser. No. 11/086,157), both of which are incorporated herein by reference in their entireties. Exemplary quenching agents include, but are not limited to those having the following formula:

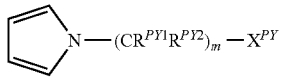

wherein $R^{PY1}$ and $R^{PY2}$ are independently in each $-(CR^{PY1}R^{PY2})-$ unit selected from the group consisting of hydrogen and alkyl of 1 to 6 carbon atoms;
m is an integer from 1 to 20; and
X is selected from the group consisting of hydrogen, alkyl, aryl, alkaryl, alkoxy, heteroaryl, nitro, ureido, $-OC(O)R^{PY3}$, $-C(O)R^{PY4}$, $-C(O)OR^{PY5}$, $-C(O)NR^{PY6}R^{PY7}$, $-P(R^{PY8})_3$, $-P(OR^{PY9})_3$, $-SR^{PY10}$, $-OSO_3R^{PY11}$, and $-S(O)R^{PY12}$;
wherein $R^{PY3}$ is alkyl or alkenyl; and $R^{PY4}$, $R^{PY5}$, $R^{PY7}$, $R^{PY8}$, $R^{PY9}$, $R^{PY10}$, $R^{PY11}$ and $R^{PY12}$ are alkyl.

Further examples include, but are not limited to 1-methylpyrrole and 1-furfurylpyrrole. In some embodiments, these quenching agents provide N-substituted pyrrole terminated polyolefins.

In some embodiments, the quenching agent is selected from those disclosed in Stokes et al., U.S. Patent Publication No. 2006/0041081A1 (U.S. application Ser. No. 11/207,264), which is incorporated herein by reference in its entirety. Exemplary quenching agents include, but are not limited to one or more nitrogen-containing five-membered aromatic ring compounds selected from pyrroles and imidazoles having at least two hydrocarbyl substituents on the ring, or one or more hindered secondary or tertiary amines containing only carbon, hydrogen, and nitrogen atoms, or mixtures thereof, provided the nitrogen containing five-membered aromatic ring is not: 2,4-dimethylpyrrole; 2-phenylindole; 2-methylbenzimidazole; 1,2-dimethylimidazole; 2-phenylimidazole; and 2,4,5-triphenylimidazole; and provided the hindered secondary or tertiary amines are not: triethylamine; tri-n-butylamine; trihexylamine; triisooctylamine; 2-phenylpyridine; 2,3-cyclododecenopyridine; di-p-tolylamine; quinaldine; and 1-pyrrolidino-1-cyclopentene. In some embodiments, the one or more nitrogen-containing five-membered aromatic ring compound have the following formula:

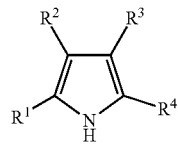

wherein:
(a) $R^1$ and $R^4$ are independently an alkyl containing one carbon atom to about 20 carbon atoms, $R^2$ and $R^3$ are independently hydrogen or alkyl containing one carbon atom to about 20 carbon atoms, cycloalkyl of about 3 to about 7 carbon atoms, aryl of about 6 to about 30 carbon atoms, alkaryl of about 7 to about 30 carbon atoms, or aralkyl of about 7 to about 30 carbon atoms; or
(b) $R^1$ and $R^2$ form a fused aromatic ring of from 6 carbon atoms to 10 carbon atoms or an aliphatic ring of from 4 carbon atoms to about 8 carbon atoms, R is alkyl containing one carbon atom to about 20 carbon atoms, and $R^3$ is hydrogen or alkyl containing one carbon atom to about 20 carbon atoms, cycloalkyl of about 3 to about 7 carbon atoms, aryl of about 6 to about 30 carbon atoms, alkaryl of about 7 to about 30 carbon atoms, or aralkyl of about 7 to about 30 carbon atoms; or
(c) $R^2$ and $R^3$ form a fused aromatic ring of from 6 carbon atoms to 10 carbon atoms or an aliphatic ring of from 4 carbon atoms to about 8 carbon atoms, and $R^1$ and $R^4$ are independently an alkyl containing one carbon atom to about 20 carbon atoms; or
(d) both $R^1$ and $R^2$, and $R^3$ and $R^4$, taken in pairs, independently form a fused aromatic ring of from 6 carbon atoms to 10 carbon atoms or an aliphatic ring of from 4 carbon atoms to about 8 carbon atoms.

Further examples include, but are not limited to 2,5-dimethylpyrrole. In some embodiments, these quenching agents provide vinylidene-terminated polyolefins.

In some embodiments, the quenching agent is selected from those disclosed in Stokes et al., U.S. Patent Publication No. 2007/0155908A1 (U.S. application Ser. No. 11/356,491), which is incorporated herein by reference in its entirety. Exemplary quenching agents include compounds having the following formula:

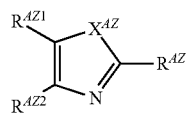

wherein: $R^{AZ1}$ and $R^{AZ2}$ are independently hydrogen, alkyl from 1 to 20 carbon atoms, cycloalkyl from about 3 to about 7 carbon atoms, aryl from 6 to about 20 carbon atoms, alkaryl from about 7 to 30 carbon atoms, aralkyl from about 7 to 30 atoms; or $R^{AZ1}$ and $R^{AZ2}$ together form a fused aromatic ring having from 6 to 10 carbon atoms which may be unsubstituted or substituted with 1 to 4 substituents selected independently from alkyl of one carbon atom to about 20 carbon atoms, cycloalkyl of about 3 to about 7 carbon atoms, aryl of about 6 to about 30 carbon atoms, alkaryl of about 7 to about 30 carbon atoms, aralkyl of about 7 to about 30 carbon atoms, alkoxy of about 1 to 6 carbon atoms, alkylthioether of about 1 to 6 carbon atoms, halo, or amino of the formula —$NR^{AZ*}R^{AZ**}$, where $R^{AZ*}$ and $R^{AZ**}$ are independently alkyl from about 4 to 10 carbon atoms, cycloalkyl of about 4 to about 7 carbon atoms, aryl of about 6 to about 10 carbon atoms, alkaryl of about 7 to about 10 carbon atoms, aralkyl of about 7 to about 10 carbon atoms;

$R^{AZ}$ is hydrogen, alkyl from 1 to 20 carbon atoms, cycloalkyl from about 3 to 7 carbon atoms, aryl from 6 to about 20 carbon atoms, alkaryl from about 7 to 30 carbon atoms, aralkyl from about 7 to 30 atoms, with the proviso that when $R^{AZ}$ is hydrogen, than $R^{AZ2}$ is branched alkyl having at least three carbon atoms, aryl, cycloalkyl, alkaryl, or aralkyl, and with the further proviso that when $R^{AZ}$ is methyl then $R^{AZ1}$ and $R^{AZ2}$ are independently selected from alkyl from 1 to 20 carbon atoms, cycloalkyl from about 3 to about 7 carbon atoms, aryl from 6 to about 20 carbon atoms, alkaryl from about 7 to 30 carbon atoms, aralkyl from about 7 to 30 atoms; and $X^{AZ}$ is oxygen or sulfur.

Exemplary quenching agents include, but are not limited to 2-phenylbenzoxazole, 2-phenylbenzothiazole, and 2,5-diphenyloxazole. In some embodiments, these quenching agents provide vinylidene-terminated polyolefins.

In some embodiments, the quenching agent is selected from those disclosed in Stokes, U.S. Patent Publication No. 2007/0155910A1 (U.S. application Ser. No. 11/356,490), which is incorporated herein by reference in its entirety. Exemplary quenching agents include, but at re not limited to polypyrrole, poly(2-vinylpyridine), polyphenothiazine, poly (pyrrole-co-furan), and poly(pyrrole-co-thiophene). In some embodiments, these quenching agents provide vinylidene-terminated polyolefins.

In some embodiments, the quenching agent is selected from those disclosed in Stokes et al., U.S. Patent Publication No. 2007/0155911A1 (U.S. application Ser. No. 11/357, 562), which is incorporated herein by reference in its entirety. Exemplary quenching agents include but are not limited to substituted morpholines, substituted thiomorpholines, and substitute phenothiazines. In some embodiments, the quenching agent is a compound having the following formula:

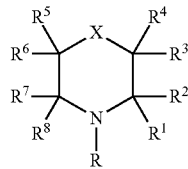

wherein:
R$^1$ through R$^8$ are independently hydrogen, alkyl from 1 to 20 carbon atoms, aryl from 6 to about 20 carbon atoms, alkaryl from about 7 to 30 carbon atoms, or aralkyl from about 7 to 30 carbon atoms;

R is hydrogen, alkyl from 1 to 20 carbon atoms, aryl from 6 to about 20 carbon atoms, alkaryl from about 7 to 30 carbon atoms, or aralkyl from about 7 to 30 carbon atoms; and X is oxygen or sulfur;

with the proviso that when R is hydrogen or methyl then R$^1$, R$^2$, R$^7$ and R$^8$ must be other than hydrogen unless one of R$^1$ or R$^2$ and one of R$^7$ or R$^8$ is independently branched alkyl of about 3 to 20 carbon atoms, aryl, alkaryl or aralkyl.

Further examples include, but are not limited to 4-ethyl morpholine, 4-phenylmorpholine, 10-methylphenothiazine, and phenoxazine. In some embodiments, these quenching agents provide vinylidene-terminated polyolefins.

In some embodiments, the quenching agent is selected from those disclosed in Stokes, U.S. Patent Publication No. 2009/0247716A1 (U.S. application Ser. No. 12/055,281), which is incorporated herein by reference in its entirety. Exemplary quenching agents include, but are not limited to compounds having the following formula:

wherein R$^1$ and R$^2$, are each, independently, hydrocarbyl. Examples include, but are not limited to diethylsulfide, dipropylsulfide, diisopropylsulfide, diallylsulfide, diisoamylsulfide. In some embodiments, following addition of the quenching agent, one or more alcohols or amines are added. Suitable amines or alcohols include, but are not limited to methanol, ethanol, isopropanol, diethylamine, triethylamine, n-butylamine, and tert-amylamine. In some embodiments, addition of these quenching agents followed by the one or more alcohols or amines provide vinylidene-terminated polyolefins.

In some embodiments, the quenching agent is selected from those disclosed in Storey et al., U.S. Patent Publication No. 2009/0318624A1 (U.S. application Ser. No. 12/145, 460), which is incorporated herein by reference in its entirety. Exemplary quenching agents include, but are not limited to alkoxysilanes and ethers. In some embodiments, the quenching agent is a compound having the following formula:

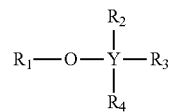

wherein Y is carbon or silicon; and
R$_1$ is hydrocarbyl, and R$_2$-R$_4$ are each, independently, hydrogen or hydrocarbyl.

Exemplary quenching agents include, but are not limited to allyloxytrimethylsilane, methoxytrimethylsilane, ethoxytrimethylsilane, and tert-butyl ether. In some embodiments, a the quenching agents provide vinylidene-terminated polyolefins.

In some embodiments, the quenching agent is selected from those disclosed in Stokes, U.S. Patent Publication No. 2010/0099835A1 (U.S. application Ser. No. 12/256,441), which is incorporated herein by reference in its entirety. Exemplary quenching agents include, but are not limited to compounds having the following formula:

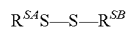

wherein R$^{SA}$ and R$^{SB}$ are each, independently, alkyl, aryl, aralkyl, alkaryl,

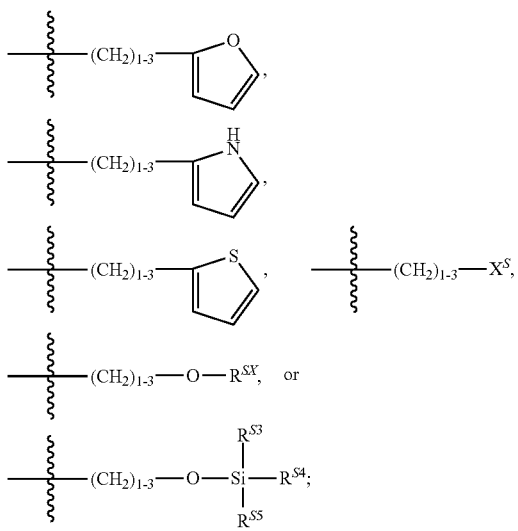

wherein $X^S$ is halo or a pseudohalide;
$R^{SX}$ is alkyl or aryl;
$R^{S3}$ is tert-butyl; and
$R^{S4}$ and $R^{S5}$ are each, independently, alkyl, aryl, aralkyl, or alkaryl.

In some embodiments, the quenching agent is furfurylmethyl disulfide, dimethyldisulfide, diethyldisulfide, diisopropyldisulfide, ditolyldisulfide, dibromoethyldisulfide, dichloroethyldisulfide, or di-tert-butyldiphenylsiloxyethyldisulfide. In some embodiments, following addition of the quenching agent, one or more alcohols, amines, or thiols are added. Exemplary alcohols include, but are not limited to R—OH, wherein R is alkyl of 1-8 carbons. Exemplary amines include, but are not limited to $NR^1R^2R^2$, wherein $R^1$ is alkyl, and $R^2$ and $R^3$ are each, independently, alkyl of 1-8 carbons. Exemplary thiols include, but are not limited to R—SH, wherein R is alkyl of 1 to 6 carbons. In some embodiments, the one or more alcohols, amines, or thiols is methanol, n-butylamine, 2-ethylhexylamine, tert-amylamine, ethanethiol, n-propanethiol, triethylamine, or dibutylamine. In some embodiments, the addition of the quenching agent following by the one or more alcohols, amines, or thiols provides sulfide-terminated polyolefins and/or vinylidene-terminated polyolefins.

In some embodiments, the quenching agent is butadiene.

In some embodiments, the quenching agent is isoprene.

In some embodiments, the quenching agent is selected from those disclosed in Storey, U.S. Patent Publication No. 2010/0184918A1 (U.S. application Ser. No. 12/355,664), which is incorporated herein by reference in its entirety. Exemplary quenching agents include, but are not limited to compounds having the following formula:

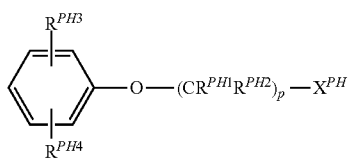

wherein $R^{PH1}$ and $R^{PH2}$ are each independently in each —$(CR^{PH1}R^{PH2})$ unit, —H or alkyl, and p is an integer from 0-20, wherein (1) if p is 0, then $R^{PH3}$ and $R^{PH4}$ are each, independently, alkyl, and $X^{PH}$ is —H;

(2) if p is 1, then $R^{PH3}$ and $R^{PH4}$ are each, independently —H, alkyl, or alkoxy, and $X^{PH}$ is —H, alkyl, alkenyl, alkynyl, alkaryl, aralkyl, aryl, heteroaryl, or

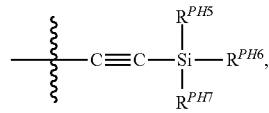

wherein $R^{PH5}$-$R^{PH7}$ are each, independently, alkyl or aryl;

(3) if p is 2, then $R^{PH3}$ and $R^{PH4}$ are each, independently —H, alkyl, or alkoxy, and $X^{PH}$ is —H, alkyl, alkenyl, alkynyl, alkaryl, aralkyl, aryl, heteroaryl, alkoxy, —F, —Cl, —Br, —I, —At, —CN, —NC, —NCO, —OCN, —NCS, —SCN, —OC(O)$R^{PH8}$, —C(O)O$R^{PH9}$, —C(O)N$R^{PH10}R^{PH11}$, or

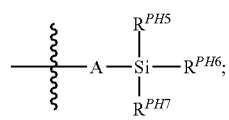

wherein A is

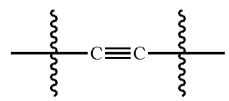

or a single bond, $R^{PH5}$ to $R^{PH7}$ are each, independently, alkyl, alkenyl, alkynyl, alkaryl, aralkyl, aryl, heteroaryl, alkoxy, hydroxy, —NR$^{PH10}$R$^{PH11}$, —F, —Cl, —Br, A, or —At, $R^{PH8}$ is alkyl, alkenyl, alkynyl, alkaryl, aryl, or heteroaryl, and $R^{PH9}$ to $R^{PH11}$ are each, independently, —H, alkyl, alkenyl, alkynyl, alkaryl, aryl, or heteroaryl, or when —O—$(CR^{PH1}R^{PH2})_p$—$X^{PH}$ is ortho to $R^{PH4}$, then $X^{PH}$ and $R^{PH4}$, together, with the atoms to which $X^{PH}$ and $R^{PH4}$ are attached, may form a ring; and (4) if p is 3-20, then $R^{PH3}$ and $R^{PH4}$ are each, independently —H, alkyl, or alkoxy, and X is —H, alkyl, alkenyl, alkynyl, alkaryl, aralkyl, aryl, heteroaryl, alkoxy, aryloxy, heteroaryloxy, alkaryloxy, —OH, —F, —Cl, —Br, —I, —At, —CN, —NC, —NCO, —OCN, —NCS, —SCN, —OC(O)$R^{PH8}$, —C(O)O$R^{PH9}$, —C(O)N$R^{PH10}R^{PH11}$

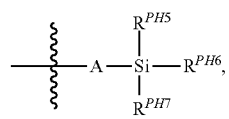

or —NR$^{PHX}$R$^{PHY}$;

wherein A is

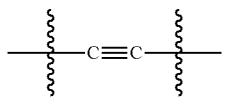 [SMILES: *C#C*]

or a single bond, $R^{PHX}$ and $R^{PHY}$ are each, independently, —H, alkyl, alkenyl, alkynyl, cycloalkyl, aryl, heteroaryl, heterocyclyl, or —C(O)$R^{PHZ}$, wherein $R^{PHZ}$ is —H, alkyl, alkenyl, alkynyl, cycloalkyl, aryl, heteroaryl, heterocyclyl, —O$R^{PH8}$, or —N$R^{PH10}R^{PH11}$;

$R^{PH5}$ to $R^{PH7}$ are each, independently, alkyl, alkenyl, alkynyl, alkaryl, aralkyl, aryl, heteroaryl, alkoxy, hydroxy, —N$R^{PH10}R^{PH11}$, —F, —Cl, —Br, —I, or —At, $R^{PH8}$ is alkyl, alkenyl, alkynyl, alkaryl, aryl, or heteroaryl, and $R^{PH9}$ to $R^{PH11}$ are each independently, —H, alkyl, alkenyl, alkynyl, alkaryl, aryl, or heteroaryl.

In some embodiments, the quenching agent is anisole, 3-bromopropoxybenzene, b-chlorophenetole, allyl phenyl ether, isopropyl phenyl ether, 2,6-di-tert-butylphenol, 11-phenoxy-1-undecanol, 6-phenoxy-1-hexanol, 4-phenoxy-1-butanol, tert-butyl(3-phenoxy-1-propynyl)diphenylsilane, 2,3-dihydrobenzofuran, chlorodimethyl(3-phenoxypropyl)silane, or trichloro(3-phenoxypropyl)silane. In some embodiments, the quenching agent provides phenoxy-ether-terminated polyolefins.

In some embodiments, the quenching agent is selected from those disclosed in Storey, U.S. Patent Publication No. 2010/0249001A1 (U.S. application Ser. No. 12/415,829), which is incorporated herein by reference in its entirety. Exemplary quenching agents include, but are not limited to compounds having the following formula:

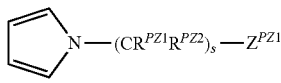

C wherein $R^{PZ1}$ and $R^{PZ2}$ are independently in each —(C$R^{PZ1}R^{PZ2}$)— unit, hydrogen or alkyl from 1 to 6 carbon atoms;

s is an integer from 2 to 20; and $Z^{PZ1}$ is —F, —Cl, —Br, —I, —At, —CN, —NC, —$N_3$, —NCO, —OCN, —NCS or —SCN.

In some embodiments, the quenching agent is 1-(2-chloroethyl)pyrrole, 1-(2-bromoethyl)pyrrole, 1-(3-bromopropyl)pyrrole, 1-(2-cyanoethyl)pyrrole, 1-(2-azidoethyl)pyrrole. In some embodiments, the quenching agent provides a N-substituted pyrrole-terminated polyolefin.

In some embodiments, the quenching agent is anisole, 3-phenoxypropyl bromide, isopropoxy benzene, 3,6-di-tert-butylphenol, or n-methylpyrrole.

In some embodiments, the quenching agent is allyltrimethylsilane. See, for example, Wilczek et al., Polymer Bulletin, 17: 37-43 (1987), which is incorporated herein by reference in its entirety.

In some embodiments, the quenching agent is methallyltrimethylsilane or isobutenyltrimethylsilane. See for example, Nielsen et al., Polymer, 38(10): 2529-2534 (1997), which is incorporated herein by reference in its entirety.

In some embodiments, the quenching agent is a 1,1-diarylethylene. The 1,1-diarylethylene, in some embodiments, is used to initially quench the growing polymer chain to form a diarylcarbenium-ion terminated polymer, which is subsequently reacted with a suitable nucleophile or reactant to form a polymer having a 1-substituted-1,1-diarylethylene end group. The nucleophile, in some embodiments, may be the terminator. In some embodiments, the 1,1-diarylethylene is 1,1-diphenylethylene. 1,1-diarylethylene quenching methodology is described in, for example, Fodor et al., J.M.S.-Pure Appl. Chem., A32(3): 575-591 (1995); Hadjikyriacou et al., J.M.S.-Pure Appl. Chem., A32(6): 1137-1153 (1995); Kamigaito et al., Macromolecules, 28: 5671-5675 (1995); Li et al., Macromolecules, 28: 1383-1389 (1995); Hadjikyriacou et al., Macromolecules, 29: 5261-5267 (1996); Mayr et al., Macromolecules, 29: 6110-6113 (1996); and Kwon et al., Macromolecules, 35: 3348-3357 (2002), which are incorporated herein by reference in their entireties.

In some embodiments, the quenching agent is 1,3-butadiene. Exemplary methodology employing 1,3-butadiene as a quenching agent is described in Knoll et al., U.S. Pat. No. 5,212,248, De et al., Macromolecules, 38:6861-6870 (2006); and De et al., Macromolecules, 39: 7527-7533 (2006), which are incorporated herein by reference in their entireties. In some embodiments, 1,3-butadiene is employed as the quenching agent to obtain an allyl-halide terminated polymer.

In some embodiments, the quenching agent is a long chain olefin, including but not limited to those described in Yamanaka et al., U.S. Pat. No. 5,777,037 and Chiba et al., European Patent Application No. 1,225,186, which are incorporated herein by reference in their entireties. In some embodiments, the quenching agent is 1,9-decadiene.

In some embodiments, the quenching agent is an allylsilylpseudohalide, including, but not limited to those described in Shaffer, U.S. Pat. No. 5,580,935, which is incorporated herein by reference in its entirety.

In some embodiments, the quenching agent is a furan or substituted furan, including but not limited to those described in Hadjikyriacou et al., Macromolecules, 32(20): 6393-6399 (1999) and Hadjikyriacou et al, Macromolecules, 33: 730-733 (2000), the entireties of which are incorporated herein by reference. Examples include, but are not limited to, 2-alkyl furans, such as 2-methyl furan and 2-tert-butyl furan. Other examples include, but are not limited to, bis(furanyl) derivatives such as 2,5-bis(2-furyl-2-propyl)furan.

In some embodiments, the quenching agent is thiophene or a substituted thiophene. See, for example, Martinez-Castro et al., Macromolecules, 36: 6985-6994 (2003), the entirety of which is incorporated herein by reference.

In some embodiments, the quenching agent is a triarylamine. An example includes, but is not limited to, triphenylamine. See, for example, Zhang et al., Journal of Polymer Science: Part A: Polymer Chemistry, 46: 936-946 (2008).

In some embodiments, the quenching agent is a vinylalkoxybenzene. Examples include, but are not limited to, those described in Japanese Patent Publication No. 05186513A, which is incorporated herein by reference in its entirety.

In some embodiments, quenching is performed for about 5 minutes to about 120 minutes.

(vi) Terminators

Terminators for use in the methods described herein include any compound that is capable of deactivating Lewis acid. Terminators, in some embodiments, decompose a Lewis acid or destroy the Lewis acid character of a compound. In some embodiments, the terminator is a base and/or nucleophile. In some embodiments, the terminator is an organic base. In some embodiments, the terminator is an electron donor. In some embodiments, the terminator does not add to and end cap the growing polymer. In some embodiments, the terminator is an alcohol or amine. In some embodiments, the terminator is a pyridine derivative.

Exemplary terminators include, but are not limited to, methanol, ethanol, isopropanol, or water. In another embodiment, terminators include diethylamine, triethylamine, pyridine, 2,6-lutidine, n-butylamine, or tert-amylamine.

In the methods described herein, one or more terminators may be added at a desired time to deactivate the Lewis acid present in the polymerization reaction. One or more terminators may be added, in some embodiments, after the addition of the quenching agent. For example, in some embodiments, a telechelic polymer is synthesized by contacting a terpene initiator with a Lewis acid in the presence of one or more monomers, then allowing polymerization of the monomer to proceed for a desired time, then adding a quenching agent to functionalize the growing polymer, and then adding a terminator to deactivate the Lewis acid.

In other embodiments, one or more terminators are directly added to the growing polymer to obtain halide-terminated polymer products, which result from the addition of halide ions present in the polymerization reaction with the growing polymer. For example, in some embodiments, a halide terminated-polymer is obtained by contacting a terpene initiator with a Lewis acid in the presence of one or more monomers, then allowing polymerization of the monomer to proceed for a desired time, and then adding a terminator to deactivate the Lewis acid. In some embodiments, the halide-terminated polymer product is a tert-halide terminated polymer product. In some embodiments, the tert-halide terminated polymer product is a tert-chloride terminated polymer product.

(vii) Electron Donors

The polymerization reactions provided herein may be performed in the presence of one or more electron donors. Furthermore, some electron donors are capable of converting traditional polymerization systems into quasiliving carbocationic polymerization systems.

In some embodiments, the electron donor is capable of complexing with Lewis acids. In some embodiments, the electron donor is a base and/or nucleophile. In some embodiments, the electron donor is capable of abstracting or removing a proton. In some embodiments, the electron donor is an organic base. In some embodiments, the electron donor is an amide. In some embodiments, the electron donor is N,N dimethylformamide, N,N-dimethylacetamide, or N,N-diethylacetamide. In some embodiments, the electron donor is a sulfoxide. In some embodiments, the electron donor is dimethyl sulfoxide. In some embodiments, the electron donor is an ester. In some embodiments, the electron donor is methyl acetate or ethyl acetate. In some embodiments, the electron donor is a phosphate compound. In some embodiments, the electron donor is trimethyl phosphate, tributyl phosphate, or triamide hexamethylphosphate. In some embodiments, the electron donor is an oxygen-containing metal compound. In some embodiments, the electron donor is tetraisopropyl titanate.

In some embodiments, the electron donor is a trialkylamine. Examples include, but are not limited to triethylamine, tripropyl amine, and N,N-diisopropylethylamine.

In some embodiments, the electron donor is pyridine or a pyridine derivative. In some embodiments, the electron donor is a compound of formula:

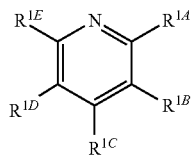

wherein $R^{1A}$, $R^{1B}$, $R^{1C}$, $R^{1D}$, and $R^{1E}$ are each independently, hydrogen or hydrocarbyl; or $R^{1A}$ and $R^{1B}$, or $R^{1B}$ and $R^{1C}$, or $R^{1C}$ and $R^{1D}$, or $R^{1D}$ and $R^{1E}$ independently form a fused aliphatic ring of about 3 to about 7 carbon atoms or a fused aromatic ring of about 5 to about 7 carbon atoms. In some embodiments, $R^{1A}$ and $R^{1E}$ are each, independently, hydrocarbyl, and $R^{1B}$-$R^{1D}$ are hydrogen.

In some embodiments, the electron donor is 2,6-di-tert-butylpyridine, 2,6-lutidine, 2,4-lutidine, 2,4,6-trimethylpyridine, 2-methylpyridine, or pyridine. In some embodiments, the electron donor is N,N-dimethylaniline or N,N-dimethyltoluidine. In some embodiments, the electron donor is 2,6-lutidine.

(viii) Common Ion Salts and Common Ion Salt Precursors

In some embodiments, common ion salts or salt precursors may be optionally added to the reaction mixture in addition to or in replacement of the electron donor. In some embodiments, such salts may be used to increase the ionic strength, suppress free ions, and interact with ligand exchange. In some embodiments, the common ion salt precursor is tetra-n-butylammonium chloride. In some embodiments, the common ion salt precursor is tetra-n-butylammonium bromide. In some embodiments, the common ion salt precursor is tetra-n-butylammonium iodide. In some embodiments, the concentration of the common ion salts or salt precursors in the total reaction mixture may be in the range from about 0.0005 moles per liter to about 0.05 moles per liter. In some embodiments, the concentration of the common ion salts or salt precursors is in the range from about 0.0005 moles per liter to about 0.025 moles per liter. In some embodiments, the concentration of the common ion salt or salt precursors is in the range from about 0.001 moles per liter to about 0.007 moles per liter.

(ix) Diluents

In some embodiments of the methods described herein, the methods are performed in a diluent. In some embodiments, the diluent is a single compound or a mixture of two or more compounds. In some embodiments, the diluent completely dissolves the reaction components or partially dissolves the reaction components. In some embodiments, the diluent completely or nearly completely dissolves the reaction components. In some embodiments, the diluent completely dissolves the reaction components. In some embodiments, the diluent nearly completely dissolves the reaction components.

In some embodiments, the diluent has a low boiling point and/or low freezing point. In some embodiments, the diluent is an alkane. In some embodiments, the diluent is a normal alkane. In some embodiments, the diluent is propane, normal butane, normal pentane, normal hexane, normal heptane, normal octane, normal nonane or normal decane. In some embodiments, the diluent is normal hexane or normal pentane. In some embodiments, the diluent is normal hexane. In some embodiments, the diluent is a branched alkane. In some embodiments, the alkane is isobutane, isopentane, neopentane, isohexane, 3-methylpentane, 2,2-dimethylbutane, or 2,3-dimethylbutane. In some embodiments, the alkane is cyclic. In some embodiments, the alkane is methylcyclohexane. In some embodiments, the diluent is a mixed boiling fraction alkane. In some embodiments, the diluent is a mixed boiling fraction of C5 alkanes, i.e., mixed pentanes or mixed boiling fraction of C6 alkanes, i.e., mixed hexanes. In some embodiments, the alkane is a nitroalkane.

In some embodiments, the diluent is an alkyl halide. In some embodiments, the diluent is an alkyl monohalide or an alkyl polyhalide. In some embodiments, the diluent is chloroform, ethylchloride, n-butyl chloride, methylene chloride, methyl chloride, 1,2-dichloroethane, 1,1,2,2-tetrachloroethane, carbon tetrachloride, 1,1-dichloroethane, n-propyl chloride, isopropyl chloride, 1,2-dichloropropane, or 1,3-dichloropropane. In some embodiments, the diluent is methylene chloride or methyl chloride. In some embodiments, the diluent is methyl chloride. In some embodiments, the diluent is an alkene or halogenated alkene. In some embodiments, the diluent is vinyl chloride, 1,1-dichloroethene, or 1,2-dichloroethene.

In some embodiments, the diluent is a substituted benzene. In some embodiments, the diluent is benzene. In some embodiments, the diluent is toluene.

In some embodiments, the diluent is carbon disulfide, sulfur dioxide, acetic anhydride, acetonitrile, benzene, toluene, ethylbenzene, methylcyclohexane, chlorobenzene, or a nitroalkane.

In some embodiments, the diluent is a mixture of two or more compounds. In some embodiments, the diluent is a mixture of hexane and methyl chloride. In further embodiments, such mixture is from about 10/90 to about 90/10 hexane/methyl chloride by volume. In further embodiments, such mixture is from about 20/80 to about 80/20 hexane/methyl chloride by volume. In further embodiments, such mixture is from about 30/70 to about 70/30 hexane/methyl chloride by volume. In further embodiments, such mixture is from about 40/60 to about 60/40 hexane/methyl chloride by volume. In further embodiments, such mixture is about 50/50 hexane/methyl chloride by volume. In further embodiments, such mixture is about 60/40 hexane/methyl chloride by volume. In further embodiments, such mixture is about 40/60 hexane/methyl chloride by volume.

(x) Temperature

In some embodiments, the methods provided herein are performed at a temperature from about −120° C. to about 0° C. In some embodiments, the temperature is from about −110° C. to about −10° C. In some embodiments, the temperature is from about −100° C. to about −20° C. In some embodiments, the temperature is about −75° C., about −70° C., about −65° C., about −60° C., about −55° C., about −50° C., about −45° C., about −40° C., about −35° C., about −30° C., about −25° C., about −20° C., about −15° C., about −10° C., about −5° C., or about 0° C.

(xi) Quasiliying Carbocationic Polymerization

Quasiliving carbocationic polymerization conditions may be utilized to generate ionized polymers that are quasiliving and carbocationic, i.e., quasi-living carbocationic polyolefins. Under such conditions, polymerization proceeds with minimal irreversible chain termination and minimal chain transfer. Polymerizations conducted under quasiliving carbocationic polymerization conditions proceed by initiation followed by propagation, wherein propagating (active) species are in equilibrium with non-propagating (dormant) polymer chains. Such conditions may provide, in certain embodiments, narrow molecular weight distribution and polydispersity indexes approaching 1. In some embodiments, reaction systems suitable to carry out quasiliving carbocationic polymerizations include one or more Lewis acids, monomers, initiators, and electron donors. In some embodiments, the reaction system comprises a common ion salt or common ion salt precursor. In some embodiments, the reaction system comprises a diluent.

(c) Methods of Producing Mono- and Multi-Functional Telechelic Polymers from Compounds of Formula VIII Provided herein are methods for producing telechelic polymers comprising contacting a compound of formula VIII:

HO-T-(P-E)$_s$    VIII with a compound of formula IX:

D-(L$^1$)$_n$    IX wherein:
D is hydrocarbyl;
each T, independently, is a terpene;
each P, independently, is a polyolefin group;
each E, independently, is an end-cap group;
each L$^1$, independently, is:

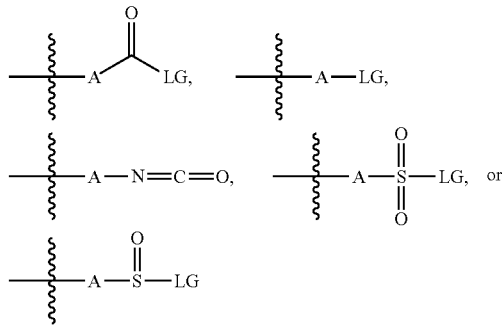

wherein each A, independently, is hydrocarbylene or a bond; and
LG is a leaving group;
n is an integer from 1-6; and
s is an integer from 1-2.

In some embodiments, the telechelic polymer produced has the formula VIIa:

D-(L-T-(P-E)$_s$)$_n$    VIIa wherein:
D is hydrocarbyl;
each L, independently, is:

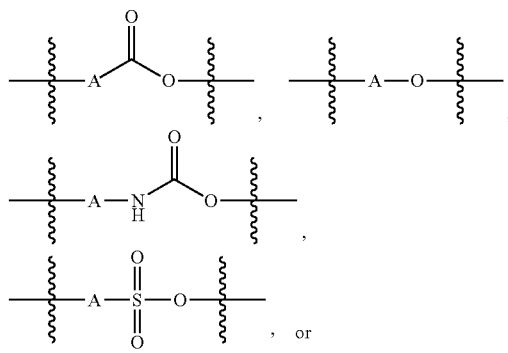

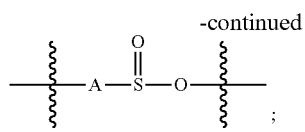

wherein each A, independently, is hydrocarbylene or a bond; and
the oxygen is bonded to T;
each T, independently, is a terpene;
each P, independently, is a polyolefin group;
each E, independently, is an end-cap group;
n is an integer from 1-6; and
each s, independently, is an integer from 1-2.

In some embodiments, the telechelic polymer produced has the formula X:

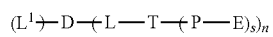

wherein:
D is hydrocarbyl;
each L, independently, is:

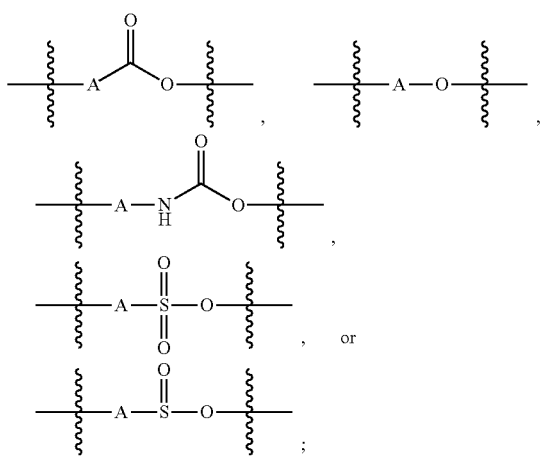

wherein each A, independently, is hydrocarbylene or a bond; and
the oxygen is bonded to T;
each $L^1$, independently, is:

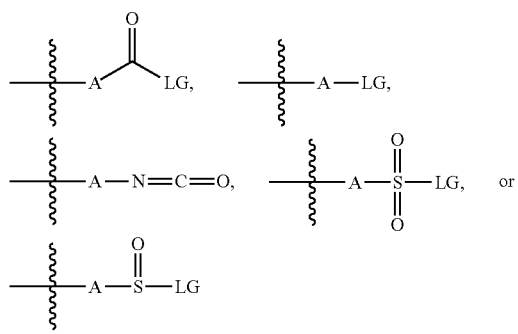

wherein each A, independently, is hydrocarbylene or a bond; and

LG is a leaving group
each T, independently, is a terpene;
each P, independently, is a polyolefin group;
each E, independently, is an end-cap group;
n and m are integers, wherein:
(1) the sum of m and n is 2-6; and
(2) m is at least 1; and
(3) n is at least 1; and
each s, independently, is an integer from 1-2.

In some embodiments, the polydispersity index of the telechelic polymer produced is less than 2.5, less than 2.4, less than 2.3, less than 2.2, less than 2.1, less than 2.0, less than 1.9, less than 1.8, less than 1.7, less than 1.6, less than 1.5, less than 1.4, less than 1.3, less than 1.2, or less than 1.1.

In some embodiments, the molecular weight of the telechelic polymer produced is about 1000, about 2000, about 3000, about 4000, about 5000, about 6000, about 7000, about 8000, about 9000, about 10000, about 20000, about 30000, about 40000, about 50000, about 60000, about 70000, about 80000, about 90000, or about 100000 g/mol.

(i) Compounds of Formula VIII
The compounds of formula VIII have the following structure:

HO-T-(P-E)$_s$ wherein:
each T, independently, is a terpene;
each P, independently, is a polyolefin group;
each E, independently, is n end-cap group; and
s is an integer from 1-2.

In some embodiments, T is a monoterpene, sesquiterpene, or triterpene. In some embodiments, T is a monoterpene.

In some embodiments, T is not substituted. In some embodiments, T is substituted with 1 to 3 substituents.

In some embodiments, T is:

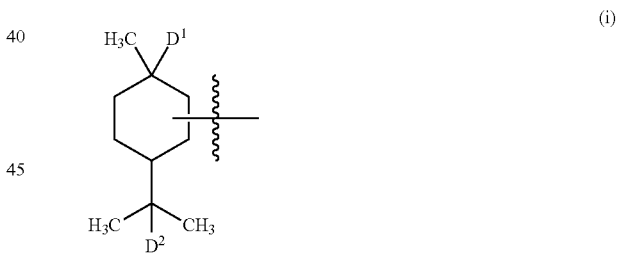

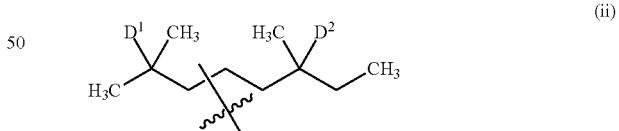

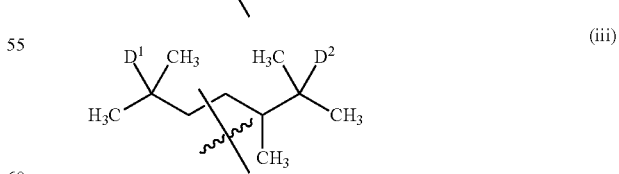

wherein
(1) if T has the formula (i), then T is substituted with 1-3 substituents and
(2) s is 1 or 2; wherein:
if s is 1, then one of $D^1$ and $D^2$ is H and the other is P-E; and
if s is 2, then each of $D^1$ and $D^2$, independently, is P-E The bond with the swiggly line represents the bond to the hydroxyl group.

In some embodiments, when T is

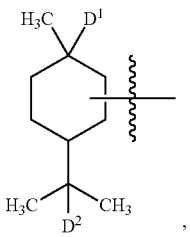

T is substituted with one or more substituents.

In some embodiments, s is 1.

In some embodiments, the OH is bonded to a primary carbon of T.

In some embodiments, T is:

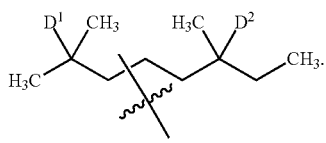

In some embodiments, T is:

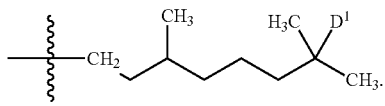

In some embodiments, P is polyisobutylene.

In some embodiments, the compound of formula VIII is:

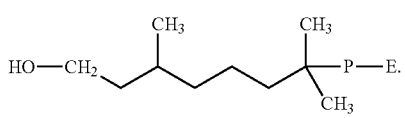

In some embodiments, E does not contain a heteroatom, e.g., nucleophilic heteroatom. In some embodiments, E does not contain a nitrogen.

In some embodiments, E is:

(1)

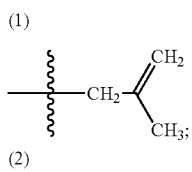

(2)

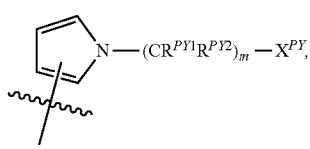

wherein $R^{PY1}$ and $R^{PY2}$ are independently in each —$(CR^{PY1}R^{PY2})$— unit selected from the group consisting of hydrogen and alkyl from 1 to 6 carbon atoms;

m is an integer from 1 to 20; and $X^{PY}$ is selected from the group consisting of hydrogen, alkyl, aryl, alkaryl, alkoxy, heteroaryl, nitro, ureido, —OC(O)$R^{PY3}$, —C(O)$R^{PY4}$, —C(O)O$R^{PY5}$, —C(O)N$R^{PY6}R^{PY7}$, —P($R^{PY8}$)$_3$, —P(O$R^{PY9}$)$_3$, —S$R^{PY10}$, —OSO$_3R^{PY11}$, and —S(O)$R^{PY12}$;

wherein $R^{PY3}$ is alkyl or alkenyl; and $R^{PY4}$, $R^{PY5}$, $R^{PY7}$, $R^{PY8}$, $R^{PY9}$, $R^{PY10}$, $R^{PY11}$, and $R^{PY12}$ are alkyl;

(3)

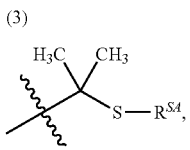

wherein $R^{SA}$ is alkyl, aryl, aralkyl, alkaryl,

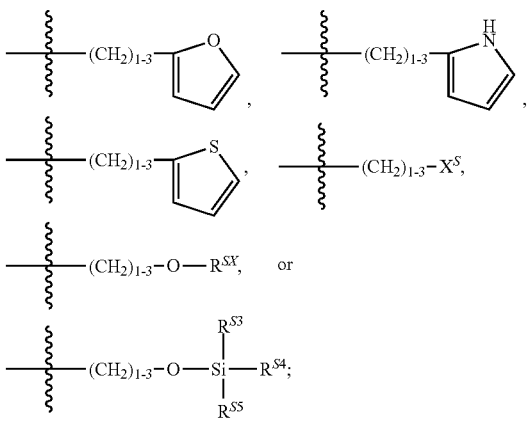

$X^S$ is halo or a pseudohalide;
$R^{SX}$ is alkyl or aryl;
$R^{S3}$ is tert-butyl; and
$R^{S4}$ and $R^{S5}$ are each, independently, alkyl, aryl, aralkyl, or alkaryl;

(4)

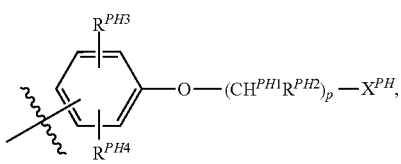

wherein
$R^{PH1}$ and $R^{PH2}$ are each independently in each —$(CR^{PH1}R^{PH2})$ unit, —H or alkyl, and p is an integer from 0-20, wherein:
(a) if p is 0, then $R^{PH3}$ and $R^{PH4}$ are each, independently, alkyl, and
$X^{PH}$ is —H;
(b) if p is 1, then $R^{PH3}$ and $R^{PH4}$ are each, independently —H, alkyl, or alkoxy, and $X^{PH}$ is —H, alkyl, alkenyl, alkynyl, alkaryl, aralkyl, aryl, heteroaryl, or

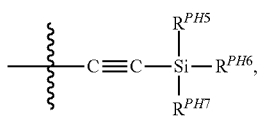

wherein $R^{PH5}$-$R^{PH7}$ are each, independently, alkyl or aryl;

(c) if p is 2, then $R^{PH3}$ and $R^{PH4}$ are each, independently —H, alkyl, or alkoxy, and $X^{PH}$ is —H, alkyl, alkenyl, alkynyl, alkaryl, aralkyl, aryl, heteroaryl, alkoxy, —F, —Cl, —Br, —I, —At, —CN, —NC, —NCO, —OCN, —NCS, —SCN, —OC(O)$R^{PH8}$, —C(O)O$R^{PH9}$, —C(O)N$R^{PH10}R^{PH11}$, or 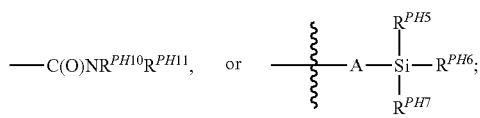

wherein A is

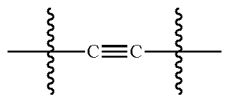 [SMILES: *C#C*]

or a single bond, $R^{PH5}$ to $R^{PH7}$ are each, independently, alkyl, alkenyl, alkynyl, alkaryl, aralkyl, aryl, heteroaryl, alkoxy, hydroxy, —N$R^{PH10}R^{PH11}$, —F, —Cl, —Br, —I, or —At, $R^{PH8}$ is alkyl, alkenyl, alkynyl, alkaryl, aryl, or heteroaryl, and $R^{PH9}$ to $R^{PH11}$ are each, independently, —H, alkyl, alkenyl, alkynyl, alkaryl, aryl, or heteroaryl, or when —O—(C$R^{PH1}R^{PH2}$)$_p$—$X^{PH}$ is ortho to $R^{PH4}$, then $X^{PH}$ and $R^{PH4}$, together, with the atoms to which $X^{PH}$ and $R^{PH4}$ are attached, may form a ring; and (d) if p is 3-20, then $R^{PH3}$ and $R^{PH4}$ are each, independently —H, alkyl, or alkoxy, and X is —H, alkyl, alkenyl, alkynyl, alkaryl, aralkyl, aryl, heteroaryl, alkoxy, aryloxy, heteroaryloxy, alkaryloxy, —OH, —F, —Cl, —Br, —I, —At, —CN, —NC, —NCO, —OCN, —NCS, —SCN, —OC(O)$R^{PH8}$, —C(O)O$R^{PH9}$, —C(O)N$R^{PH10}R^{PH11}$,

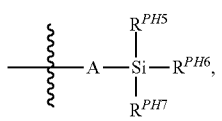

or —N$R^{PHX}R^{PHY}$;
wherein A is

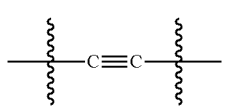

or a single bond, $R^{PHX}$ and $R^{PHY}$ are each, independently, —H, alkyl, alkenyl, alkynyl, cycloalkyl, aryl, heteroaryl, heterocyclyl, —C(O)$R^{PHZ}$, wherein $R^{PHZ}$ is —H, alkyl, alkenyl, alkynyl, cycloalkyl, aryl, heteroaryl, heterocyclyl, —O$R^{PH8}$, or —N$R^{PH10}R^{PH11}$;

$R^{PH5}$ to $R^{PH7}$ are each, independently, alkyl, alkenyl, alkynyl, alkaryl, aralkyl, aryl, heteroaryl, alkoxy, hydroxy, —N$R^{PH10}R^{PH11}$; —F, —Cl, —Br, —I, or —At, $R^{PH8}$ is alkyl, alkenyl, alkynyl, alkaryl, aryl, or heteroaryl, and $R^{PH9}$ to $R^{PH11}$ are each independently, —H, alkyl, alkenyl, alkynyl, alkaryl, aryl, or heteroaryl;

(5)

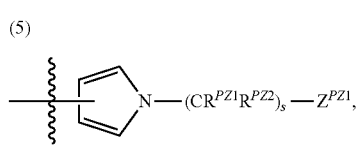

wherein $R^{PZ1}$ and $R^{PZ2}$ are independently in each —(C$R^{PZ1}R^{PZ2}$)— unit, hydrogen or alkyl from 1 to 6 carbon atoms;

s is an integer from 2 to 20;

$Z^{PZ1}$ is —F, —Cl, —Br, —I, —At, —CN, —NC, —N$_3$, —NCO, —OCN, —NCS or —SCN;

(6)

(7)

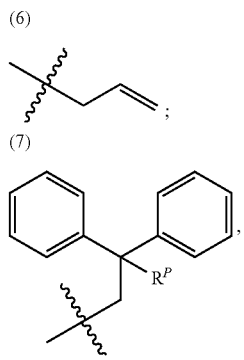

wherein $R^P$ is halo or hydrocarbyl of 1-20 carbon atoms optionally substituted with halo or pseudohalo;

(8) furan or furan substituted with hydrocarbyl or substituted hydrocarbyl; or (9) thiophene or thiophene substituted with hydrocarbyl or substituted hydrocarbyl.

In some embodiments, the furan substituted with hydrocarbyl or substituted hydrocarbyl has the following structure:

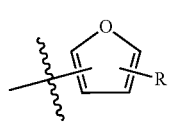

wherein R is hydrocarbyl or substituted hydrocarbyl.

In some embodiments, the thiophene or thiophene substituted with hydrocarbyl or substituted hydrocarbyl has the following structure:

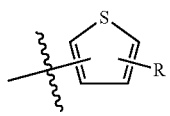

wherein R is hydrocarbyl or substituted hydrocarbyl.
In some embodiments, E is:

(1)

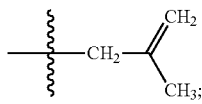

(2)

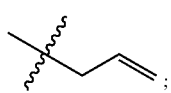

(3) pyrrole or N-hydrocarbylpyrrole, wherein the hydrocarbyl contains 1-20 carbon atoms;
(4) —S—$R^{SA}$, wherein $R^{SA}$ is hydrocarbyl of 1-20 carbon atoms optionally substituted with halo or pseudohalo;

(5)

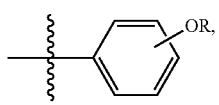

wherein R is hydrocarbyl of 1-20 carbon atoms optionally substituted with halo or pseudohalo;
(6) haloalkyl or pseudohaloalkyl;
(7) —$CH_2CH$=$CHCH_2$—X, wherein X is halo; or (8)

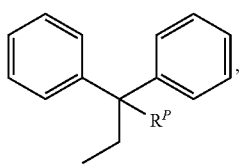

wherein $R^P$ is halo or hydrocarbyl of 1-20 carbon atoms optionally substituted with halo or pseudohalo.
In some embodiments, the N-hydrocarbylpyrrole is:

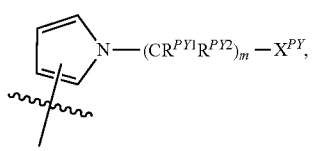

wherein $R^{PY1}$ and $R^{PY2}$ are independently in each —($CR^{PY1}R^{PY2}$)— unit selected from the group consisting of hydrogen and alkyl from 1 to 6 carbon atoms;
m is an integer from 1 to 20; and
$X^{PY}$ is selected from the group consisting of hydrogen, alkyl, aryl, alkaryl, alkoxy, heteroaryl, nitro, ureido, —OC(O)$R^{PY3}$, —C(O)$R^{PY4}$, —C(O)O$R^{PY5}$, —C(O)N$R^{PY6}R^{PY7}$, —P($R^{PY8}$)$_3$, —P(O$R^{PY9}$)$_3$, —S$R^{PY10}$, —OSO$_3R^{PY11}$, and —S(O)$R^{PY12}$;
wherein $R^{PY3}$ is alkyl or alkenyl; and $R^{PY4}$, $R^{PY5}$, $R^{PY7}$, $R^{PY8}$, $R^{PY9}$, $R^{PY10}$, $R^{PY11}$, and $R^{PY12}$ are alkyl.
In some embodiments, the N-hydrocarbylpyrrole is:

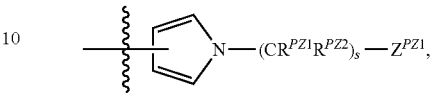

wherein $R^{PZ1}$ and $R^{PZ2}$ are independently in each —($CR^{PZ1}R^{PZ2}$)— unit, hydrogen or alkyl from 1 to 6 carbon atoms;
s is an integer from 2 to 20.
In some embodiments, E is:

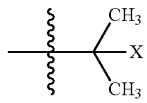

wherein X is a halide. In some embodiments, X is —Cl.
In some embodiments, the end-cap group is:

In some embodiments, the end-cap group is a 1-substituted-1,1-diaryl ethylene group. Examples include, but are not limited to, those described in Fodor et al., *J.M.S.-Pure Appl. Chem.*, A32(3): 575-591 (1995); Hadjikyriacou et al., *J.M.S.-Pure Appl. Chem.*, A32(6): 1137-1153 (1995); Kamigaito et al., *Macromolecules*, 28: 5671-5675 (1995); Li et al., *Macromolecules*, 28: 1383-1389 (1995); Hadjikyriacou et al., *Macromolecules*, 29: 5261-5267 (1996); Mayr et al., *Macromolecules*, 29: 6110-6113 (1996); and Kwon et al., *Macromolecules*, 35: 3348-3357 (2002), which are incorporated herein by reference in their entireties.

In some embodiments, the end-cap group is an allyl halide, such as, but not limited to, those described in Knoll et al., U.S. Pat. No. 5,212,248, De et al., *Macromolecules*, 38:6861-6870 (2006); and De et al., *Macromolecules*, 39: 7527-7533 (2006), the entireties of which are incorporated by reference.

In some embodiments, the end-cap group is derived from a long chain olefin quenching agent, such as those described in Yamanaka et al., U.S. Pat. No. 5,777,037 and Chiba et al., European Patent Application No. 1,225,186, the entireties of which are incorporated by reference.

In some embodiments, the end-cap group is derived from an allylsilylpseudohalide, quenching agent, including, but not limited to those described in Shaffer, U.S. Pat. No. 5,580,935, which is incorporated herein by reference in its entirety.

In some embodiments, the end-cap group a furan or substituted furan, including but not limited to those described in Hadjikyriacou et al., *Macromolecules*, 32(20): 6393-6399 (1999) and Hadjikyriacou et al, *Macromolecules*, 33: 730-733 (2000), the entireties of which are incorporated herein by reference. Examples include, but are not limited to, 2-alkyl furans, such as 2-methyl furan and 2-tert-butyl furan. Other examples include, but are not limited to, bis(furanyl) end cap groups such as 2,5-bis(2-furyl-2-propyl)furan. Also provided herein are compounds wherein a single bis(furanyl) end cap group is bonded to two P moieties, which are obtainable through a coupling reaction described in Hadjikyriacou et al, *Macromolecules,* 33: 730-733 (2000), rather than one P moiety as depicted above.

In some embodiments, the end-cap group is thiophene, including, for example, 2-thiophene, or substituted thiophene.

In some embodiments, the end-cap group is a triarylamine. Example includes, but is not limited to, triphenylamine. In some embodiments, the end-cap group is

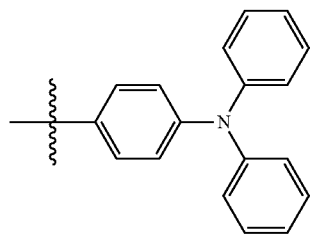

In some embodiments, the end-cap group is a vinylalkoxybenzene. Examples include, but are not limited to, those described in Japanese Patent Publication No. 05186513A, which is incorporated herein by reference in its entirety.

The compounds of formula VIII may be synthesized using those methods described in U.S. patent application Ser. No. 12/813,411, which is incorporated herein by reference in its entirety.

(ii) Compound of Formula IX

The compounds of formula IX have the following structure:

$$D\text{-}(L^1)_n \qquad \text{IX}$$

wherein:
D is hydrocarbyl;
each $L^1$, independently, is:

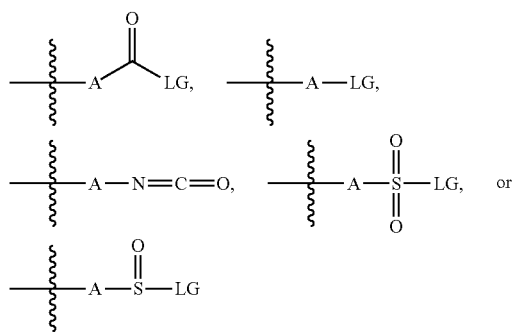

wherein each A, independently, is hydrocarbylene or a bond; and
LG is a leaving group; and
n is an integer from 1-6.

In some embodiments, D is hydrocarbyl of 1-25 carbons. In some embodiments, D is hydrocarbyl of 1-20 carbons. In some embodiments, D is hydrocarbyl of 1-15 carbons. In some embodiments, D is hydrocarbyl of 1-10 carbons. In some embodiments, D is hydrocarbyl of 1-6 carbons.

In some embodiments, D is alkyl, aralkyl, or alkaryl. In some embodiments, D is alkyl of 1-10 carbons. In some embodiments, D is alkyl of 1-10 carbons. In some embodiments, D is alkyl of 1-6 carbons. In some embodiments, D is aralkyl of 7-20 carbons. In some embodiments, D is aralkyl of 7-15 carbons. In some embodiments, D is alkaryl of 7-20 carbons. In some embodiments, D is alkaryl of 7-15 carbons.

In some embodiments, n is 1 and D is:

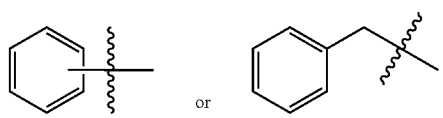

In some embodiments, n is 2 and D is:

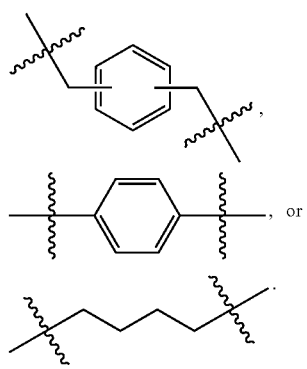

In some embodiments, n is 3 and D is:

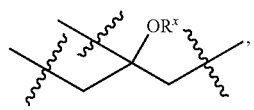

wherein $R^x$ is H or hydrocarbyl.

In some embodiments D is $Z(Y)_r$; wherein:
Y, independently, is aryl;
Z is hydrocarbyl;
L is bonded to a Y of the of $Z(Y)_r$; and
r is an integer from 1 to 3.

In some embodiments, Z is hydrocarbyl of 1 to 10 carbons. In some embodiments, Z is hydrocarbyl of 1 to 6 carbons. In some embodiments, Z is alkyl. In some embodiments, Z is cycloalkyl.

In some embodiments, r is 1 to 2. In some embodiments, r is 1.

In some embodiments, D is $Y_p$, wherein Y is aryl and p is an integer from 1-4.

In some embodiments, p is 1 to 2. In some embodiments, p is 1.

In some embodiments, for the $Y_p$ or $Z(Y)_r$, Y is aryl, wherein the aryl is monocyclic, bicyclic, or tricyclic. In certain embodiments, the aryl is monocyclic. In some embodiments, the aryl does not contain a heteroatom. In some embodiments, the aryl contains 6 to 12 carbons. In some embodiments, the aryl is phenyl.

In some embodiments, L¹ is:

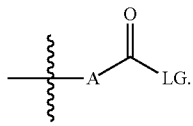

In some embodiments, L¹ is:

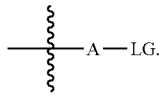

In some embodiments, A is hydrocarbyl of 1 to 10, 1 to 6, or 1 to 3 carbons.

In some embodiments, A is a bond.

In certain embodiments, L¹ is

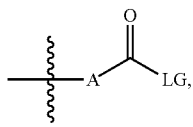

wherein A is alkyl.

In certain embodiments, L¹ is

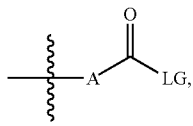

wherein A is alkyl of 1-10 carbons.

In certain embodiments, L¹ is

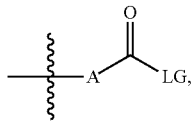

wherein A is alkyl of 1-6 carbons.

In certain embodiments, L¹ is

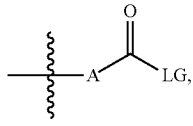

wherein A is alkyl of 1-3 carbons.

In certain embodiments, L¹ is

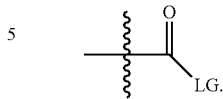

In some embodiments, L¹ is

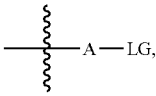

wherein A is alkyl.

In certain embodiments, L¹ is

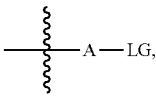

wherein A is alkyl of 1-10 carbons.

In certain embodiments, L¹ is

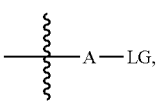

wherein A is alkyl of 1-6 carbons.

In certain embodiments, L¹ is

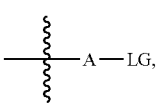

wherein A is alkyl of 1-3 carbons.

In certain embodiments, L¹ is

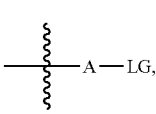

wherein A is alkyl, wherein the alkyl is not branched or cyclic. In some embodiments, the leaving group is —Cl, —Br, —I, —OH, —OR$^N$, —OC(O)R$^N$, —OC(O)OR$^N$, —OC(O)NR$^N$, —OS(O)$_2$NR$^N$, —OMs, —OTs, or —OP(O)(OR$^N$)$_2$, wherein R$^N$ is hydrocarbyl. In some embodiments, R$^N$ is alkyl or aryl. In some embodiments, R$^N$ is alkyl of 1 to 6 carbons. In some embodiments, the alkyl is methyl. In some embodiments, R$^N$ is —Cl or —Br.

In some embodiments, n is 1 to 4. In some embodiments, n is 1 to 3.

In some embodiments, the compound of formula IX is:

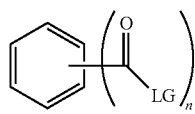

wherein LG is a leaving group and n is 1-4. In some embodiments, n is 1-3.

The compounds of formula IX may be obtained commercially or using synthetic techniques known to those of ordinary skill in the art, such as those described in Richard C. Larock, Comprehensive Organic Transformations: A Guide to Functional Group Preparations (2nd ed. 1999) and/or Michael B. Smith & Jerry March, March's Advanced Organic Chemistry, Reactions, Mechanisms, and Structure (5th ed. 2001), the entireties of which are incorporated herein by reference.

Compounds having a carbonyl bonded to a leaving group may be obtained commercially or through techniques known to those of ordinary skill in the art. For example, as shown below, compounds of the formula IXa may be made from the corresponding acids of formula XI. Acids of formula XI are commercially available or readily from obtainable from Grignard reagents of formula X, or their reactive equivalents, by reaction of these Grignard reagents, or their reactive equivalent, with carbon dioxide.

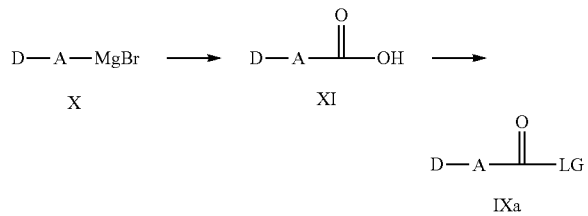

Compounds of formula IXb:

  IXb are available commercially or readily obtainable from methods known to those of ordinary skill in the art. For example, the leaving group may be installed from a precursor having a functional group capable of reacting with a reagent that effects the installation of the leaving group. Suitable functional groups include, but are not limited to, a hydroxyl groups or olefins.

Isocyanates are also available commercially or readily obtainable using techniques known to those of ordinary skill in the art. For example, as shown below, isocyanates of formula IXc may be obtained from amines of formula XII by reacting such amines with phosgene.

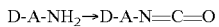  XII IXc

Sulfonyl and sulfinyl chlorides are also available commercially or readily obtainable using techniques known in the art. For example, sulfonyl halides may be synthesized from sulfonic acids, by free radical halosulfonation, e.g., Reed reaction, by reacting diazonium salts with $SO_2$, or by reacting Grignard reagents (or their reactive equivalents) with $SO_2$ or sulfuryl chloride. For example, compounds of formula IXd may be synthesized from compounds of formula X by reacting compounds of formula X with $SO_2Cl_2$, as shown below.

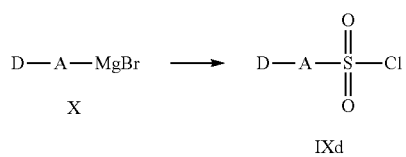

(d) Telechelic Polymers (i) Compounds of Formula VII

The methods described herein provide compounds of formula VII:

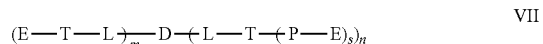

wherein:
D is hydrocarbyl;
each L, independently, is:

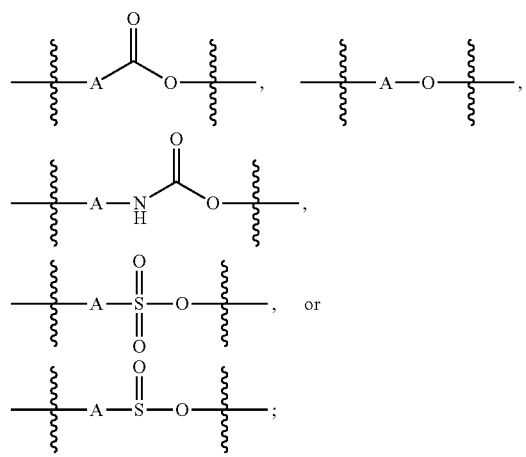

wherein each A, independently, is hydrocarbylene or a bond; and
the oxygen is bonded to T;
each T, independently, is a terpene;
each P, independently, is a polyolefin group;
each E, independently, is an end-cap group;
n and m are integers, wherein
(1) the sum of n and m is 1 to 6; and
(2) n is at least 1; and
each s, independently, is an integer from 1-2.

In some embodiments, D is hydrocarbyl of 1-25 carbons. In some embodiments, D is hydrocarbyl of 1-20 carbons. In some embodiments, D is hydrocarbyl of 1-15 carbons. In some embodiments, D is hydrocarbyl of 1-10 carbons. In some embodiments, D is hydrocarbyl of 1-6 carbons.

In some embodiments, D is alkyl, alkaryl, or aralkyl.

In some embodiments, D is alkyl of 1-10 carbons. In some embodiments, D is alkyl of 1-6 carbons. In some embodiments, D is alkaryl of 7-20 carbons. In some embodiments, D is alkaryl of 7-15 carbons. In some embodiments, D is aralkyl of 7-20 carbons. In some embodiments, D is aralkyl of 7-15 carbons In some embodiments, n is 1 and D is:

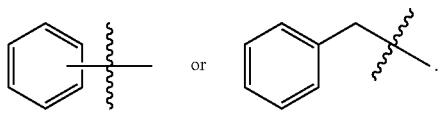 or 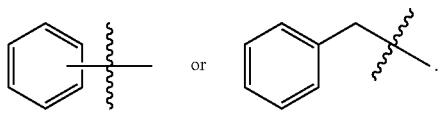

In some embodiments, n is 2 and D is:

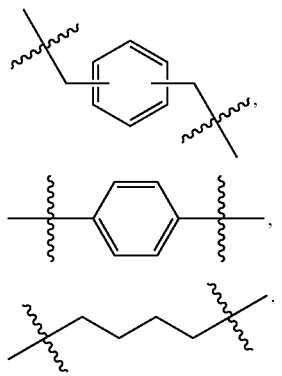, or

In some embodiments, n is 3 and D is:

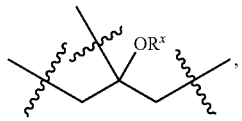, wherein $R^x$ is H or hydrocarbyl.

In some embodiments D is $Z(Y)_r$; wherein:

Y, independently, is aryl;

Z is hydrocarbyl;

L is bonded to a Y of the of $Z(Y)_r$; and r is an integer from 1 to 3.

In some embodiments, Z is hydrocarbyl of 1 to 10 carbons. In some embodiments, Z is hydrocarbyl of 1 to 6 carbons. In some embodiments, Z is alkyl. In some embodiments, Z is cycloalkyl.

In some embodiments, r is 1 to 2. In some embodiments, r is 1.

In some embodiments, D is $Y_p$, wherein Y is aryl and p is an integer from 1-4.

In some embodiments, p is 1 to 2. In some embodiments, p is 1.

In some embodiments, for the $Y_p$ or $Z(Y)_r$, Y is aryl, wherein the aryl is monocyclic, bicyclic, or tricyclic. In certain embodiments, the aryl is monocyclic. In some embodiments, the aryl does not contain a heteroatom. In some embodiments, the aryl contains 6 to 12 carbons. In some embodiments, the aryl is phenyl.

In some embodiments, D does not contain a heteroatom.

In some embodiments, L is

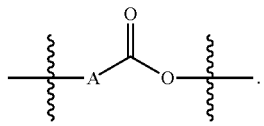.

In some embodiments, L is

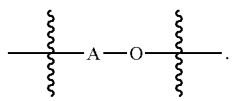.

In some embodiments, A is hydrocarbyl of 1 to 10, 1 to 6, or 1 to 3 carbons.

In some embodiments, A is a bond.

In certain embodiments, L is

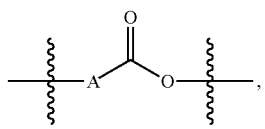, wherein A is alkyl.

In certain embodiments, L is

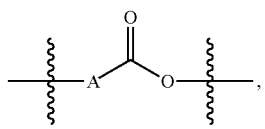, wherein A is alkyl of 1-10 carbons.

In certain embodiments, L is

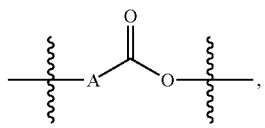, wherein A is alkyl of 1-6 carbons.

In certain embodiments, L is

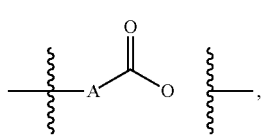, wherein A is alkyl of 1-3 carbons.

In some embodiments, L is

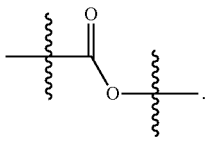 [SMILES: *OC(*)=O]

In certain embodiments, L is

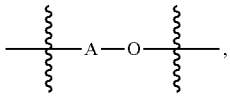

wherein A is alkyl.

In certain embodiments, L is

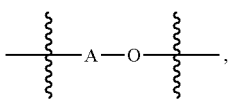

wherein A is alkyl of 1-10 carbons.

In certain embodiments, L is

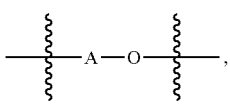

wherein A is alkyl of 1-6 carbons.

In certain embodiments, L is

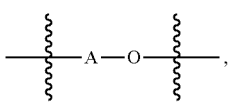

wherein A is alkyl of 1-3 carbons.

In some embodiments, L is

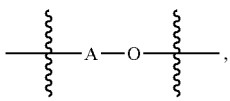

wherein A is alkyl, wherein the alkyl is not branched or cyclic.

In some embodiments, the terpene is a monoterpene, sesquiterpene, or triterpene. In some embodiments, the terpene is a monoterpene.

In some embodiment, the terpene is not substituted.

In some embodiments, T is substituted with 1 to 3 substituents.

In some embodiments, T is:

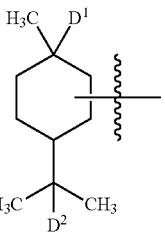

(i)

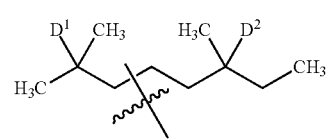

(ii)

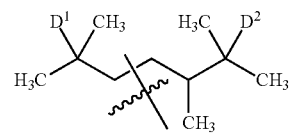

(iii)

wherein:
(1) if T has the formula (i), then T is substituted with 1-3 substituents and
(2) s is 1 or 2; wherein:
  if s is 1, then one of $D^1$ and $D^2$ is H and the other is P-E; and
  if s is 2, then each of $D^1$ and $D^2$, independently, is P-E.

In some embodiments, when T is

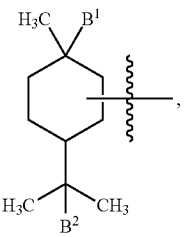

T is substituted with one or more substituents.

In some embodiments, s is 1.

In some embodiments, L is bonded to a primary carbon of T.

In some embodiments, T is:

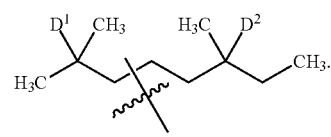

In some embodiments, T is:

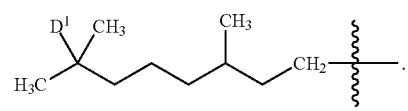

In some embodiments, m is 0. In some embodiments, m is 1-3.

In some embodiments, n is an integer from 1-4. In some embodiments, n is an integer from 1-3. In some embodiments, n is an integer from 1-2. In some embodiments, n is 1. In certain embodiments, n is 1 and m is 0-3. In certain embodiments, n is 2 and m is 0-2. In certain embodiments, n is 3 and m is 0-1. In certain embodiments, n is 4 and m is 0. In some embodiments, the sum of n and m is 1-4. In some embodiments, the sum of n and m is 1-3.

In some embodiments, the compound of formula VII is a compound of formula VII(a):

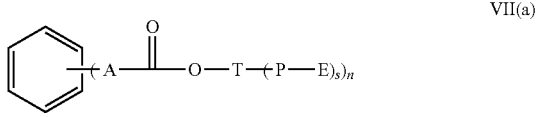

VII(a)

wherein A, T, P, E, s, and n are as defined herein for the compounds of formula VII.

In certain embodiments, the compound of formula VII(a) is:

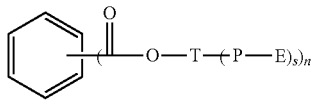

wherein n is an integer from 1 to 6 and s is an integer from 1-2. In certain embodiments, n is an integer from 1 to 4. In certain embodiments, n is an integer from 1 to 3. In some embodiments, is 1.

In some embodiments, the compound of formula VII(a) is:

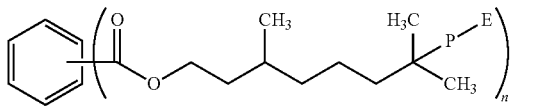

wherein n is an integer from 1-5. In certain embodiments, n is an integer from 1 to 4. In certain embodiments, n is a an integer from 1 to 3.

In some embodiments, the compound of formula VII is a compound of formula VII(b):

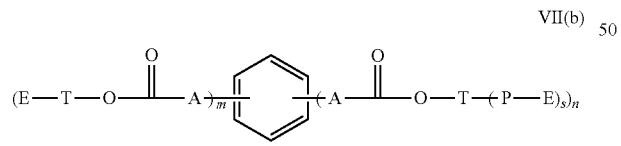

VII(b)

wherein A, T, P, E, s, n, and m are as defined herein for the compounds of formula VII.

In some embodiments, the compound of formula VII(b) is:

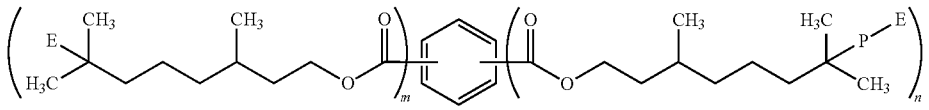

wherein the sum of n and m is 1-4. In some embodiments, the sum of n and m is 1-3. In some embodiments, m is 1-2.

In some embodiments, P is polyisobutylene.

The end cap group, as used herein, refers to a monovalent molecule that can react at a desired time with another molecule. In some embodiments, E is an end-cap group selected from the group consisting of (1)

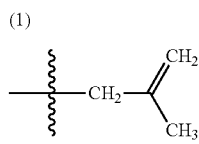

(2)

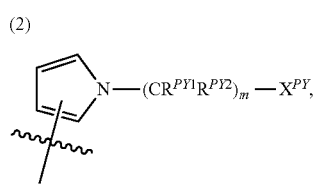

wherein $R^{PY1}$ and $R^{PY2}$ are independently in each $-(CR^{PY1}R^{PY2})-$ unit selected from the group consisting of hydrogen and alkyl from 1 to 6 carbon atoms;

m is an integer from 1 to 20; and $X^{PY}$ is selected from the group consisting of hydrogen, alkyl, aryl, alkaryl, alkoxy, heteroaryl, nitro, ureido, $-OC(O)R^{PY3}$, $-C(O)R^{PY4}$, $-C(O)OR^{PY5}$, $-C(O)NR^{PY6}R^{PY7}$, $-P(R^{PY8})_3$, $-P(OR^{PY9})_3$, $-SR^{PY10}$, $-OSO_3R^{PY11}$, and $-S(O)R^{PY12}$;

wherein $R^{PY3}$ is alkyl or alkenyl; and $R^{PY4}$, $R^{PY5}$, $R^{PY7}$, $R^{PY8}$, $R^{PY9}$, $R^{PY10}$, $R^{PY11}$, and $R^{PY12}$ are alkyl;

(3)

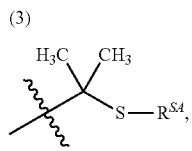

wherein $R^{SA}$ is alkyl, aryl, aralkyl, alkaryl,

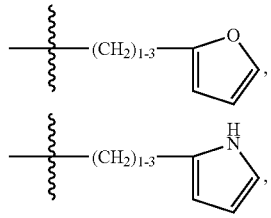

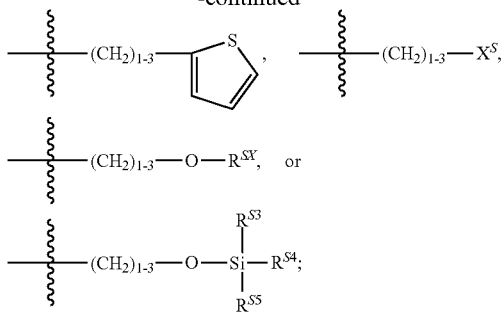

$X^S$ is halo or a pseudohalide;
$R^{SX}$ is alkyl or aryl;
$R^{S3}$ is tert-butyl; and
$R^{S4}$ and $R^{S5}$ are each, independently, alkyl, aryl, aralkyl, or alkaryl (4)

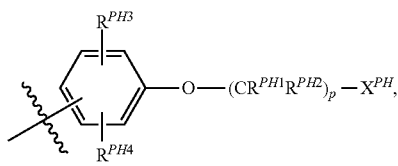

wherein
$R^{PH1}$ and $R^{PH2}$ are each independently in each $-(CR^{PH1}R^{PH2})$ unit, $-H$ or alkyl, and p is an integer from 0-20, wherein
(a) if p is 0, then $R^{PH3}$ and $R^{PH4}$ are each, independently, alkyl, and
  $X^{PH}$ is $-H$;
(b) if p is 1, then $R^{PH3}$ and $R^{PH4}$ are each, independently $-H$, alkyl, or alkoxy, and $X^{PH}$ is $-H$, alkyl, alkenyl, alkynyl, alkaryl, aralkyl, aryl, heteroaryl, or

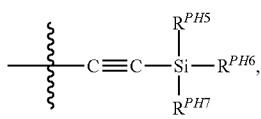

wherein $R^{PH5}$-$R^{PH7}$ are each, independently, alkyl or aryl;
(c) if p is 2, then $R^{PH3}$ and $R^{PH4}$ are each, independently $-H$, alkyl, or alkoxy, and $X^{PH}$ is $-H$, alkyl, alkenyl, alkynyl, alkaryl, aralkyl, aryl, heteroaryl, alkoxy, $-F$, $-Cl$, $-Br$, $-I$, $-At$, $-CN$, $-NC$, $-NCO$, $-OCN$, $-NCS$, $-SCN$, $-OC(O)R^{PH8}$, $-C(O)OR^{PH9}$, $-C(O)NR^{PH10}R^{PH11}$, or

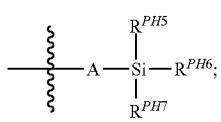

wherein A is

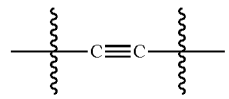

or a single bond,
$R^{PH5}$ to $R^{PH7}$ are each, independently, alkyl, alkenyl, alkynyl, alkaryl, aralkyl, aryl, heteroaryl, alkoxy, hydroxy, $-NR^{PH10}R^{PH11}$, $-F$, $-Cl$, $-Br$, $-I$, or $-At$,
$R^{PH8}$ is alkyl, alkenyl, alkynyl, alkaryl, aryl, or heteroaryl, and
$R^{PH9}$ to $R^{PH11}$ are each, independently, $-H$, alkyl, alkenyl, alkynyl, alkaryl, aryl, or heteroaryl, or when $-O-(CR^{PH1}R^{PH2})_p-X^{PH}$ is ortho to $R^{PH4}$, then $X^{PH}$ and $R^{PH4}$, together, with the atoms to which $X^{PH}$ and $R^{PH4}$ are attached, may form a ring; and
(d) if p is 3-20, then $R^{PH3}$ and $R^{PH4}$ are each, independently $-H$, alkyl, or alkoxy, and X is $-H$, alkyl, alkenyl, alkynyl, alkaryl, aralkyl, aryl, heteroaryl, alkoxy, aryloxy, heteroaryloxy, alkaryloxy, $-OH$, $-F$, $-Cl$, $-Br$, $-I$, $-At$, $-CN$, $-NC$, $-NCO$, $-OCN$, $-NCS$, $-SCN$, $-OC(O)R^{PH8}$, $-C(O)OR^{PH9}$, $-C(O)NR^{PH10}R^{PH11}$

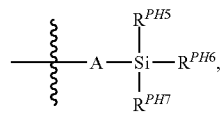

or $-NR^{PHX}R^{PHY}$;
wherein A is

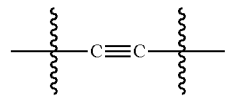 [SMILES: *C#C*]

or a single bond,
$R^{PHX}$ and $R^{PHY}$ are each, independently, $-H$, alkyl, alkenyl, alkynyl, cycloalkyl, aryl, heteroaryl, heterocyclyl, $C(O)R^{PHZ}$,
  wherein $R^{PHZ}$ is $-H$, alkyl, alkenyl, alkynyl, cycloalkyl, aryl, heteroaryl, heterocyclyl, $-OR^{PH8}$, or $-NR^{PH10}R^{PH11}$;
$R^{PH5}$ to $R^{PH7}$ are each, independently, alkyl, alkenyl, alkynyl, alkaryl, aralkyl, aryl, heteroaryl, alkoxy, hydroxy, $-NR^{PH10}R^{PH11}$, $-F$, $-Cl$, $-Br$, $-I$, or $-At$,
$R^{PH8}$ is alkyl, alkenyl, alkynyl, alkaryl, aryl, or heteroaryl, and $R^{PH9}$ to $R^{PH11}$ are each independently, $-H$, alkyl, alkenyl, alkynyl, alkaryl, aryl, or heteroaryl; and (5)

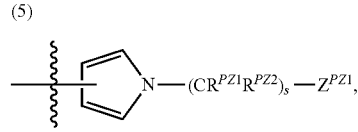

wherein $R^{PZ1}$ and $R^{PZ2}$ are independently in each —($CR^{PZ1}R^{PZ2}$)— unit, hydrogen or alkyl from 1 to 6 carbon atoms;

s is an integer from 2 to 20;

$Z^{PZ1}$ is —F, —Cl, —Br, —I, —At, —CN, —NC, —$N_3$, —NCO, —OCN, —NCS or —SCN;

(6)

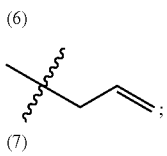

(7)

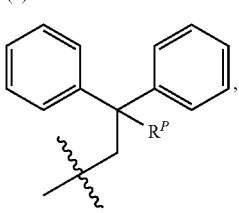

wherein $R^P$ is halo or hydrocarbyl of 1-20 carbon atoms optionally substituted with halo or pseudohalo;

(8) furan or furan substituted with hydrocarbyl or substituted hydrocarbyl; or (9) thiophene or thiophene substituted with hydrocarbyl or substituted hydrocarbyl.

In some embodiments, the furan substituted with hydrocarbyl or substituted hydrocarbyl has the following structure:

wherein R is hydrocarbyl or substituted hydrocarbyl.

In some embodiments, the thiophene or thiophene substituted with hydrocarbyl or substituted hydrocarbyl has the following structure:

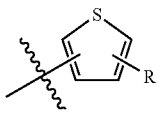

wherein R is hydrocarbyl or substituted hydrocarbyl.

In some embodiments, the end-cap group is:

(1)

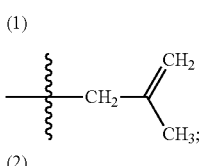

(2)

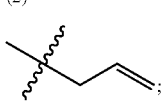

(3) pyrrole or N-hydrocarbylpyrrole, wherein the hydrocarbyl contains 1-20 carbon atoms;

(4) —S—$R^{SA}$, wherein $R^{SA}$ is hydrocarbyl of 1-20 carbon atoms optionally substituted with halo or pseudohalo;

(5)

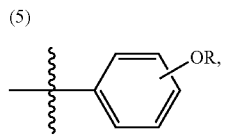

wherein R is hydrocarbyl of 1-20 carbon atoms optionally substituted with halo or pseudohalo;

(6) haloalkyl or pseudohaloalkyl;

(7) —$CH_2CH$=$CHCH_2$—X, wherein X is halo; or (8)

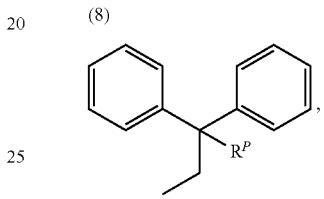

wherein $R^P$ is halo or hydrocarbyl of 1-20 carbon atoms optionally substituted with halo or pseudohalo In some embodiments, the N-hydrocarbylpyrrole is:

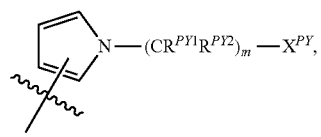

wherein $R^{PY1}$ and $R^{PY2}$ are independently in each —($CR^{PY1}R^{PY2}$)— unit selected from the group consisting of hydrogen and alkyl from 1 to 6 carbon atoms;

m is an integer from 1 to 20; and $X^{PY}$ is selected from the group consisting of hydrogen, alkyl, aryl, alkaryl, alkoxy, heteroaryl, nitro, ureido, —OC(O)$R^{PY3}$, —C(O)$R^{PY4}$, —C(O)O$R^{PY5}$, —C(O)NR$^{PY6}R^{PY7}$, —P($R^{PY8}$)$_3$, —P(OR$^{PY9}$)$_3$, —S$R^{PY10}$, —OSO$_3R^{PY11}$, and —S(O)$R^{PY12}$;

wherein $R^{PY3}$ is alkyl or alkenyl; and $R^{PY4}$, $R^{PY5}$, $R^{PY7}$, $R^{PY8}$, $R^{PY9}$, $R^{PY10}$, $R^{PY11}$, and $R^{PY12}$ are alkyl.

In some embodiments, the N-hydrocarbylpyrrole is:

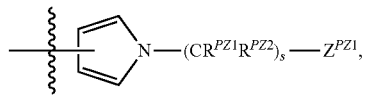

wherein $R^{PZ1}$ and $R^{PZ2}$ are independently in each —($CR^{PZ1}R^{PZ2}$)— unit, hydrogen or alkyl from 1 to 6 carbon atoms;

s is an integer from 2 to 20.

In some embodiments, the end cap group is:

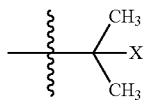

wherein X is a halide. In some embodiments, X is —Cl.

In some embodiments, the end-cap group is:

In some embodiments, E does not contain a heteroatom, e.g., nucleophilic heteroatom. In some embodiments, E does not contain a nitrogen.

In some embodiments, the end-cap group is a 1-substituted-1,1-diaryl ethylene group. Examples include, but are not limited to, those described in Fodor et al., *J.M.S.-Pure Appl. Chem.*, A32(3): 575-591 (1995); Hadjikyriacou et al., *J.M.S.-Pure Appl. Chem.*, A32(6): 1137-1153 (1995); Kamigaito et al., *Macromolecules*, 28: 5671-5675 (1995); Li et al., *Macromolecules*, 28: 1383-1389 (1995); Hadjikyriacou et al., *Macromolecules*, 29: 5261-5267 (1996); Mayr et al., *Macromolecules*, 29: 6110-6113 (1996); and Kwon et al., *Macromolecules*, 35: 3348-3357 (2002), which are incorporated herein by reference in their entireties.

In some embodiments, the end-cap group is an allyl halide, such as, but not limited to, those described in Knoll et al., U.S. Pat. No. 5,212,248, De et al., *Macromolecules*, 38:6861-6870 (2006); and De et al., *Macromolecules*, 39: 7527-7533 (2006), the entireties of which are incorporated by reference.

In some embodiments, the end-cap group is derived from a long chain olefin quenching agent, such as those described in Yamanaka et al., U.S. Pat. No. 5,777,037 and Chiba et al., European Patent Application No. 1,225,186, the entireties of which are incorporated by reference.

In some embodiments, the end-cap group is derived from an allylsilylpseudohalide, quenching agent, including, but not limited to those described in Shaffer, U.S. Pat. No. 5,580,935, which is incorporated herein by reference in its entirety.

In some embodiments, the end-cap group a furan or substituted furan, including but not limited to those described in Hadjikyriacou et al., *Macromolecules*, 32(20): 6393-6399 (1999) and Hadjikyriacou et al, *Macromolecules*, 33: 730-733 (2000), the entireties of which are incorporated herein by reference. Examples include, but are not limited to, 2-alkyl furans, such as 2-methyl furan and 2-tert-butyl furan. Other examples include, but are not limited to, bis(furanyl) end cap groups such as 2,5-bis(2-furyl-2-propyl)furan. Also provided herein are compounds wherein a single bis(furanyl) end cap group is bonded to two P moieties, which are obtainable through a coupling reaction described in Hadjikyriacou et al, *Macromolecules*, 33: 730-733 (2000), rather than one P moiety as depicted above.

In some embodiments, the end-cap group is thiophene, including, for example, 2-thiophene, or substituted thiophene.

In some embodiments, the end-cap group is a triarylamine. Example includes, but is not limited to, triphenylamine. In some embodiments, the end-cap group is

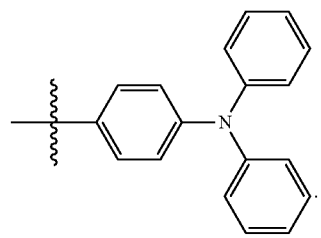 [SMILES: *c1ccc(N(c2ccccc2)c2ccccc2)cc1]

In some embodiments, the end-cap group is a vinylalkoxybenzene. Examples include, but are not limited to, those described in Japanese Patent Publication No. 05186513A, which is incorporated herein by reference in its entirety.

In some embodiments, the polydispersity index of the compound is less than 2.5, less than 2.4, less than 2.3, less than 2.2, less than 2.1, less than 2.0, less than 1.9, less than 1.8, less than 1.7, less than 1.6, less than 1.5, less than 1.4, less than 1.3, less than 1.2, or less than 1.1.

In some embodiments, the molecular weight of the compound is about 1000, about 2000, about 3000, about 4000, about 5000, about 6000. about 7000, about 8000, about 9000, about 10000, about 20000, about 30000, about 40000, about 50000, about 60000, about 70000, about 80000, about 90000, or about 100000 g/mol.

(ii) Compounds of Formula X

In some embodiments, provided herein are compounds of formula X:

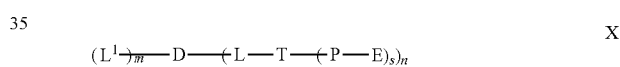

wherein:

D is hydrocarbyl;

each L, independently, is:

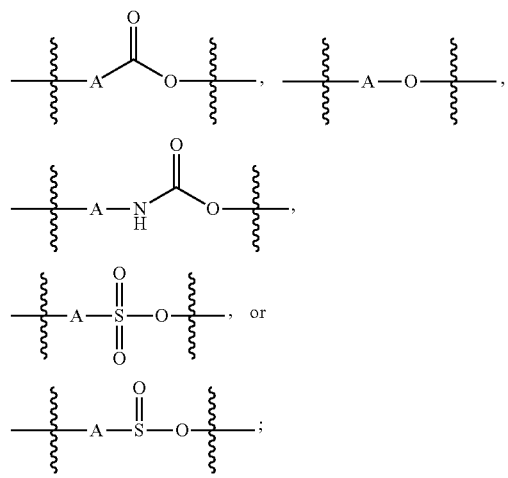

wherein each A, independently, is hydrocarbylene or a bond; and the oxygen is bonded to T;

each $L^1$, independently, is:

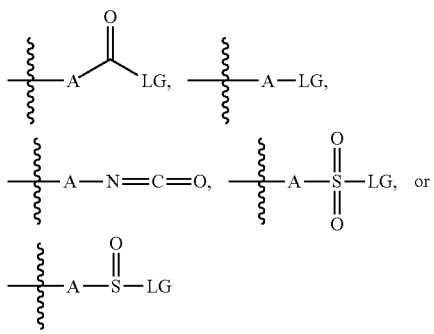

wherein each A, independently, is hydrocarbylene or a bond; and
LG is a leaving group
each T, independently, is a terpene;
each P, independently, is a polyolefin group;
each E, independently, is an end-cap group;
n and m are integers, wherein:
(1) the sum of m and n is 2-6; and
(2) m is at least 1; and
(3) n is at least 1; and
each s, independently, is an integer from 1-2.

In some embodiments, D is hydrocarbyl of 1-25 carbons. In some embodiments, D is hydrocarbyl of 1-20 carbons. In some embodiments, D is hydrocarbyl of 1-15 carbons. In some embodiments, D is hydrocarbyl of 1-10 carbons. In some embodiments, D is hydrocarbyl of 1-6 carbons.

In some embodiments, D is alkyl, alkaryl, or aralkyl.

In some embodiments, D is alkyl of 1-10 carbons. In some embodiments, D is alkyl of 1-6 carbons. In some embodiments, D is alkaryl of 7-20 carbons. In some embodiments, D is alkaryl of 7-15 carbons. In some embodiments, D is aralkyl of 7-20 carbons. In some embodiments, D is aralkyl of 7-15 carbons In some embodiments, n is 1 and D is:

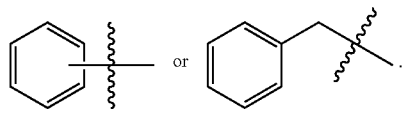

In some embodiments, n is 2 and D is:

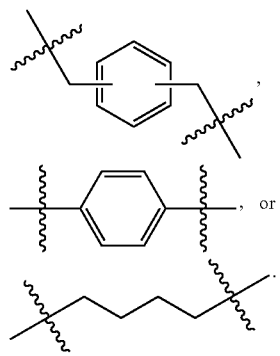

In some embodiments, n is 3 and D is:

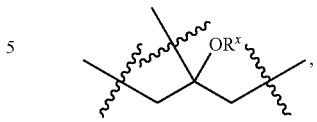

wherein $R^x$ is H or hydrocarbyl.

In some embodiments D is $Z(Y)_r$; wherein:
Y, independently, is aryl;
Z is hydrocarbyl;
L is bonded to a Y of the of $Z(Y)_r$; and
r is an integer from 1 to 3.

In some embodiments, Z is hydrocarbyl of 1 to 10 carbons. In some embodiments, Z is hydrocarbyl of 1 to 6 carbons. In some embodiments, Z is alkyl. In some embodiments, Z is cycloalkyl.

In some embodiments, r is 1 to 2. In some embodiments, r is 1.

In some embodiments, D is $Y_p$, wherein Y is aryl and p is an integer from 1-4.

In some embodiments, p is 1 to 2. In some embodiments, p is 1.

In some embodiments, for the $Y_p$ or $Z(Y)_r$, Y is aryl, wherein the aryl is monocyclic, bicyclic, or tricyclic. In certain embodiments, the aryl is monocyclic. In some embodiments, the aryl does not contain a heteroatom. In some embodiments, the aryl contains 6 to 12 carbons. In some embodiments, the aryl is phenyl.

In some embodiments, D does not contain a heteroatom.

In some embodiments, L is

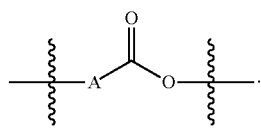

In some embodiments, L is

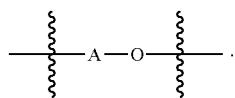

In some embodiments, A is hydrocarbyl of 1 to 10, 1 to 6, or 1 to 3 carbons.

In some embodiments, A is a bond.

In certain embodiments, L is

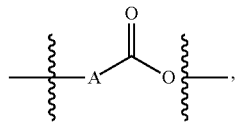

wherein A is alkyl.

In certain embodiments, L is

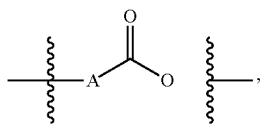

wherein A is alkyl of 1-10 carbons.
In certain embodiments, L is

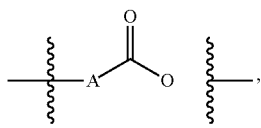

wherein A is alkyl of 1-6 carbons.
In certain embodiments, L is

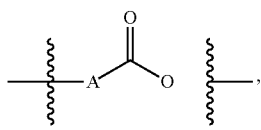

wherein A is alkyl of 1-3 carbons.
In some embodiments, L is

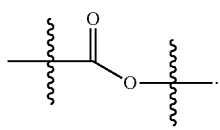

In certain embodiments, L is

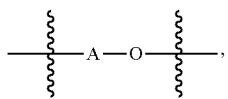

wherein A is alkyl.
In certain embodiments, L is

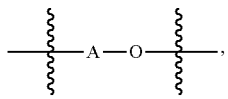

wherein A is alkyl of 1-10 carbons.
In certain embodiments, L is

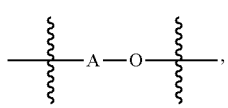

wherein A is alkyl of 1-6 carbons.

In certain embodiments, L is

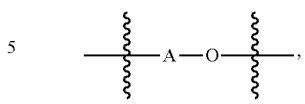

wherein A is alkyl of 1-3 carbons.
In some embodiments, L is

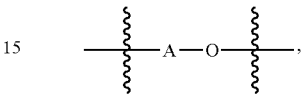

wherein A is alkyl, wherein the alkyl is not branched or cyclic.

In some embodiments, the terpene is a monoterpene, sesquiterpene, or triterpene. In some embodiments, the terpene is a monoterpene.

In some embodiment, the terpene is not substituted.

In some embodiments, T is substituted with 1 to 3 substituents.

In some embodiments, T is:

(i)

$$\begin{array}{c}\text{structure i}\end{array}$$

(ii)

(iii)

wherein:
(1) if T has the formula (i), then T is substituted with 1-3 substituents and
(2) s is 1 or 2; wherein:
if s is 1, then one of $D^1$ and $D^2$ is H and the other is P-E; and
if s is 2, then each of $D^1$ and $D^2$, independently, is P-E.

In some embodiments, when T is

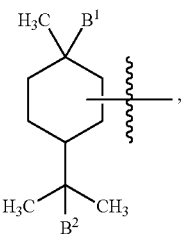

T is substituted with one or more substituents.

In some embodiments, s is 1.

In some embodiments, L is bonded to a primary carbon of T.

In some embodiments, T is:

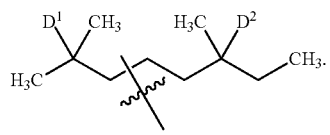

In some embodiments, T is:

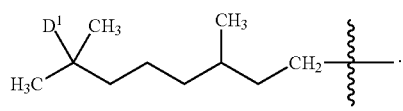

In some embodiments, m is 1. In some embodiments, m is 2.

In some embodiments, LG is —OR, wherein R is H or hydrocarbyl. In some embodiments, R is H. In some embodiments, LG is halo, e.g., chloro or bromo.

In some embodiments, $L^1$ is:

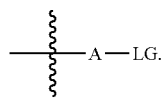

In some embodiments, A is hydrocarbyl of 1 to 10, 1 to 6, or 1 to 3 carbons.

In some embodiments, A is a bond.

In certain embodiments, $L^1$ is

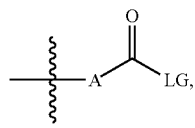

wherein A is alkyl.

In certain embodiments, $L^1$ is

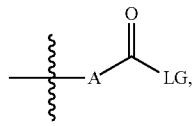

wherein A is alkyl of 1-10 carbons.

In certain embodiments, $L^1$ is

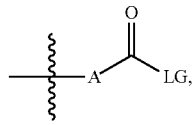

wherein A is alkyl of 1-6 carbons.

In certain embodiments, $L^1$ is

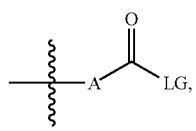

wherein A is alkyl of 1-3 carbons.

In certain embodiments, $L^1$ is

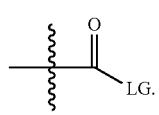

In some embodiments, $L^1$ is

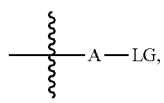

wherein A is alkyl.

In certain embodiments, $L^1$ is

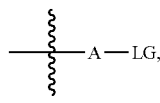

wherein A is alkyl of 1-10 carbons.

In certain embodiments, $L^1$ is

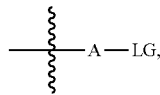

wherein A is alkyl of 1-6 carbons.

In certain embodiments, L¹ is

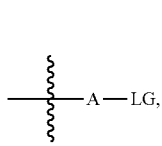

wherein A is alkyl of 1-3 carbons.

In certain embodiments, L¹ is

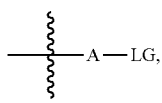

wherein A is alkyl, wherein the alkyl is not branched or cyclic.

In some embodiments, the leaving group is —Cl, —Br, —I, —OH, —OR$^N$, —OC(O)R$^N$, —OC(O)OR$^N$, —OC(O)NR$^N$, —OS(O)$_2$NR$^N$, —OMs, —OTs, or —OP(O)(OR$^N$)$_2$, wherein R$^N$ is hydrocarbyl. In some embodiments, R$^N$ is alkyl or aryl. In some embodiments, R$^N$ is alkyl of 1 to 6 carbons. In some embodiments, the alkyl is methyl. In some embodiments, R$^N$ is —Cl or —Br.

Suitable E groups are those recited for the compound of formula VIII.

In some embodiments, the compound of formula X has the following structure:

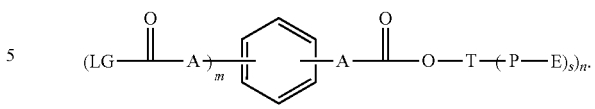

In some embodiments, the compound of formula X has the following structure:

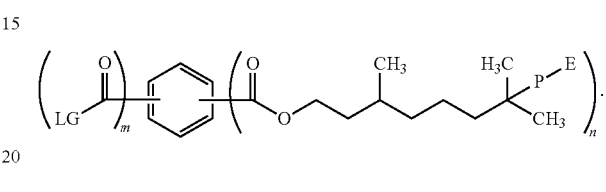

In some embodiments, the polydispersity index of the compound is less than 2.5, less than 2.4, less than 2.3, less than 2.2, less than 2.1, less than 2.0, less than 1.9, less than 1.8, less than 1.7, less than 1.6, less than 1.5, less than 1.4, less than 1.3, less than 1.2, or less than 1.1.

In some embodiments, the molecular weight of the compound is about 1000, about 2000, about 3000, about 4000, about 5000, about 6000. about 7000, about 8000, about 9000, about 10000, about 20000, about 30000, about 40000, about 50000, about 60000, about 70000, about 80000, about 90000, or about 100000 g/mol.

(e) Examples (i) Example 1

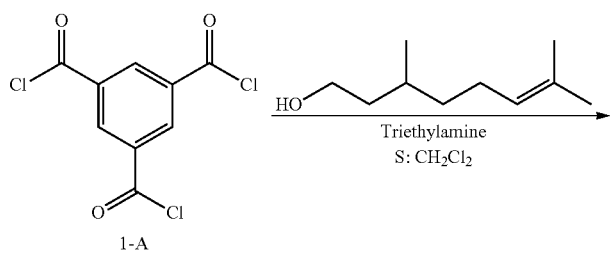

1-A

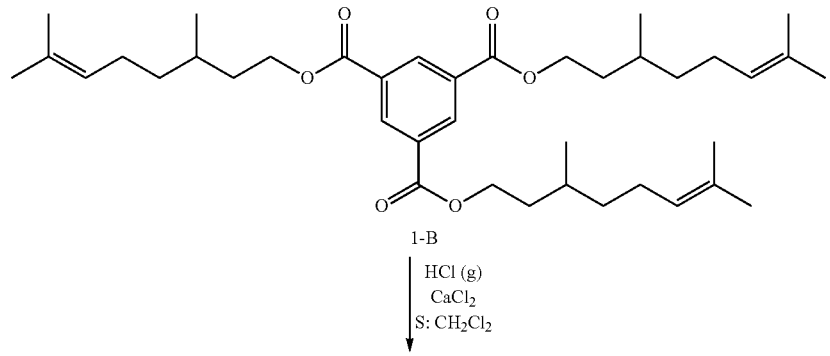

1-B

HCl (g)
CaCl$_2$
S: CH$_2$Cl$_2$

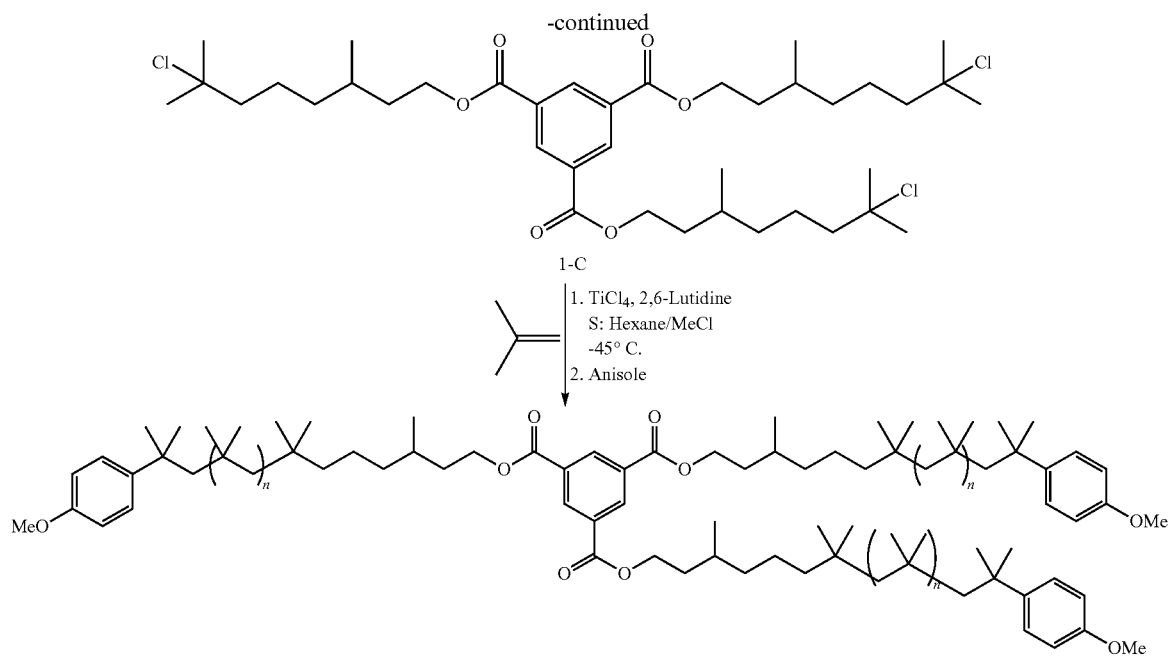

The experiment was carried out in a dry N₂ atmosphere glovebox equipped with an externally chilled hexane/heptane bath. A 4-neck 500 mL round-bottom flask was placed in the bath at −45° C. and equipped with an overhead stirrer, thermocouple, and a ReactIR probe. The trifunctional aromatic initiator 1-C (2.601 g, 0.0125M), 2,6-Lutidine (0.29 mL, 0.0100M), 1 aliquot of isobutylene (4.00 mL, 0.188M) and 220 mL of prechilled 40:60 v:v hexane/methyl chloride solvent mixture was added to the flask and allowed to equilibrate for ~1 hour. The polymerization was initiated upon addition of TiCl₄ (4.00 mL, 0.140M). The polymerization was monitored by observing the decay of the monomer via ReactIR. Once most of the isobutylene had been consumed, a second aliquot of monomer (4.00 mL, 0.188M) was added until the same consumption level was reached. This was repeated 7 times for a total monomer charge of 32 mL (1.5M). After the final aliquot of monomer had been consumed, the polymerization was quenched with anisole (3.46 g, 0.125M). An additional charge of TiCl₄ (3.00 mL, 0.107M) was added to the reaction to boost the rate of electrophilic aromatic substitution by anisole. The quenching was allowed to proceed for approximately 80 minutes, then terminated with 14 mL of prechilled methanol. The flask was removed immediately from the bath and allowed to warm to ambient temperature overnight, at which point most of the methyl chloride solvent had boiled off. The reaction mixture was then washed with a 90:10 v:v methanol/water mixture, followed by dilute HCl, saturated sodium bicarbonate solution, and finally deionized water. The organic layer was dried over MgSO₄, filtered, and the solvent was removed by rotary evaporation. The recovered polymer was analyzed via ¹H NMR and size-exclusion GPC. The measured molecular weight of the polymer was ~7800 g/mol with a polydispersity index of 1.54.

Compound 1-C may be synthesized by contacting compound 1-A with citronellol in the presence of triethylamine in dichloromethane to provide compound 1-B, which is then treated with anhydrous HCl in dichloromethane to afford compound 1-C.

(ii) Example 2

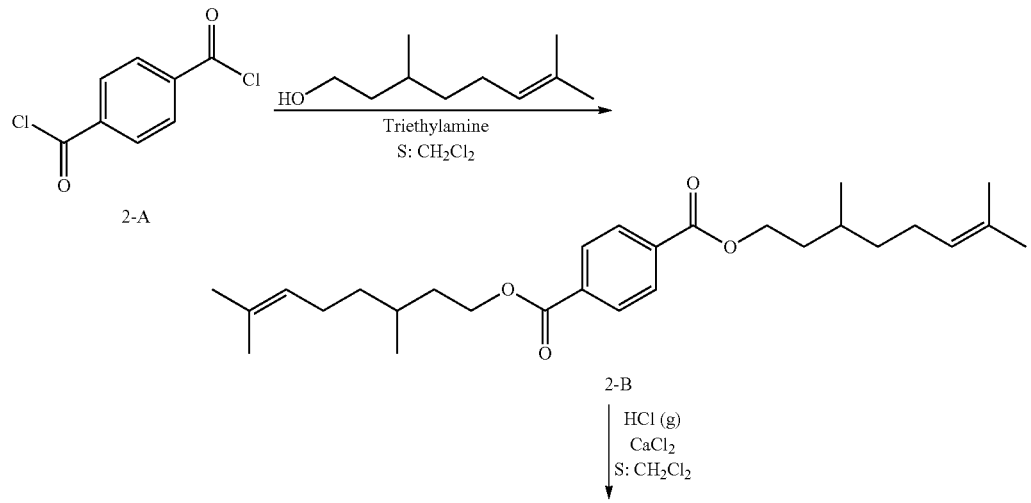

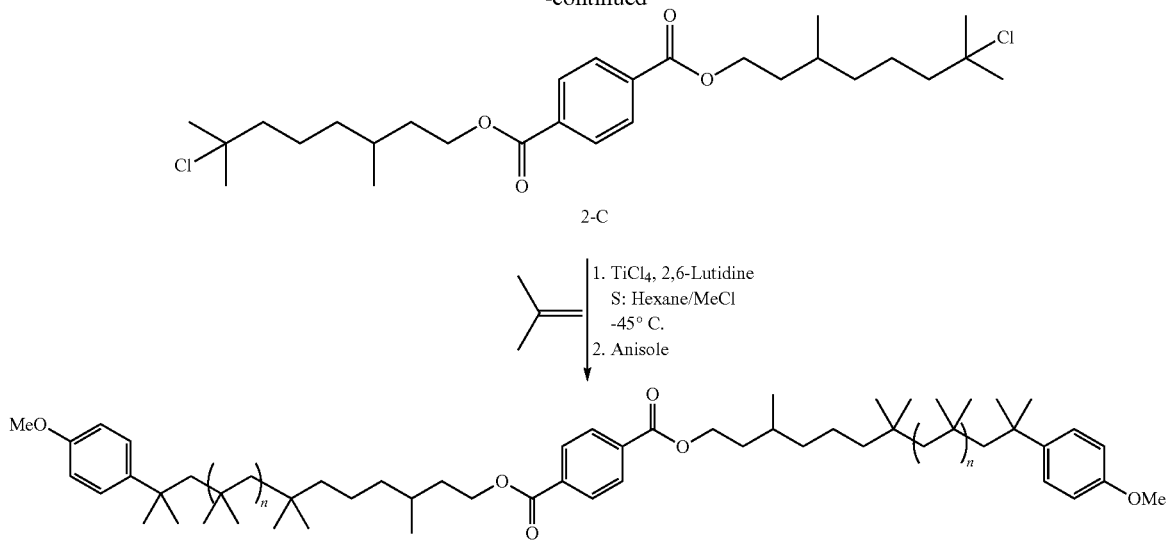

The experiment was carried out in a dry N² atmosphere glovebox equipped with an externally chilled hexane/heptane bath. A 4-neck 500 mL round-bottom flask was placed in the bath at −45° C. and equipped with an overhead stirrer, thermocouple, and a ReactIR probe. The difunctional initiator 2-C (2.739 g, 0.0188M), 2,6-Lutidine (0.29 mL, 0.0100M), 1 aliquot of isobutylene (4.00 mL, 0.188M) and 220 mL of prechilled 40:60 v:v hexane/methyl chloride solvent mixture was added to the flask and allowed to equilibrate for ~1 hour. The polymerization was initiated upon addition of TiCl₄ (5.50 mL, 0.197M). The polymerization was monitored by observing the decay of the monomer via ReactIR. Once most of the isobutylene had been consumed, a second aliquot of monomer (4.00 mL, 0.188M) was added until the same consumption level was reached. This was repeated 7 times for a total monomer charge of 32 mL (1.5M). After the final aliquot of monomer had been consumed, the reaction was quenched with anisole (5.20 mL, 0.188M) and the quenching was allowed to proceed for approximately 50 min. The polymerization was terminated with 9 mL of prechilled methanol. The flask was removed immediately from the bath and allowed to warm to ambient temperature overnight, at which point most of the methyl chloride solvent had boiled off. The reaction mixture was then washed with a 90:10 v:v methanol/water mixture, followed by dilute HCl, saturated sodium bicarbonate solution, and finally deionized water. The organic layer was dried over MgSO₄, filtered, and the solvent was removed by rotary evaporation. The recovered polymer was analyzed via ¹H NMR and size-exclusion GPC. The measured molecular weight of the polymer was 7400 g/mol with a polydispersity index of 1.84.

Compound 2-C may be synthesized by contacting compound 2-A with citronellol in the presence of triethylamine in dichloromethane to provide compound 2-B, which is then treated with anhydrous HCl in dichloromethane to afford compound 2-C.

(iii) Example 3

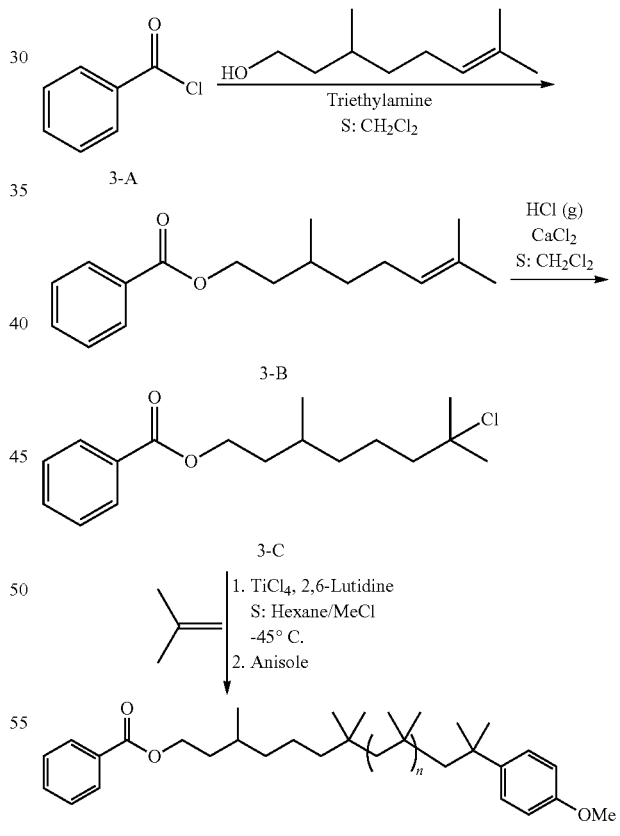

The experiment was carried out in a dry N₂ atmosphere glovebox equipped with an externally chilled hexane/heptane bath. A 4-neck 500 mL round-bottom flask was placed in the bath at −45° C. and equipped with an overhead stirrer, thermocouple, and a ReactIR probe. The initiator 3-C (3.228 g, 0.0375M), 2,6-Lutidine (0.34 mL, 0.0100M), 1 aliquot of isobutylene (4.00 mL, 0.165M) and 250 mL of prechilled 40:60 v:v hexane/methyl chloride solvent mixture was added to the flask and allowed to equilibrate for ~1 hour. The polymerization was initiated upon addition of TiCl$_4$ (4.00 mL, 0.124M). The polymerization was monitored by observing the decay of the monomer via ReactIR. Once most of the isobutylene had been consumed, a second aliquot of monomer (4.00 mL, 0.165M) was added until the same consumption level was reached. This was repeated 8 times for a total monomer charge of 36.4 mL (1.5M). After the final aliquot of monomer had been consumed, the reaction was quenched with anisole (1.77 mL, 0.056M), followed by an aliquot of TiCl$_4$ (2.00 mL, 0.063M) to boost the rate of electrophilic aromatic substitution by anisole. The quenching was allowed to proceed for approximately 220 min, then the polymerization was terminated with 12 mL of prechilled methanol. The flask was removed immediately from the bath and allowed to warm to ambient temperature overnight, at which point most of the methyl chloride solvent had boiled off. The reaction mixture was then washed with a 90:10 v:v methanol/water mixture, followed by dilute HCl, saturated sodium bicarbonate solution, and finally deionized water. The organic layer was dried over MgSO$_4$, filtered, and the solvent was removed by rotary evaporation. The recovered polymer was analyzed via $^1$H NMR and size-exclusion GPC. The measured molecular weight of the polymer was ~4600 g/mol with a polydispersity index of 1.14.

Compound 3-C was obtained as follows: benzoyl chloride 3-A was reacted with citronellol in methylene chloride and excess triethylamine. The product was washed with deionized water, dried, and purified via silica gel chromatography using 10% ethyl acetate in hexane as the eluent to afford compound 3-B, which was then treated with anhydrous HCl in dichloromethane to afford compound 3-C.

(iv) Example 4

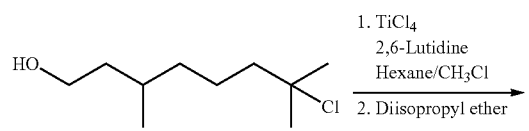

This example was carried out in a dry N$_2$ atmosphere glovebox equipped with an externally chilled hexane/heptane bath. A 4-neck 500 mL round-bottom flask was placed in the bath at –45° C. and equipped with an overhead stirrer, thermocouple, and a ReactIR probe. 7-chloro-3,7-dimethyloctan-1-ol initiator (5.614 g, 0.0577M), 2,6-Lutidine (3.62 mL, 0.0627M), 1 aliquot of isobutylene (6.30 mL, 0.15M) and 420 mL of prechilled 40:60 v:v hexane/methyl chloride solvent mixture was added to the flask and allowed to thermally equilibrate for ~1 hour. The polymerization was initiated upon addition of TiCl$_4$ (9.60 mL, 0.175M). The polymerization was monitored by observing decrease in isobutylene monomer concentration via ReactIR. Once most of the isobutylene had been consumed, a second aliquot of monomer (6.30 mL, 0.15M) was added until approximately the same monomer conversion level was reached. This was repeated 9 times for a total monomer charge of 63.0 mL (1.5M). After the final aliquot of monomer had been consumed, the polymerization was quenched with diisopropyl ether (11.79 g, 0.231M). An additional charge of TiCl$_4$ (9.00 mL, 0.165M) was then added to increase the rate of reaction with diisopropyl ether. The quenching was allowed to proceed for approximately 70 min, then terminated with 4.82 mL of triethylamine. The reaction was allowed to stir for 5 min longer, then terminated with 40 mL of prechilled methanol. The flask was removed immediately from the bath and allowed to warm to ambient temperature overnight, at which point the methyl chloride solvent had boiled off. The reaction mixture was then washed with a 90:10 v:v methanol/water mixture, followed by dilute HCl, saturated sodium bicarbonate solution, and finally deionized water. The organic layer was dried over MgSO$_4$, filtered, and the solvent was removed by rotary evaporation.

The recovered polymer was analyzed via $^1$H NMR and size-exclusion GPC. The measured molecular weight of the polymer was ~2300 g/mol with a polydispersity index of 1.12

The 7-chloro-3,7-dimethyloctan-1-ol starting material employed as initiator above was obtained via hydrochlorination of β-citronellol with gaseous HCl.

(v) Example 5

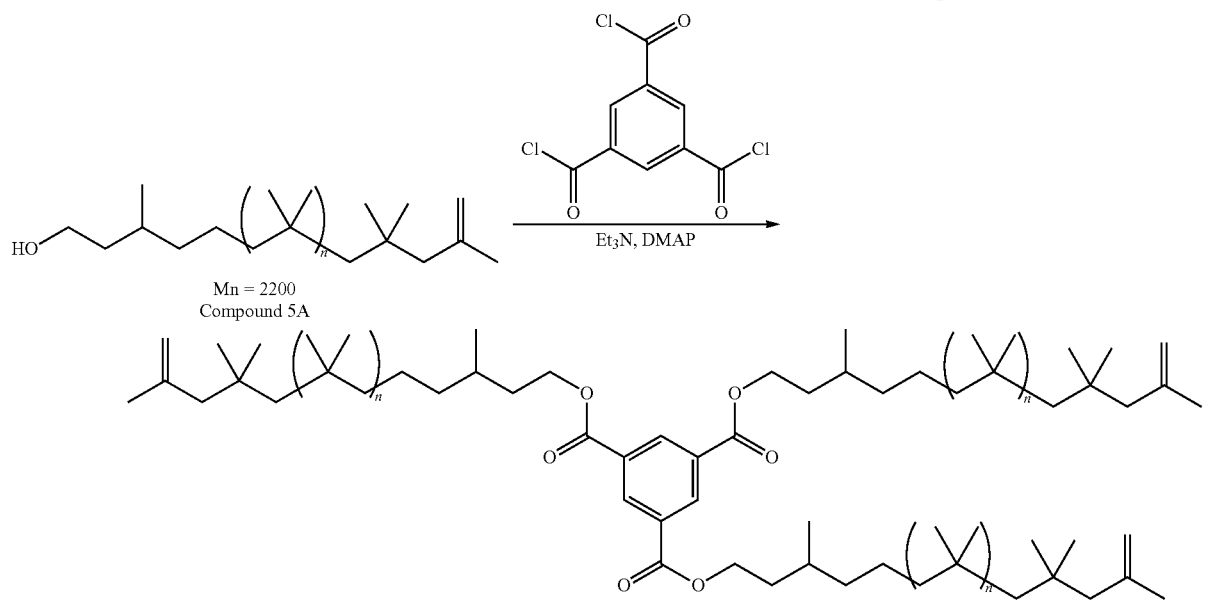

To a solution of Compound 5A (19.6 g, 8.91 mmole; ~2300 Mn) dissolved in 50 mL anhydrous THF held under an inert atmosphere was added triethylamine (2.1 mL, 14.9 mmole). To the resulting mixture was added 1,3,5-benzenetricarbonyl trichloride (0.79 g, 2.97 mmole) and 4-dimethylamino pyridine (0.036 g, 0.297 mmole). The resulting mixture was stirred for 15 h at room temperature. Following reaction completion, the mixture was washed with $H_2O$ and diluted with hexanes. The organic layer was separated, dried over magnesium sulfate and filtered. The solvents were then evaporated under reduced pressure to give the crude reaction product.

NMR analysis showed <10% remaining PIB alcohol indicating a >90% conversion to the ester. Molecular weight analysis was conducted by GPC which indicated a mixture of products with the major species being the triester.

It is understood that the detailed description and accompanying examples are merely illustrative and are not to be taken as limitations upon the scope of the subject matter. Various changes and modifications to the disclosed embodiments will be apparent to those skilled in the art. Such changes and modifications, including without limitation those relating to the chemical structures, substituents, derivatives, intermediates, synthesis, starting materials, products, and/or reaction conditions may be made without departing from the spirit and scope of thereof. Included within the scope of the subject matter described herein are all combinations of the embodiments described herein. All U.S. patents, patent applications, and patent publications referenced herein are incorporated herein by reference in their entireties.

What is claimed:

1. A method for producing a telechelic polymer, comprising contacting a compound of formula I:

I with a Lewis acid in the presence of one or more monomers, wherein:

D is alkaryl, aralkyl, or $Y_p$, where Y is aryl and p is an integer from 1-4;

each L, independently, is:

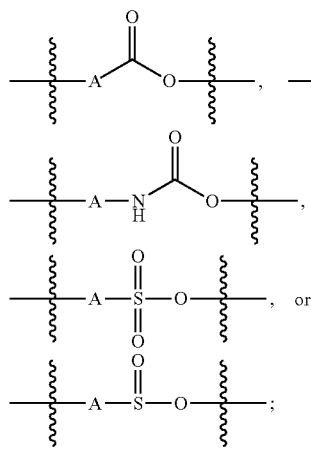

wherein each A, independently, is hydrocarbylene or a bond; and
the oxygen is bonded to T;
each T, independently, is a terpene;
wherein at least one of the tertiary carbons of the terpene contain a leaving group; and
each n, independently, is an integer from 1-6.

2. The method of claim 1, wherein D is alkaryl or aralkyl.
3. The method of claim 1, wherein D is alkaryl of 7-20 carbons.
4. The method of claim 1, wherein D is aralkyl of 7-20 carbons.
5. The method of claim 1, wherein D is $Z(Y)_r$; wherein:
Y, independently, is aryl;
Z is hydrocarbyl;
L is bonded to a Y of the $Z(Y)_r$; and
r is an integer from 1 to 3.
6. The method of claim 1, wherein D is $Y_p$, wherein Y is aryl and p is an integer from 1-4.
7. The method of claim 6, wherein p is 1.
8. The method of claim 6, wherein Y is phenyl.
9. The method of claim 1, wherein L is:

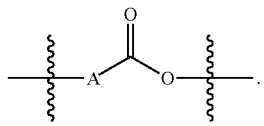

10. The method of claim 9, wherein A is a bond.
11. The method of claim 1, wherein n is an integer from 1-4.
12. The method of claim 1, wherein T is a monoterpene, wherein at least one of the tertiary carbons of the monoterpene contains a leaving group.
13. The method of claim 1, wherein the terpene is not substituted, except for the at least one of the tertiary carbons that contains a leaving group.
14. The method of claim 1, wherein the terpene is not cyclic.
15. The method of claim 1, wherein T has the formula (i), (ii), or (iii):

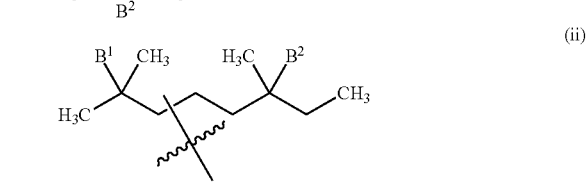

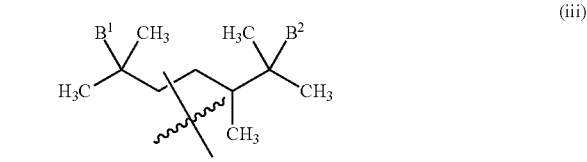

wherein $B^1$ and $B^2$ are each, independently, a leaving group or —H;
wherein at least one of $B^1$ and $B^2$ is a leaving group; and
if T has formula (i), T is substituted with 1-3 substituents.
16. The method of claim 15, wherein one of $B^1$ and $B^2$ is —H.

17. The method of claim 15, wherein T is:

$$\text{B}^1\text{C(CH}_3\text{)}_2\text{-CH}_2\text{-CH}_2\text{-CH}_2\text{-CH(CH}_3\text{)-CH}_2\text{-}$$

18. The method of claim 1, wherein the leaving group is —Cl or —Br.

19. The method of claim 1, wherein the compound of formula I has the following formula:

PhC(O)(—O—T)$_n$ and n is an integer from 1-4.

20. The method of claim 19, wherein T is a monoterpene, wherein one or more of the tertiary carbons of the monoterpene contain a leaving group.

21. The method of claim 20, wherein T is:

$$\text{B}^1\text{C(CH}_3\text{)}_2\text{-CH}_2\text{-CH}_2\text{-CH}_2\text{-CH(CH}_3\text{)-CH}_2\text{-}$$

wherein B$^1$ is a leaving group.

22. The method of claim 21, wherein the leaving group is —Cl or —Br.

23. The method of claim 1, further comprising adding one or more quenching agents.

24. The method of claim 23, wherein the quenching agent is (a) allyltrimethylsilane;
(b) methallyltrimethylsilane;
(c) 1,1-diphenylethylene;
(d) furan or a substituted furan;
(e) thiophene or a substituted thiophene;
(f) triphenylamine;
(g) a compound having the following formula:

pyrrole-N—(CR$^{PY1}$R$^{PY2}$)$_m$—X$^{PY}$ wherein:

R$^{PY1}$ and R$^{PY2}$ are independently in each —(CR$^{PY1}$R$^{PY2}$)— unit selected from the group consisting of hydrogen and alkyl of 1 to 6 carbon atoms;

m is an integer from 1 to 20; and

X$^{PY}$ is selected from the group consisting of hydrogen, alkyl, aryl, alkaryl, alkoxy, heteroaryl, nitro, ureido, —OC(O)R$^{PY3}$, —C(O)R$^{PY4}$, —C(O)OR$^{PY5}$, —C(O)NR$^{PY6}$R$^{PY7}$, —P(R$^{PY8}$)$_3$, —P(OR$^{PY9}$)$_3$, —SR$^{PY10}$, —OSO$_3$R$^{PY11}$, and —S(O)R$^{PY12}$;

wherein R$^{PY3}$ is alkyl or alkenyl; and R$^{PY4}$, R$^{PY5}$, R$^{PY7}$, R$^{PY8}$, R$^{PY9}$, R$^{PY10}$, R$^{PY11}$, and R$^{PY12}$ are alkyl;

(h) a compound having the following formula:

[six-membered ring with N bearing R, adjacent positions with R$^1$, R$^2$, R$^3$, R$^4$, R$^5$, R$^6$, R$^7$, R$^8$, and X in the ring]

wherein:

R$^1$ through R$^8$ are independently hydrogen, alkyl from 1 to 20 carbon atoms, aryl from 6 to about 20 carbon atoms, alkaryl from about 7 to 30 carbon atoms, or aralkyl from about 7 to 30 carbon atoms;

R is hydrogen, alkyl from 1 to 20 carbon atoms, aryl from 6 to about 20 carbon atoms, alkaryl from about 7 to 30 carbon atoms, or aralkyl from about 7 to 30 carbon atoms; and X is oxygen or sulfur;

with the proviso that when R is hydrogen or methyl then R$^1$, R$^2$, R$^7$ and R$^8$ must be other than hydrogen unless one of R$^1$ or R$^2$ and one of R$^7$ or R$^8$ is independently branched alkyl of about 3 to 20 carbon atoms, aryl, alkaryl or aralkyl;

(i) a compound having the following formula:

R$^{1X}$S—R$^{2X}$ wherein R$^{1X}$ and R$^{2X}$, are each, independently, hydrocarbyl;

(j) a compound having the following formula:

R$^{SA}$S—S—R$^{SB}$ wherein R$^{SA}$ and R$^{SB}$ are each, independently, alkyl, aryl, aralkyl, alkaryl, —(CH$_2$)$_{1-3}$—furan,   —(CH$_2$)$_{1-3}$—pyrrole(NH), —(CH$_2$)$_{1-3}$—thiophene,   —(CH$_2$)$_{1-3}$—X$^S$, —(CH$_2$)$_{1-3}$—O—R$^{SX}$,   or —(CH$_2$)$_{1-3}$—O—Si(R$^{S3}$)(R$^{S4}$)(R$^{S5}$);

wherein:

X$^S$ is halo or a pseudohalide;

R$^{SX}$ is alkyl or aryl;

R$^{S3}$ is tert-butyl; and

R$^{S4}$ and R$^{S5}$ are each, independently, alkyl, aryl, aralkyl, or alkaryl;

(k) a compound having the following formula:

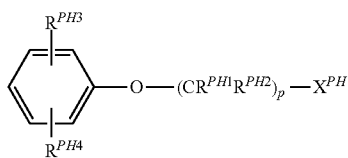

wherein:
$R^{PH1}$ and $R^{PH2}$ are each, independently in each —($CR^{PH1}R^{PH2}$) unit, —H or alkyl, and
p is an integer from 0-20, wherein:
(1) if p is 0, then $R^{PH3}$ and $R^{PH4}$ are each, independently, alkyl, and
$X^{PH}$ is —H;
(2) if p is 1, then $R^{PH3}$ and $R^{PH4}$ are each, independently —H, alkyl, or alkoxy, and $X^{PH}$ is —H, alkyl, alkenyl, alkynyl, alkaryl, aralkyl, aryl, heteroaryl, or

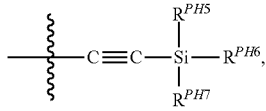

wherein $R^{PH5}$-$R^{PH7}$ are each, independently, alkyl or aryl;
(3) if p is 2, then $R^{PH3}$ and $R^{PH4}$ are each, independently —H, alkyl, or alkoxy, and $X^{PH}$ is —H, alkyl, alkenyl, alkynyl, alkaryl, aralkyl, aryl, heteroaryl, alkoxy, —F, —Cl, —Br, —I, —At, —CN, —NC, —NCO, —OCN, —NCS, —SCN, —OC(O)$R^{PH8}$, —C(O) O$R^{PH9}$, —C(O)N$R^{PH10}R^{PH11}$, or

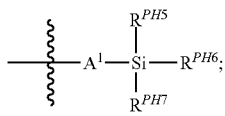

wherein:
$A^1$ is

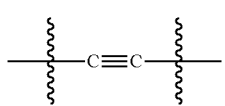 [SMILES: *C#C*]

or a single bond,
$R^{PH5}$ to $R^{PH7}$ are each, independently, alkyl, alkenyl, alkynyl, alkaryl, aralkyl, aryl, heteroaryl, alkoxy, hydroxy, —N$R^{PH10}R^{PH11}$, —F, —Cl, —Br, —I, or —At,
$R^{PH8}$ is alkyl, alkenyl, alkynyl, alkaryl, aryl, or heteroaryl, and
$R^{PH9}$ to $R^{PH11}$ are each, independently, —H, alkyl, alkenyl, alkynyl, alkaryl, aryl, or heteroaryl,
or
when —O—($CR^{PH1}R^{PH2}$)$_p$—$X^{PH}$ is ortho to $R^{PH4}$, then $X^{PH}$ and $R^{PH4}$, together, with the atoms to which $X^{PH}$ and $R^{PH4}$ are attached, may form a ring; and (4) if p is 3-20, then $R^{PH3}$ and $R^{PH4}$ are each, independently —H, alkyl, or alkoxy, and X is —H, alkyl, alkenyl, alkynyl, alkaryl, aralkyl, aryl, heteroaryl, alkoxy, aryloxy, heteroaryloxy, alkaryloxy, —OH, —F, —Cl, —Br, —I, —At, —CN, —NC, —NCO, —OCN, —NCS, —SCN, —OC(O)$R^{PH8}$, —C(O) O$R^{PH9}$, —C(O)N$R^{PH10}R^{PH11}$,

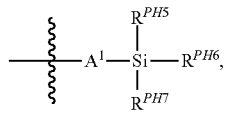

or —N$R^{PHX}R^{PHY}$;
wherein:
$A^1$ is

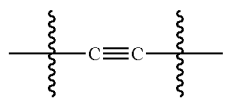 [SMILES: *C#C*]

or a single bond,
$R^{PHX}$ and $R^{PHY}$ are each, independently, —H, alkyl, alkenyl, alkynyl, cycloalkyl, aryl, heteroaryl, heterocyclyl, or —C(O)$R^{PHZ}$, wherein $R^{PHZ}$ is —H, alkyl, alkenyl, alkynyl, cycloalkyl, aryl, heteroaryl, heterocyclyl, —O$R^{PH8}$, or —N$R^{PH10}R^{PH11}$;
$R^{PH5}$ to $R^{PH7}$ are each, independently, alkyl, alkenyl, alkynyl, alkaryl, aralkyl, aryl, heteroaryl, alkoxy, hydroxy, —N$R^{PH10}R^{PH11}$, —F, —Cl, —Br, —I, or —At,
$R^{PH8}$ is alkyl, alkenyl, alkynyl, alkaryl, aryl, or heteroaryl, and $R^{PH9}$ to $R^{PH11}$ are each independently, —H, alkyl, alkenyl, alkynyl, alkaryl, aryl, or heteroaryl;
(l) butadiene or isoprene; or (m)

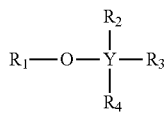

wherein:
Y is carbon or silicon;
$R_1$ is hydrocarbyl; and
$R_2$-$R_4$ are each, independently, hydrogen or hydrocarbyl.

25. The method of claim 1, wherein the method produces a compound of formula VII:

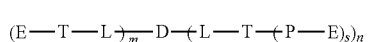

wherein:
D is alkaryl, aralkyl, or $Y_p$, where Y is aryl and p is an integer from 1-4;

each L, independently, is:

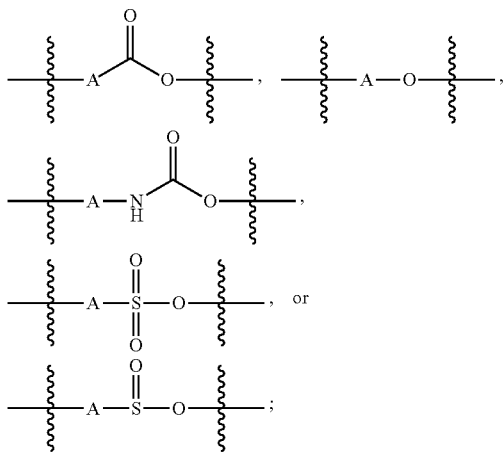

wherein each A, independently, is hydrocarbylene or a bond; and
the oxygen is bonded to T;
each T, independently, is a terpene;
each P, independently, is a polyolefin group;
each E, independently, is an end-cap group;
n and m are integers, wherein
(1) the sum of n and m is 1 to 6; and
(2) n is at least 1; and
each s, independently, is an integer from 1-2.

26. The method of claim 25, wherein P is

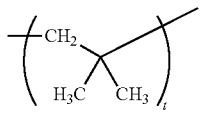

wherein t is an integer from 2-20,000.

27. The method of claim 1, wherein the Lewis acid is a titanium halide, aluminum halide, boron halide, or an alkyl aluminum halide.

28. The method of claim 1, wherein the Lewis acid is $TiCl_4$.

29. The method of claim 1, wherein the method is performed in the presence of one or more electron donors.

30. The method of claim 29, wherein the one or more electron donors is

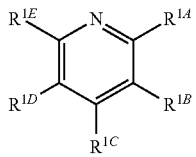

wherein $R^{1A}$, $R^{1B}$, $R^{1C}$, $R^{1D}$, and $R^{1E}$ are each independently, hydrogen or hydrocarbyl; or $R^{1A}$ and $R^{1B}$, or $R^{1B}$ and $R^{1C}$, or $R^{1C}$ and $R^{1D}$, or $R^{1D}$ and $R^{1E}$ independently form a fused aliphatic ring of about 3 to about 7 carbon atoms or a fused aromatic ring of about 5 to about 7 carbon atoms.

31. The method of claim 30, wherein the one or more electron donors are 2,6-dimethylpyridine, 2,6-di-tert-butylpyridine, 2,4-dimethylpyridine, 2,4,6-trimethylpyridine, 2-methylpyridine, or pyridine.

32. The method of claim 1, wherein the method is performed in the presence of a common ion salt or common ion salt precursor.

33. The method of claim 32, wherein the common ion salt precursor is tetra-n-butylammonium chloride, tetra-n-butylammonium bromide, or tetra-n-butylammonium iodide.

34. The method of claim 23, wherein greater than 90% of the monomer is consumed prior to adding the quenching agent.

35. The method of claim 1, wherein one or more aliquots of additional monomer are added to the polymerization after the initial monomer charge, wherein each individual aliquot of additional monomer is consumed or partially consumed prior to adding a subsequent aliquot of additional monomer or adding the quenching agent.

36. The method of claim 1, wherein the Lewis acid is deactivated with one or more terminators.

37. The method of claim 23, wherein the Lewis acid is deactivated with one or more terminators after adding the one or more quenching agents.

38. The method of claim 25, wherein the compound of formula VII has a polydispersity index of less than 2.5.

39. The method of claim 1, wherein the monomer is polymerized under quasiliving polymerization conditions.

40. The method of claim 1, wherein the monomer is isobutylene.

41. The method of claim 1, wherein at least two monomers are used.

42. The method of claim 41, wherein the at least two monomers are isobutylene and styrene.

43. The telechelic polymer produced by the method of claim 1.

44. A method for producing a telechelic polymer comprising contacting a compound of formula VIII:

$$\text{HO-T-(P-E)}_s \qquad \text{VIII}$$

with a compound of formula IX:

$$\text{D-(L}^1)_n \qquad \text{IX}$$

wherein:
D is hydrocarbyl;
each T, independently, is a terpene;
each P, independently, is a polyolefin group;
each E, independently, is an end-cap group;
each $L^1$, independently, is:

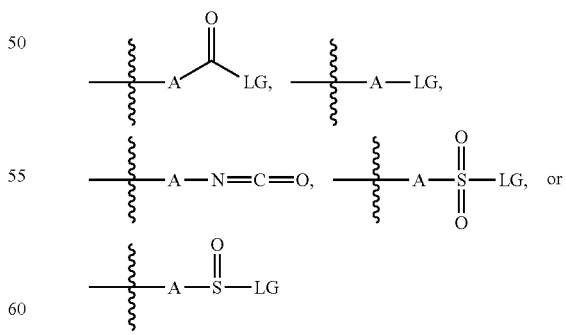

wherein each A, independently, is hydrocarbylene or a bond; and
LG is a leaving group;
n is an integer from 1-6; and
s is an integer from 1-2.

45. The method of claim 44, wherein D is hydrocarbyl of 1-25 carbons.

46. The method of claim 44, wherein D is alkyl, aralkyl, or alkaryl.

47. The method of claim 44, wherein D is aryl.

48. The method of claim 44, wherein D is phenyl.

49. The method of claim 44, wherein LG is —Cl, —Br, —OH, or —OC(O)$R^A$, wherein $R^A$ is hydrocarbyl.

50. The method of claim 44, wherein $L^1$ is:

$$\text{\Large}\xi\text{-}A\text{-}C(O)\text{-}LG$$

51. The method of claim 50, wherein A is a bond.

52. The method of claim 44, wherein n is an integer from 1-4.

53. The method of claim 44, wherein T is a monoterpene.

54. The method of claim 44, wherein T is not substituted.

55. The method of claim 44, wherein T has the formula (i), (ii), or (iii):

(i)

(ii)

(iii)

wherein
(1) if T has the formula (i), then T is substituted with 1-3 substituents and
(2) s is 1 or 2; wherein:
    if s is 1, then one of $D^1$ and $D^2$ is H and the other is P-E; and
    if s is 2, then each of $D^1$ and $D^2$, independently, is P-E.

56. The method of claim 55, wherein s is 1.

57. The method of claim 55, wherein T is:

58. The method of claim 44, wherein P is polyisobutylene.

59. The method of claim 44, wherein the compound of formula VIII is:

$$HO\text{-}CH_2\text{-}...\text{-}P\text{-}E$$

wherein P is a polyolefin group and E is an end cap group; and
the compound of formula IX:

wherein LG is a leaving group and n is 1-4.

60. The method of claim 44, wherein E is:

(1)

(2)

wherein:
$R^{PY1}$ and $R^{PY2}$ are independently in each —($CR^{PY1}R^{PY2}$)— unit selected from the group consisting of hydrogen and alkyl from 1 to 6 carbon atoms;
m is an integer from 1 to 20; and
$X^{PY}$ is selected from the group consisting of hydrogen, alkyl, aryl, alkaryl, alkoxy, heteroaryl, nitro, ureido, —OC(O)$R^{PY3}$, —C(O)$R^{PY4}$, —C(O)O$R^{PY5}$, —C(O)N$R^{PY6}R^{PY7}$, —P($R^{PY8}$)$_3$, —P(O$R^{PY9}$)$_3$, —S$R^{PY10}$, —OSO$_3R^{PY11}$, and —S(O)$R^{PY12}$;
wherein $R^{PY3}$ is alkyl or alkenyl; and $R^{PY4}$, $R^{PY5}$, $R^{PY7}$, $R^{PY8}$, $R^{PY9}$, $R^{PY10}$, $R^{PY11}$, and $R^{PY12}$ are alkyl;

(3)

wherein:
$R^{SA}$ is alkyl, aryl, aralkyl, alkaryl,

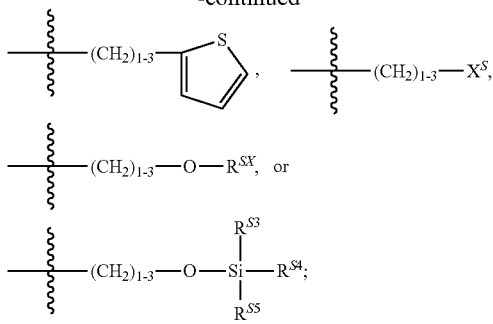

$X^S$ is halo or a pseudohalide;
$R^{SX}$ is alkyl or aryl;
$R^{S3}$ is tert-butyl; and
$R^{S4}$ and $R^{S5}$ are each, independently, alkyl, aryl, aralkyl, or alkaryl;

(4)

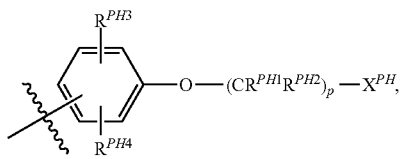

wherein:
$R^{PH1}$ and $R^{PH2}$ are each, independently in each —$(CR^{PH1}R^{PH2})$ unit, —H or alkyl, and
p is an integer from 0-20, wherein:
(a) if p is 0, then $R^{PH3}$ and $R^{PH4}$ are each, independently, alkyl, and
  $X^{PH}$ is —H;
(b) if p is 1, then $R^{PH3}$ and $R^{PH4}$ are each, independently —H, alkyl, or alkoxy, and $X^{PH}$ is —H, alkyl, alkenyl, alkynyl, alkaryl, aralkyl, aryl, heteroaryl, or

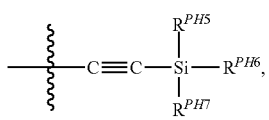

wherein $R^{PH5}$-$R^{PH7}$ are each, independently, alkyl or aryl;
(c) if p is 2, then $R^{PH3}$ and $R^{PH4}$ are each, independently —H, alkyl, or alkoxy, and $X^{PH}$ is —H, alkyl, alkenyl, alkynyl, alkaryl, aralkyl, aryl, heteroaryl, alkoxy, —F, —Cl, —Br, —I, —At, —CN, —NC, —NCO, —OCN, —NCS, —SCN, —OC(O)$R^{PH8}$, —C(O)O$R^{PH9}$, —C(O)N$R^{PH10}R^{PH11}$, or

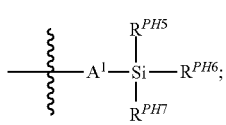

wherein:
$A^1$ is

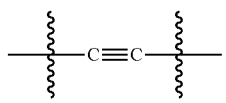 [SMILES: *C#C*]

or a single bond,
$R^{PH5}$ to $R^{PH7}$ are each, independently, alkyl, alkenyl, alkynyl, alkaryl, aralkyl, aryl, heteroaryl, alkoxy, hydroxy, —N$R^{PH10}R^{PH11}$, —F, —Cl, —Br, —I, or —At,
$R^{PH8}$ is alkyl, alkenyl, alkynyl, alkaryl, aryl, or heteroaryl, and
$R^{PH9}$ to $R^{PH11}$ are each, independently, —H, alkyl, alkenyl, alkynyl, alkaryl, aryl, or heteroaryl,
or
when —O—$(CR^{PH1}R^{PH2})_p$—$X^{PH}$ is ortho to $R^{PH4}$, then $X^{PH}$ and $R^{PH4}$, together, with the atoms to which $X^{PH}$ and $R^{PH4}$ are attached, may form a ring; and
(d) if p is 3-20, then $R^{PH3}$ and $R^{PH4}$ are each, independently —H, alkyl, or alkoxy, and X is —H, alkyl, alkenyl, alkynyl, alkaryl, aralkyl, aryl, heteroaryl, alkoxy, aryloxy, heteroaryloxy, alkaryloxy, —OH, —F, —Cl, —Br, —I, —At, —CN, —NC, —NCO, —OCN, —NCS, —SCN, —OC(O)$R^{PH8}$, —C(O)O$R^{PH9}$, —C(O)N$R^{PH10}R^{PH11}$,

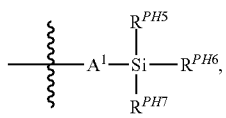

or —N$R^{PHX}R^{PHY}$;
wherein:
$A^1$ is

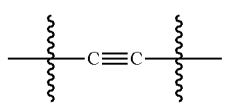 [SMILES: *C#C*]

or a single bond,
$R^{PHX}$ and $R^{PHY}$ are each, independently, —H, alkyl, alkenyl, alkynyl, cycloalkyl, aryl, heteroaryl, heterocyclyl, —C(O)$R^{PHZ}$, wherein $R^{PHZ}$ is —H, alkyl, alkenyl, alkynyl, cycloalkyl, aryl, heteroaryl, heterocyclyl, —O$R^{PH8}$, or N$R^{PH10}R^{PH11}$;
$R^{PH5}$ to $R^{PH7}$ are each, independently, alkyl, alkenyl, alkynyl, alkaryl, aralkyl, aryl, heteroaryl, alkoxy, hydroxy, —N$R^{PH10}R^{PH11}$, —F, —Cl, —Br, —I, or —At,
$R^{PH8}$ is alkyl, alkenyl, alkynyl, alkaryl, aryl, or heteroaryl, and
$R^{PH9}$ to $R^{PH11}$ are each, independently, —H, alkyl, alkenyl, alkynyl, alkaryl, aryl, or heteroaryl;

(5)

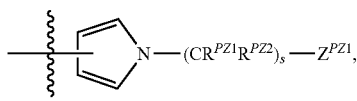

wherein:
R$^{PZ1}$ and R$^{PZ2}$ are independently in each —(CR$^{PZ1}$R$^{PZ2}$)— unit, hydrogen or alkyl from 1 to 6 carbon atoms;
s is an integer from 2 to 20; and
Z$^{PZ1}$ is —F, —Cl, —Br, —I, —At, —CN, —NC, —N$_3$, —NCO, —OCN, —NCS or —SCN;

(6)

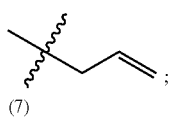

(7)

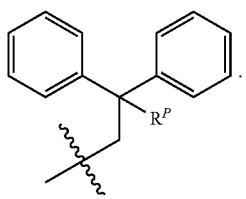

wherein R$^P$ is halo or hydrocarbyl of 1-20 carbon atoms optionally substituted with halo or pseudohalo;
(8) furan or a furan substituted with hydrocarbyl or substituted hydrocarbyl; or
(9) thiophene or a thiophene substituted with hydrocarbyl or substituted hydrocarbyl.

61. The method of claim 44, wherein E is (1)

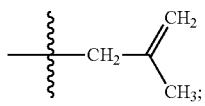

(2)

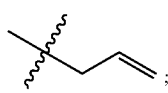

(3) pyrrole or N-hydrocarbylpyrrole, wherein the hydrocarbyl contains 1-20 carbon atoms;
(4) —S—R$^{SA}$, wherein R$^{SA}$ is hydrocarbyl of 1-20 carbon atoms optionally substituted with halo or pseudohalo;

(5)

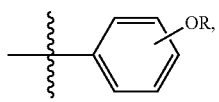

wherein R is hydrocarbyl of 1-20 carbon atoms optionally substituted with halo or pseudohalo;

(6) haloalkyl or pseudohaloalkyl;
(7) —CH$_2$CH=CHCH$_2$—X, wherein X is halo; or (8)

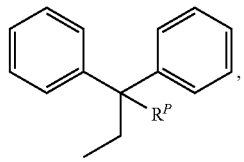

wherein R$^P$ is halo or hydrocarbyl of 1-20 carbon atoms optionally substituted with halo or pseudohalo.

62. The method of claim 44, wherein the method produces a compound of formula VIIa:

$$D\text{-}(L\text{---}T\text{-}(P\text{---}E)_s)_n \qquad \text{VIIa}$$

wherein:
D is hydrocarbyl;
each L, independently, is:

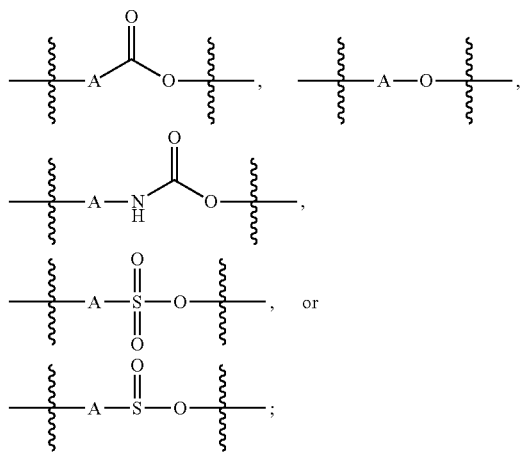

wherein each A, independently, is hydrocarbylene or a bond; and
the oxygen is bonded to T;
each T, independently, is a terpene;
each P, independently, is a polyolefin group;
each E, independently, is an end-cap group;
n is an integer from 1-6; and
each s, independently, is an integer from 1-2.

63. The telechelic polymer produced by the method of claim 44.

64. A compound of formula VII:

$$(E\text{---}T\text{---}L)_m\text{---}D\text{-}(L\text{---}T\text{-}(P\text{---}E)_s)_n \qquad \text{VII}$$

wherein:
D is alkaryl, aralkyl, or Y$_p$, where Y is aryl and p is an integer from 1-4;

each L, independently, is:

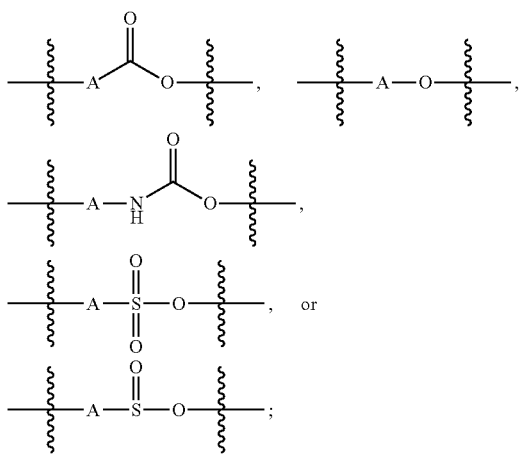

wherein each A, independently, is hydrocarbylene or a bond; and
the oxygen is bonded to T;
each T, independently, is a terpene;
each P, independently, is a polyolefin group;
each E, independently, is an end-cap group;
n and m are integers, wherein
(1) the sum of n and m is 1 to 6; and
(2) n is at least 1; and
each s, independently, is an integer from 1-2.

65. The compound of claim 64, wherein D is aralkyl or alkaryl.

66. The compound of claim 64, wherein D is alkaryl of 7-20 carbons.

67. The compound of claim 64, wherein D is aralkyl of 7-20 carbons.

68. The compound of claim 64, wherein D is $Z(Y)_r$, wherein:
Y, independently, is aryl;
Z is hydrocarbyl;
L is bonded to a Y of the $Z(Y)_r$; and
r is an integer from 1 to 3.

69. The compound of claim 64, wherein D is $Y_p$, wherein Y is aryl and p is an integer from 1-4.

70. The compound of claim 69, wherein Y is phenyl.

71. The compound of claim 64, wherein L is:

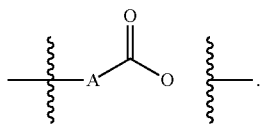

72. The compound of claim 71, wherein A is a bond.

73. The compound of claim 64, wherein m is 0.

74. The compound of claim 64, wherein the sum of n and m 1-4.

75. The compound of claim 64, wherein T is a monoterpene.

76. The compound of claim 64, wherein the terpene is not substituted.

77. The compound of claim 64, wherein the terpene is not cyclic.

78. The compound of claim 66, wherein T has the formula (i), (ii), or (iii):

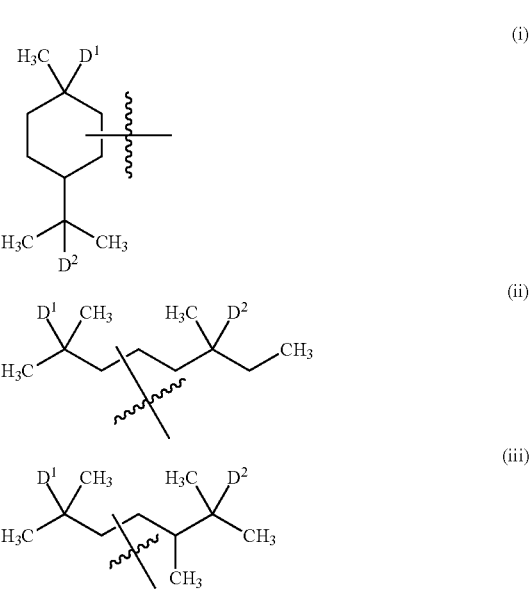

wherein:
(1) if T has the formula (i), then T is substituted with 1-3 substituents and
(2) s is 1 or 2; wherein:
if s is 1, then one of $D^1$ and $D^2$ is H and the other is P-E; and
if s is 2, then each of $D^1$ and $D^2$, independently, is P-E.

79. The compound of claim 78, wherein s is 1.

80. The compound of claim 78, wherein T is:

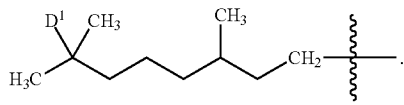

81. The compound of claim 64, wherein the compound of formula VII has the following formula:

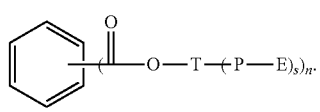

82. The compound of claim 81, wherein T is a monoterpene.

83. The compound of claim 82, wherein the compound of formula VII has the following formula:

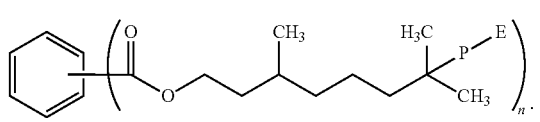

84. The compound of claim 64, wherein the compound of formula VII has the following formula:

$(E-T-O-\overset{O}{\underset{\|}{C}}-A)_m-\text{Ph}-(A-\overset{O}{\underset{\|}{C}}-O-T-(P-E)_s)_n.$

85. The compound of claim 64, wherein the compound of formula VII has the following formula:

$\left(E-\underset{H_3C}{\overset{CH_3}{C}}-\cdots-\overset{CH_3}{C}H-\cdots-O-\overset{O}{\underset{\|}{C}}\right)_m-\text{Ph}-\left(\overset{O}{\underset{\|}{C}}-O-\cdots-\overset{CH_3}{C}H-\cdots-\underset{CH_3}{\overset{H_3C}{C}}-P-E\right)_n.$

86. The compound of claim 64, wherein P is polyisobutylene.

87. The compound of claim 64, wherein E is:

(1)
$\xi-CH_2-C(=CH_2)-CH_3;$ (2)
pyrrole-$N-(CR^{PY1}R^{PY2})_m-X^{PY},$ wherein:

$R^{PY1}$ and $R^{PY2}$ are independently in each $-(CR^{PY1}R^{PY2})-$ unit selected from the group consisting of hydrogen and alkyl from 1 to 6 carbon atoms;

m is an integer from 1 to 20; and $X^{PY}$ is selected from the group consisting of hydrogen, alkyl, aryl, alkaryl, alkoxy, heteroaryl, nitro, ureido, $-OC(O)R^{PY3}$, $-C(O)R^{PY4}$, $-C(O)OR^{PY5}$, $-C(O)NR^{PY6}R^{PY7}$, $-P(R^{PY8})_3$, $-P(OR^{PY9})_3$, $-SR^{PY10}$, $-OSO_3R^{PY11}$, and $-S(O)R^{PY12}$;

wherein $R^{PY3}$ is alkyl or alkenyl; and $R^{PY4}$, $R^{PY5}$, $R^{PY7}$, $R^{PY8}$, $R^{PY9}$, $R^{PY10}$, $R^{PY11}$, and $R^{PY12}$ are alkyl;

(3)
$\xi-C(CH_3)(H_3C)-S-R^{SA},$ wherein $R^{SA}$ is alkyl, aryl, aralkyl, alkaryl, $\xi-(CH_2)_{1-3}-\text{furan},$  $\xi-(CH_2)_{1-3}-\text{pyrrole-NH},$ $\xi-(CH_2)_{1-3}-\text{thiophene},$  $\xi-(CH_2)_{1-3}-X^S,$ $\xi-(CH_2)_{1-3}-O-R^{SX},$  or $\xi-(CH_2)_{1-3}-O-\underset{R^{S5}}{\overset{R^{S3}}{\underset{|}{\overset{|}{Si}}}}-R^{S4};$ wherein:

$X^S$ is halo or a pseudohalide;

$R^{SX}$ is alkyl or aryl;

$R^{S3}$ is tert-butyl; and $R^{S4}$ and $R^{S5}$ are each, independently, alkyl, aryl, aralkyl, or alkaryl;

(4)
$\xi-\text{Ph}(R^{PH3})(R^{PH4})-O-(CR^{PH1}R^{PH2})_p-X^{PH},$ wherein:

$R^{PH1}$ and $R^{PH2}$ are each, independently in each $-(CR^{PH1}R^{PH2})$ unit, $-H$ or alkyl, and p is an integer from 0-20, wherein:

(a) if p is 0, then $R^{PH3}$ and $R^{PH4}$ are each, independently, alkyl, and
$X^{PH}$ is $-H$;

(b) if p is 1, then $R^{PH3}$ and $R^{PH4}$ are each, independently $-H$, alkyl, or alkoxy, and $X^{PH}$ is $-H$, alkyl, alkenyl, alkynyl, alkaryl, aralkyl, aryl, heteroaryl, or $\xi-C\equiv C-\underset{R^{PH7}}{\overset{R^{PH5}}{\underset{|}{\overset{|}{Si}}}}-R^{PH6},$ wherein $R^{PH5}$-$R^{PH7}$ are each, independently, alkyl or aryl;

(c) if p is 2, then $R^{PH3}$ and $R^{PH4}$ are each, independently $-H$, alkyl, or alkoxy, and $X^{PH}$ is $-H$, alkyl, alkenyl, alkynyl, alkaryl, aralkyl, aryl, heteroaryl, alkoxy, $-F$, —Cl, —Br, —I, —At, —CN, —NC, —NCO, —OCN, —NCS, —SCN, —OC(O)$R^{PH8}$, —C(O)O$R^{PH9}$, —C(O)N$R^{PH10}R^{PH11}$, or

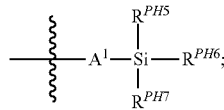

wherein:
$A^1$ is

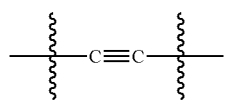 [SMILES: *C#C*]

or a single bond, $R^{PH5}$ to $R^{PH7}$ are each, independently, alkyl, alkenyl, alkynyl, alkaryl, aralkyl, aryl, heteroaryl, alkoxy, hydroxy, —N$R^{PH10}R^{PH11}$, —F, —Cl, —Br, —I, or —At, $R^{PH8}$ is alkyl, alkenyl, alkynyl, alkaryl, aryl, or heteroaryl, and $R^{PH9}$ to $R^{PH11}$ are each, independently, —H, alkyl, alkenyl, alkynyl, alkaryl, aryl, or heteroaryl, or when —O—(C$R^{PH1}R^{PH2}$)$_p$—$X^{PH}$ is ortho to $R^{PH4}$, then $X^{PH}$ and $R^{PH4}$, together, with the atoms to which $X^{PH}$ and $R^{PH4}$ are attached, may form a ring; and (d) if p is 3-20, then $R^{PH3}$ and $R^{PH4}$ are each, independently —H, alkyl, or alkoxy, and X is —H, alkyl, alkenyl, alkynyl, alkaryl, aralkyl, aryl, heteroaryl, alkoxy, aryloxy, heteroaryloxy, alkaryloxy, —OH, —F, —Cl, —Br, —I, —At, —CN, —NC, —NCO, —OCN, —NCS, —SCN, —OC(O)$R^{PH8}$, —C(O)O$R^{PH9}$, —C(O)N$R^{PH10}R^{PH11}$,

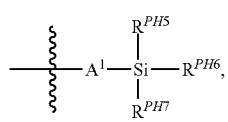

or N$R^{PHX}R^{PHY}$;
wherein:
$A^1$ is

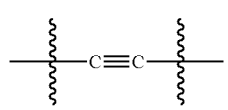 [SMILES: *C#C*]

or a single bond, $R^{PHX}$ and $R^{PHY}$ are each, independently, —H, alkyl, alkenyl, alkynyl, cycloalkyl, aryl, heteroaryl, heterocyclyl, —C(O)$R^{PHZ}$, wherein $R^{PHZ}$ is —H, alkyl, alkenyl, alkynyl, cycloalkyl, aryl, heteroaryl, heterocyclyl, —O$R^{PH8}$, or —N$R^{PH10}R^{PH11}$;

$R^{PH5}$ to $R^{PH7}$ are each, independently, alkyl, alkenyl, alkynyl, alkaryl, aralkyl, aryl, heteroaryl, alkoxy, hydroxy, —N$R^{PH10}R^{PH11}$, —F, —Cl, —Br, —I, or —At, $R^{PH8}$ is alkyl, alkenyl, alkynyl, alkaryl, aryl, or heteroaryl, and $R^{PH9}$ to $R^{PH11}$ are each, independently, —H, alkyl, alkenyl, alkynyl, alkaryl, aryl, or heteroaryl;

(5)

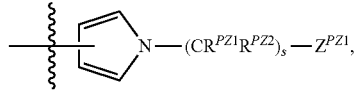

wherein:

$R^{PZ1}$ and $R^{PZ2}$ are independently in each —(C$R^{PZ1}R^{PZ2}$)— unit, hydrogen or alkyl from 1 to 6 carbon atoms;

s is an integer from 2 to 20; and $Z^{PZ1}$ is —F, —Cl, —Br, —I, —At, —CN, —NC, —N$_3$, —NCO, —OCN, —NCS or —SCN;

(6)

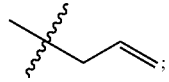

(7)

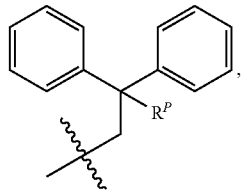

wherein $R^P$ is halo or hydrocarbyl of 1-20 carbon atoms optionally substituted with halo or pseudohalo;

(8) furan or a furan substituted with hydrocarbyl or substituted hydrocarbyl; or (9) thiophene or a thiophene substituted with hydrocarbyl or substituted hydrocarbyl.

88. The compound of claim 64, wherein E is

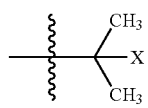

wherein X is a halide.

89. A compound of formula X:

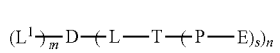

wherein:

D is hydrocarbyl;

each L, independently, is:

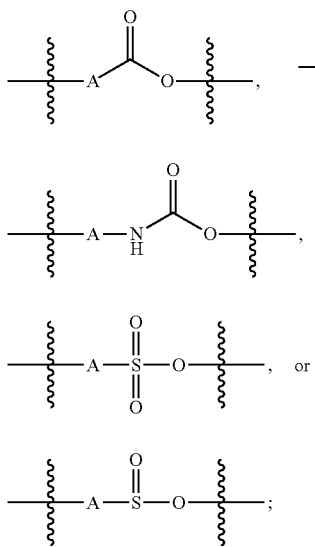

wherein each A, independently, is hydrocarbylene or a bond; and the oxygen is bonded to T;

each $L^1$, independently, is:

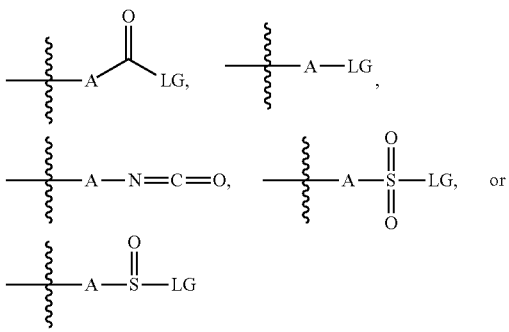

wherein each A, independently, is hydrocarbylene or a bond; and
LG is a leaving group
each T, independently, is a terpene;
each P, independently, is a polyolefin group;
each E, independently, is an end-cap group;
n and m are integers, wherein:
  (1) the sum of m and n is 2-6; and
  (2) m is at least 1; and
  (3) n is at least 1; and
each s, independently, is an integer from 1-2.

* * * * *